(12) United States Patent
Kato et al.

(10) Patent No.: US 6,345,411 B1
(45) Date of Patent: Feb. 12, 2002

(54) VACUUM CLEANER

(75) Inventors: Tomonori Kato; Tamaki Nishikori; Hiroshi Hayakawa; Naoyuki Ohara; Koichi Ito; Toru Odachi; Seizo Hayashi, all of Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/347,412

(22) Filed: Jul. 6, 1999

(30) Foreign Application Priority Data

| Jul. 6, 1998 | (JP) | 10-190062 |
| Jul. 7, 1998 | (JP) | 10-191194 |
| Jul. 7, 1998 | (JP) | 10-191195 |
| Oct. 23, 1998 | (JP) | 10-302461 |
| Oct. 23, 1998 | (JP) | 10-302462 |

(51) Int. Cl.$^7$ ............................. A47L 9/08; A47L 9/32; A47L 5/14
(52) U.S. Cl. ...................... 15/412; 15/346; 15/351; 15/377; 15/DIG. 1
(58) Field of Search ........................... 15/327.3, 345, 15/346, 351, 377, DIG. 1, 352

(56) References Cited

U.S. PATENT DOCUMENTS

| 1,965,614 A | * | 7/1934 | Sellers | 15/346 |
| 3,704,482 A | * | 12/1972 | Brannon | 15/351 |
| 4,581,787 A | * | 4/1986 | Torigoe et al. | 15/351 |
| 5,014,388 A | * | 5/1991 | Schiazza et al. | 15/351 |
| 5,502,872 A | * | 4/1996 | Chae et al. | 15/346 |
| 5,553,347 A | * | 9/1996 | Inoue et al. | 15/327.3 |
| 5,664,285 A | * | 9/1997 | Melito et al. | 15/352 |
| 5,799,363 A | * | 9/1998 | Inoue et al. | 15/327.3 |
| 6,032,327 A | * | 3/2000 | Oka et al. | 15/346 |

* cited by examiner

*Primary Examiner*—Terrence R. Till
(74) *Attorney, Agent, or Firm*—Wenderoth, Lind & Ponack, L.L.P.

(57) ABSTRACT

In the invention, a brush body 30 that is rotated and driven by a motor 32 is disposed in a suction unit 2, and dust is sucked from the suction unit 2 by a blower 4, while exhaust of the blower 4 is sent to the suction unit 2 side through an exhaust passage 27. While the exhaust of the blower 4 is blown to the motor 32 exhaust is blown to the floor for lifting the dust from the floor to enhance the dust collection efficiency, and moreover, if the output of the motor 32 for driving the brush 30 is increased, temperature rise of the motor 32 can be suppressed, and thus durability may be enhanced.

15 Claims, 55 Drawing Sheets

(a)  (b)  (c)

(a)

(b)

(a)

(b)

(a)

(b)

(a)

(b)

(a)

(b)

(a)

(b)

(a)

(b)

(a)

(b)

(a)

(b)

VACUUM CLEANER

FIELD OF THE INVENTION

The present invention relates to a vacuum cleaner used in a general household.

BACKGROUND OF THE INVENTION

A vacuum cleaner was hitherto constructed as shown in FIG. 54. This construction is described below.

As shown in FIG. 54, a blower 501 is disposed inside a cleaner main body 502, and a dust collector 504 incorporating a dust bag 503 is provided above the blower 501. The dust collector 504 and a suction unit 505 are connected through a hose 506. As indicated by the arrow in FIG. 54, dust is sucked together with air from the bottom 507 of the suction unit 505 by virtue of the blower 501, climbs up inside of the hose 506 by overcoming gravity, and is filtered by the dust bag 503 and captured inside the dust bag 503. The sucked air passes through the dust bag 503, runs through the inside of the blower 501, and is released from an exhaust port 508.

A vacuum cleaner incorporating a rechargeable secondary battery, and having a charging stand serving also as a supporting stand is constructed as shown in FIG. 55. A cleaner main body 509 accommodates a secondary battery and a blower (neither shown), and a suction tool 510 is tiltably provided at the lower part of the cleaner main body 509. A charging stand 511 is to charge the secondary battery contained in the cleaner main body 509, and this charging stand 511 has a mounting portion 512 for mounting the suction tool 510, and also has a box portion 513 having a charging power transformer and a charging terminal (neither shown).

When the suction tool 510 is put on the mounting portion 512 of the charging stand 511, the terminal of the cleaner main body 509 and the terminal of the charging stand 511 are electrically connected, so that the secondary battery is charged.

Also as shown in FIG. 56, by setting a cleaner main body 514 incorporating a secondary battery in a charger 515, the circuit connected to a blower 516 in the cleaner main body 514 is cut off by force, thereby changing over to the charging circuit.

When the cleaner main body 514 is set in the charger 515, a charging terminal 517a contacts with a deforming terminal 518a, and is deformed at the same time, so that the deforming terminal 518a is separated from a fixed terminal 518c. By this action, the blower 516 is put in closed circuit whether a switch 519 is on or off, and a charging circuit is established. That is, if attempted to charge while the switch 519 is turned on, the power consumption in the blower 516 exceeds the charging capacity of the charger 515, and thus it is not charged substantially, and is discharged completely when trying to use it the next time. This is to avoid such a problem, and by changing over the circuits, it is intended to charge securely regardless of the state of the switch 519.

However, in the conventional vacuum cleaner as shown in FIG. 54, since the blower 501 and the dust collector 504 are disposed above the suction unit 505, when moving the dust on the floor into the dust bag 503 in the dust collector 504, it is necessary to lift the dust upwardly by overcoming gravity, and the moving distance of the dust is long and a large pressure loss occurs, and therefore, the blower 501 is required to have sufficient suction power. Accordingly, a blower 501 exhibiting a large power consumption is required, and if the battery is used as the power source for the blower 501, sufficient suction power cannot be assured in relation to the battery capacity, size or other condition.

Therefore, using not only the suction power of the blower 501 but also the exhaust of the blower 501, a reflux type cleaner for enhancing the dust collecting performance must be designed in order to increase the dust collecting performance utilizing small power consumption. Many types of such reflux type cleaners have been proposed so far. Such proposals have many problems to be solved for practical use.

Besides, since the blower 501 is disposed in the cleaner main body 502, the weight and volume of the cleaner main body 502 are large, and the weight applied on handle 118 during use is great, whereby controllability of the vacuum cleaner is not favorable.

When turning the cleaner main body 502 backward by keeping the cleaner main body 502 nearly in a vertical state relative to the floor, since there is no obstacle behind the cleaner main body 502, the cleaner main body 502 is easy to turn, but when turning the cleaner main body 502 forward, the lower part of the cleaner main body 502 and the upper part of the suction unit 505 interfere with each other, and turning of the cleaner main body 502 is restricted. Accordingly, the reciprocating distance traveled by the cleaner main body 502 when holding the handle 118 is limited, and thus the floor area covered by the cleaner main body 502 is limited, whereby the number of times a reciprocating motion must be performed is increased, and thus it takes a longer time to clean the floor.

In the case of the vacuum cleaner using a battery as the power source for the blower, in the construction as shown in FIG. 55, the charging stand 511 for charging the battery is often put at a corner of a room or corridor, which is part of the cleaning area, and thus the large charging stand 511 is an obstacle when cleaning this area.

Or, when charging the battery incorporated in the vacuum cleaner in the construction shown in FIG. 56, the structure is complicated around the terminal for changing over the charging circuit, the number of terminals and wiring points is great, and there is a high possibility of the occurrence of defective charging and defective operation.

SUMMARY OF THE INVENTION

It is hence a first object of the invention to blow an exhaust against a floor to lift dust from the floor to enhance the dust collecting efficiency of a vacuum cleaner, and to decrease the temperature rise of a motor used for driving a dust scraper that is rotatably incorporated in a suction unit, whereby durability of the vacuum cleaner is enhanced.

It is a second object to improve the ease of handling the vacuum cleaner, by extending the distance that the cleaner main body may be reciprocated when holding the handle.

It is a third object to reduce the size of a charger for charging a secondary battery incorporated in the cleaner main body, so that the charger will not interfere with the cleaning of the area around the charger, thereby enhancing the ease of handling the vacuum cleaner, while also decreasing the material cost to present the vacuum cleaner at low price.

It is a fourth object to connect the cleaner main body and the charger only when the switch is cut off mechanically, and simplify the circuit construction, so as to charge the battery securely and enhance the ease of use of the vacuum cleaner at a low cost.

In the invention, in order to achieve the first object, a dust scraper that is rotatably driven by a motor is disposed in a suction unit, and dust is sucked in from the suction unit by the blower while exhaust of the blower is sent into the suction unit through an exhaust passage. The exhaust of the blower is blown to the motor, and also the exhaust is blown against the floor to lift the dust from the floor, and thus the dust collecting efficiency is enhanced by the synergistic action of scraping by rotation of the dust scraper and blowing of the exhaust. Moreover, the temperature rise of the motor can be decreased, so that durability of the vacuum cleaner may be enhanced.

To achieve the second object, in a cleaner main body having a suction port for sucking dust at a front side thereof and at least one of the dust collection chamber and blower at a rear side thereof, a handle arm is formed to rotate or oscillate over at least part of an outer circumference of the cleaner main body. Therefore when reciprocating the cleaner main body by holding a handle formed in the handle arm during a cleaning operation, the reciprocal moving distance is longer, and thus the number of times a reciprocating operation needs to be performed is decreased, so that ease of handling the vacuum cleaner may be enhanced.

To achieve the third object, a terminal of a charger is connected to a terminal connection unit provided in the cleaner main body which accommodates a secondary battery and the blower. The charger has a box portion for accommodating a power transformer, and the terminal projects from a side wall of this box portion. Therefore, the charger for charging the secondary battery, is reduced in size such that the charger is not an obstacle when cleaning the area around the charger, the ease of handling the vacuum cleaner is enhanced, and the material cost is decreased whereby the vacuum cleaner price can be lowered.

To achieve the fourth object, a terminal of a charger is connected to a terminal connection unit connected to a secondary battery of a cleaner main body that accommodates the secondary battery and a blower. The cleaner main body has a switch connected between the secondary battery and the blower, and a manipulation unit for this switch. An engaging portion is provided in this manipulation unit, and the engaging portion is engaged with an opposite engaging portion provided in the charger to set the cleaner main body on the charger, so that the engaging portion moves according to operation of the manipulation unit to prevent the engaging portion from being engaged with the opposite engaging portion when the switch is in an ON state. Therefore, only when the switch is cut off mechanically, can the cleaner main body and the charger be connected, and it is thus possible to securely charge the secondary battery in a simple and inexpensive circuit structure, whereby the ease of handling the vacuum cleaner is enhanced.

DESCRIPTION OF THE PREFERRED EMBODIMENTS

A first aspect of the invention is described below while referring to FIG. 1 to FIG. 7.

Figure 1:
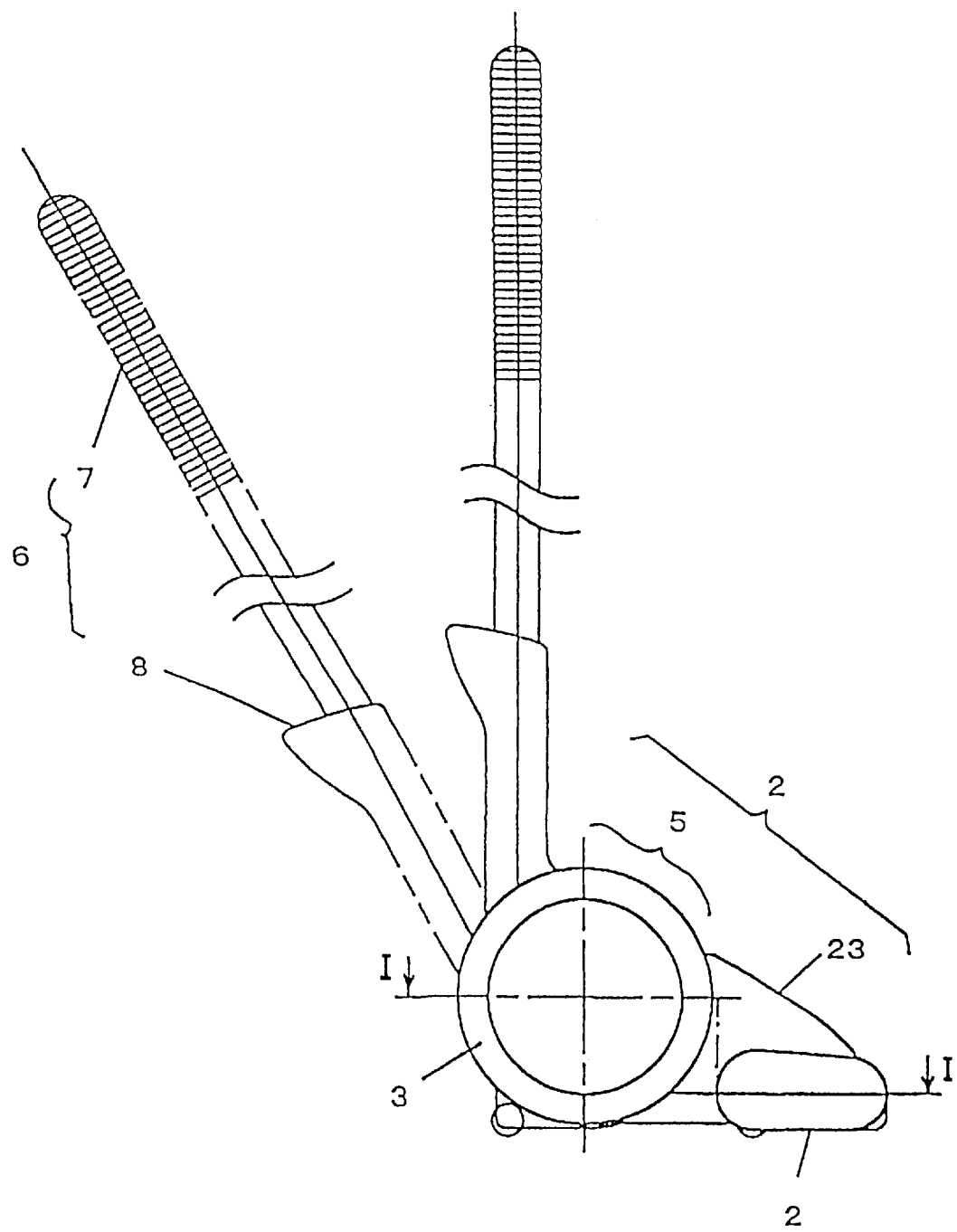
FIG. 1 is a side view of a vacuum cleaner according to a first aspect of the invention.
Figure 2:
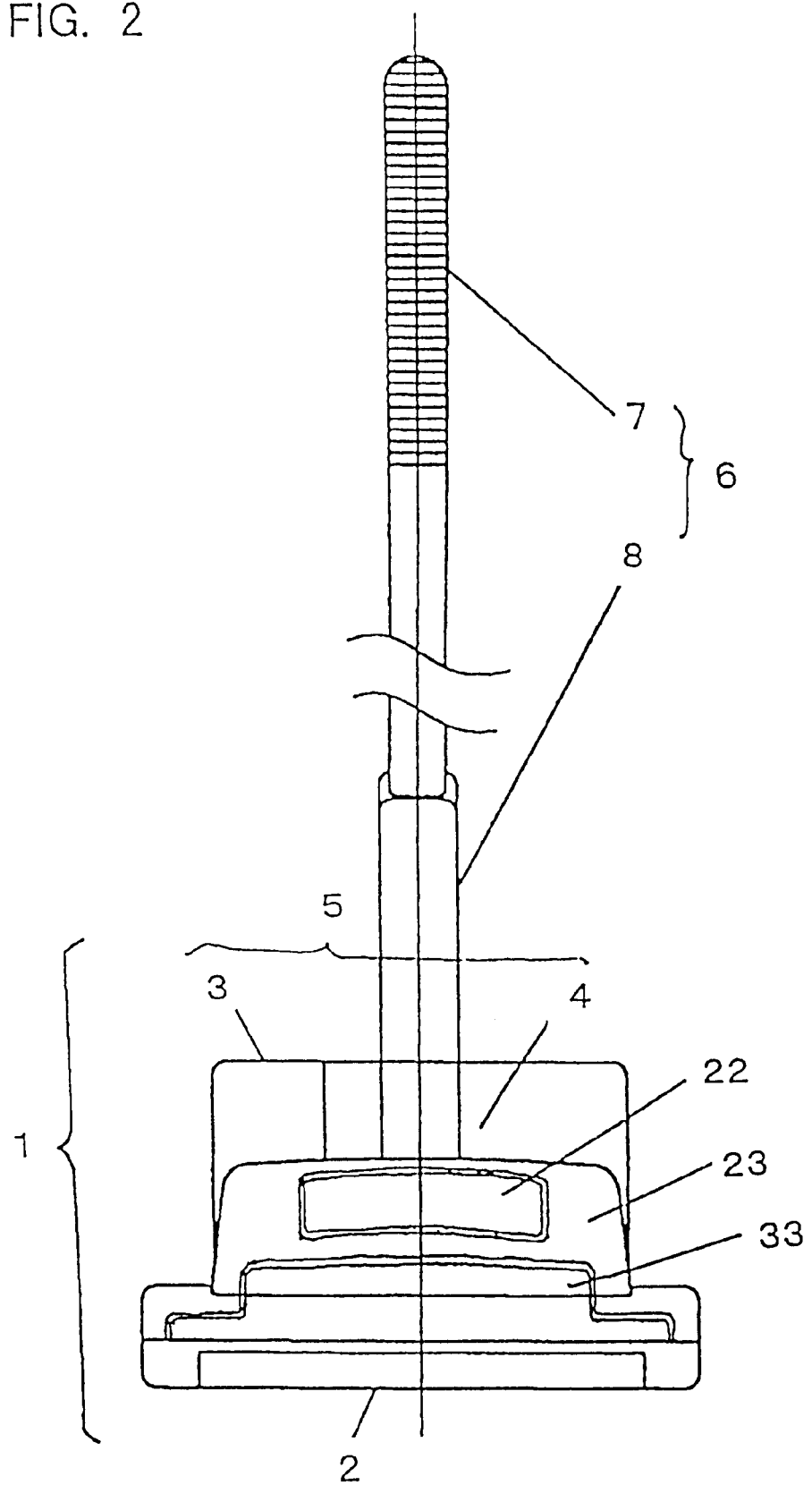
FIG. 2 is a front view of the vacuum cleaner in accordance with the first aspect.
Figure 3:
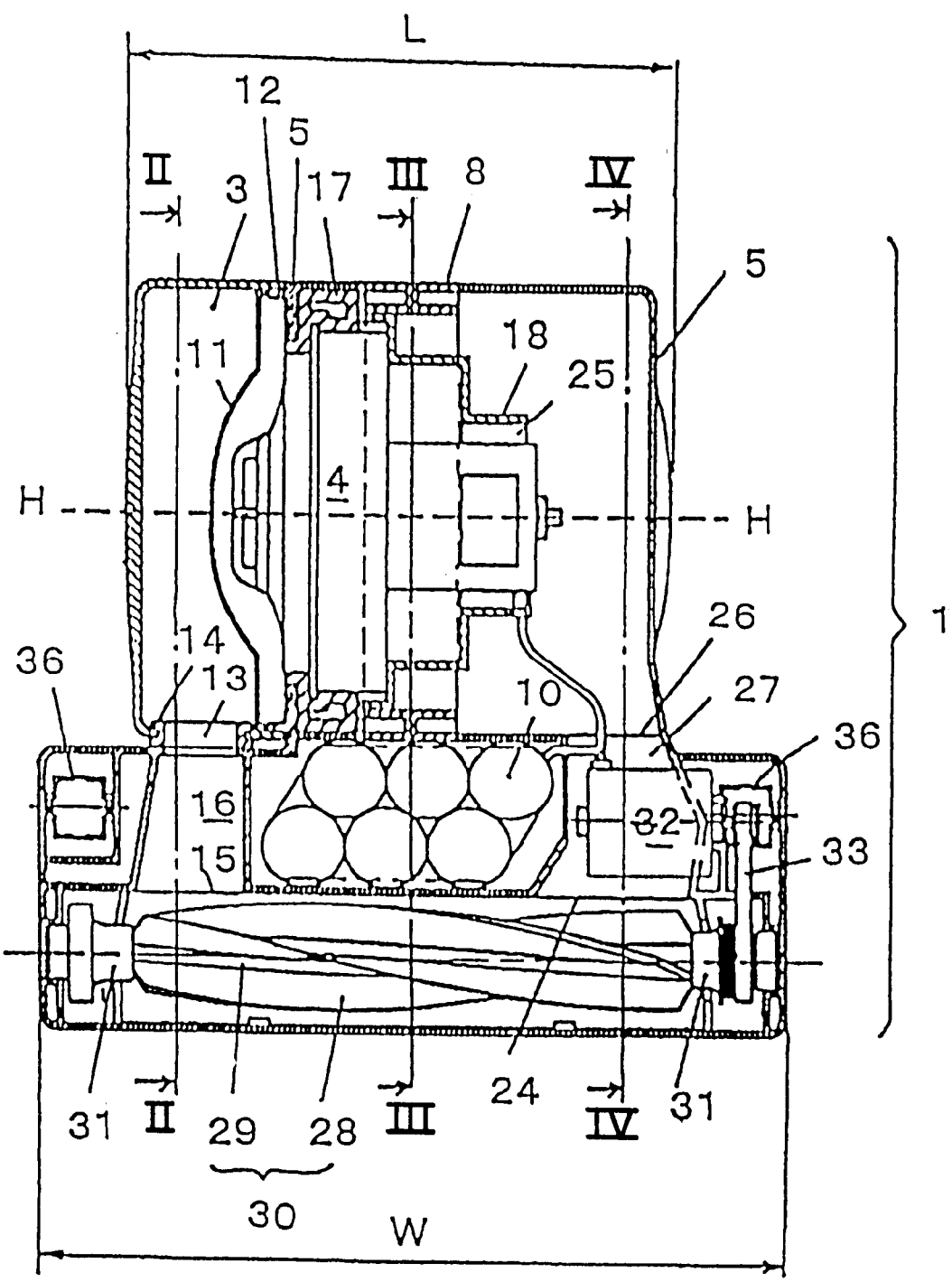
FIG. 3 is a sectional view along line I—I in FIG. 1.

As shown in FIG. 1 to FIG. 3, a cleaner main body 1 has a suction unit 2 at its front side, and a main body unit 5 comprising a dust collector 3 and a blower 4 is provided at its rear side. A handle unit 6 includes a handle 7, and is attached to a pivot 8 rotatably provided in the main body unit 5. A battery 10, which is a primary battery or secondary battery is provided as a power source, and is disposed between the main body unit 5 and suction unit 2, and is disposed integrally by virtue of a heat-shrink film.

Figure 4:
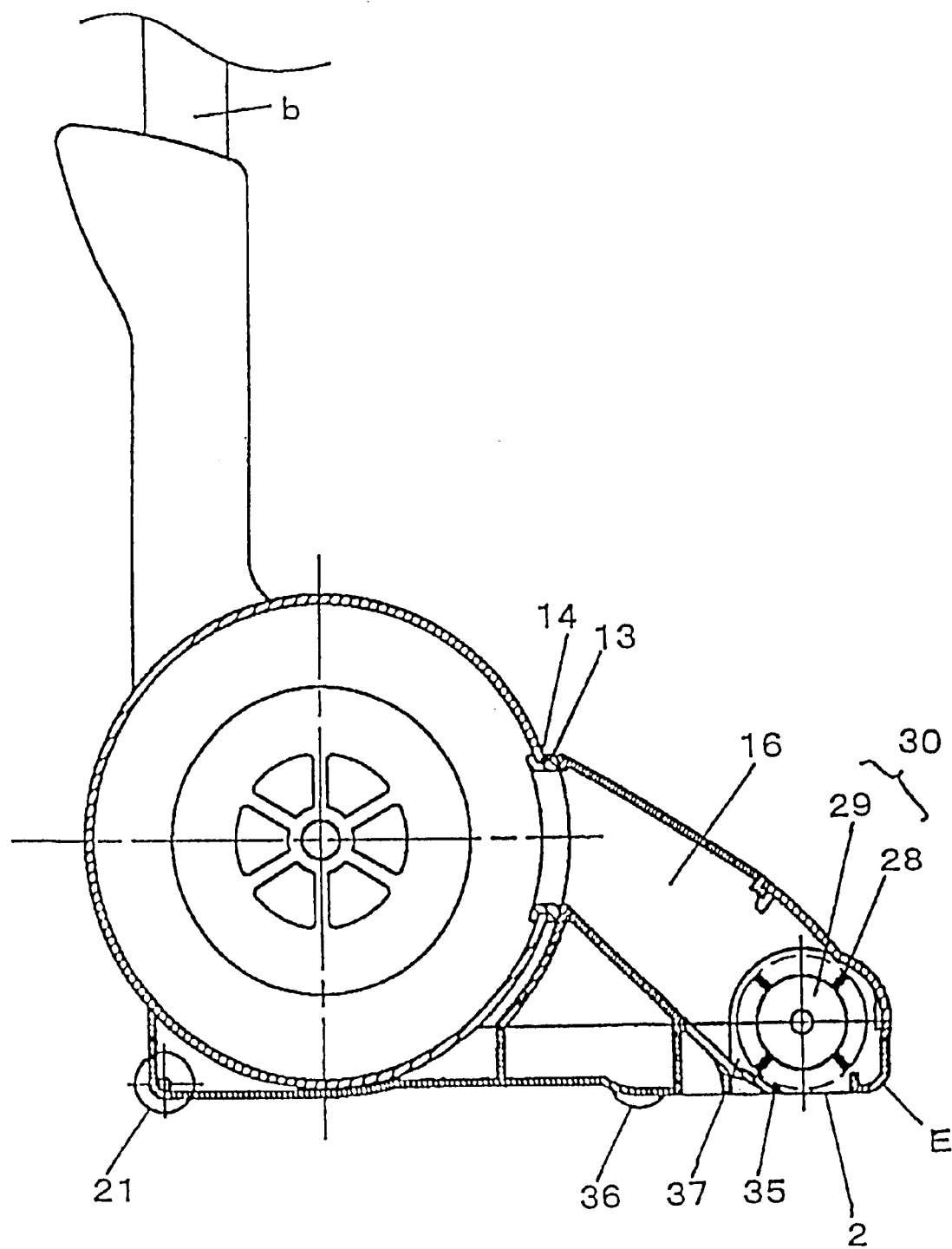
FIG. 4 is a sectional view along line II—II in FIG. 3.

The dust collector 3 incorporates a filter 11, is fitted to a mounting unit 12 of the main body unit 5, is detachably mounted through a lock not shown in the drawing, and is formed in a nearly cylindrical form. In the dust collector 3, as shown in FIG. 4, an intake port 14 mounting an intake packing 13 on an outer circumference thereof is provided, and is pressed to the end face of an intake passage 16 communicating with an intake unit 15 provided in the suction unit 2.

Figure 5:
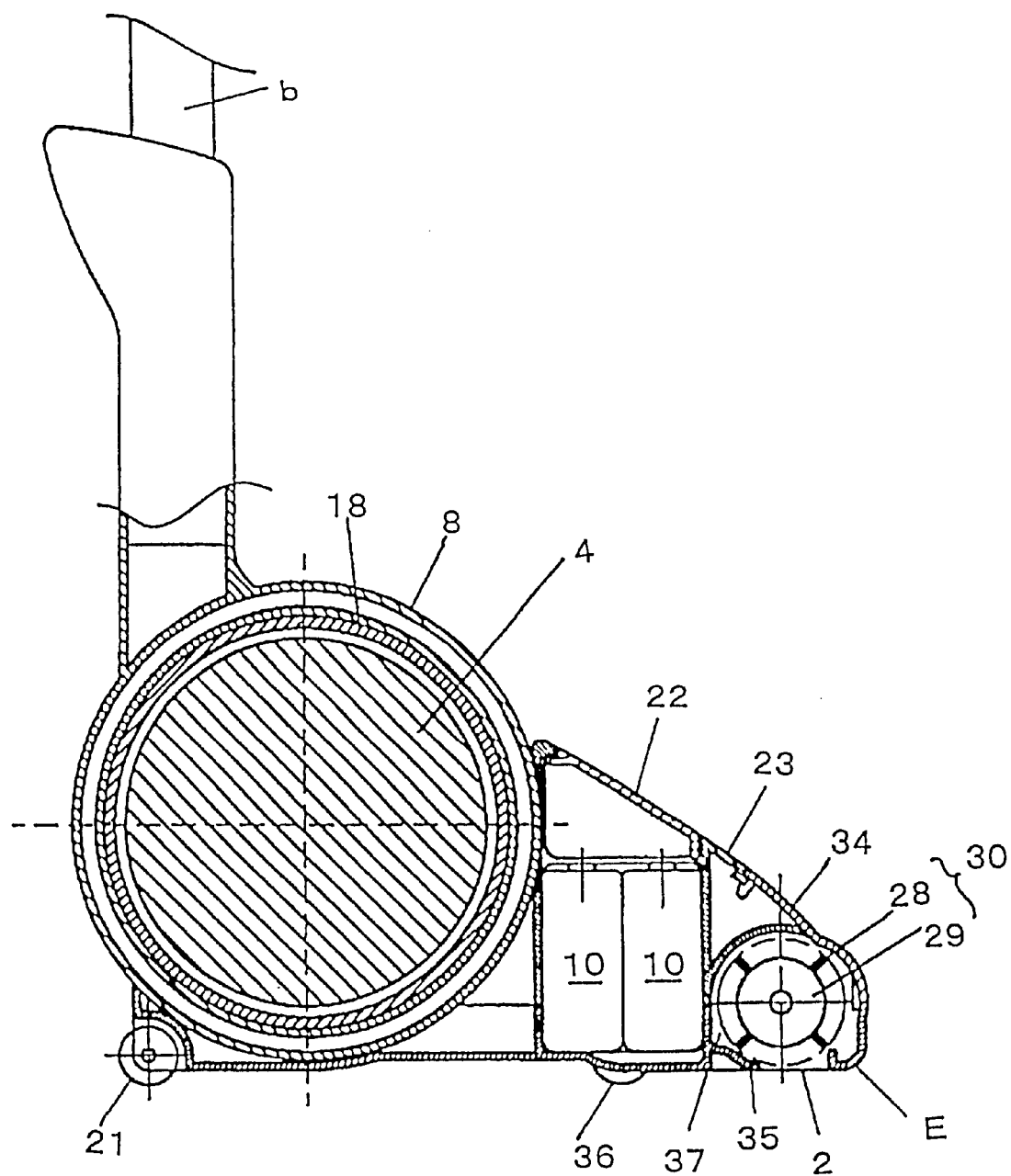
FIG. 5 is a sectional view along line III—III in FIG. 3.
Figure 7:
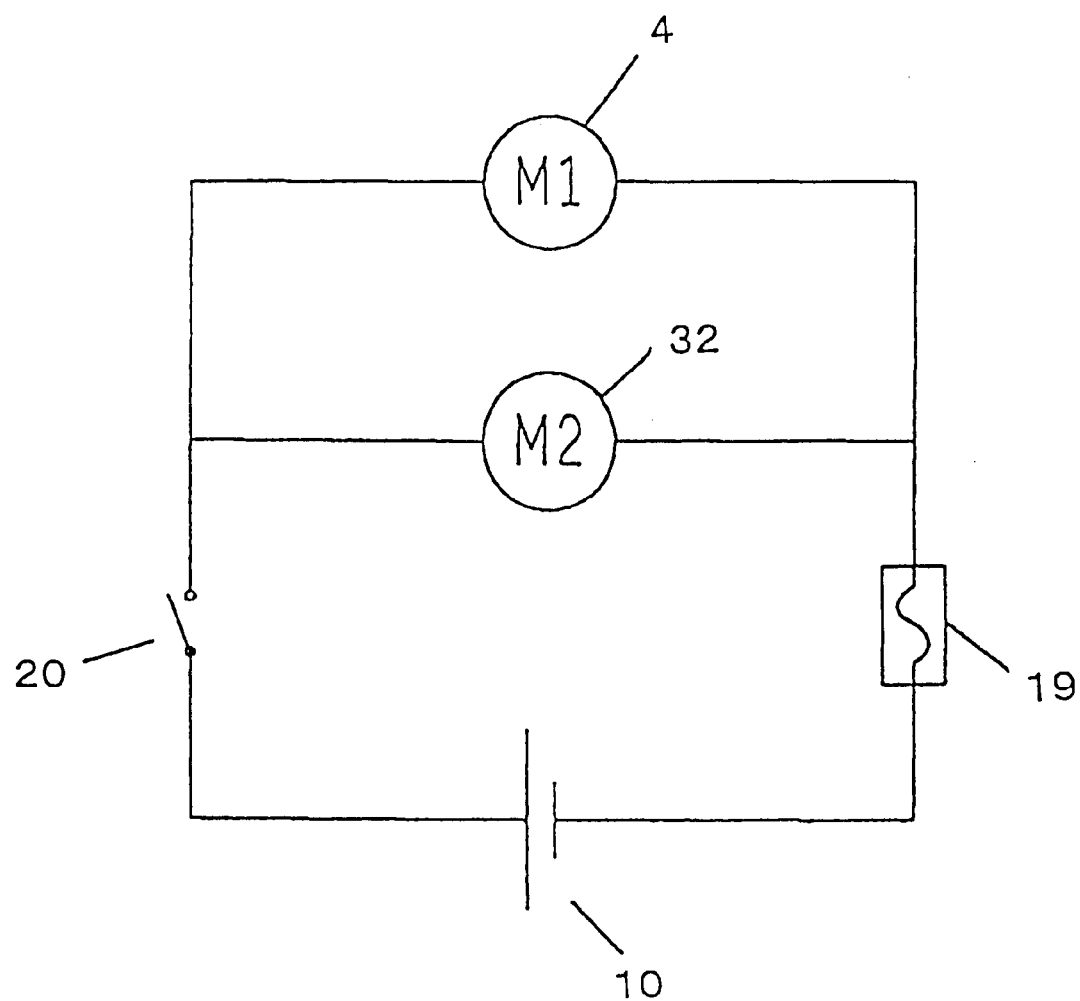
FIG. 7 is an electric circuit diagram of the vacuum cleaner in accordance with the first aspect.

The blower 4 is held by an elastic or flexible support 17, and is fixed to the main body unit 5 by screws not shown in the drawing, together with a motor case 18 as shown in FIG. 5. The pivot 8 of the handle unit 6 is rotatably mounted about the outer circumference of the motor case 18. The blower 4 is connected parallel to the battery 10 through a current fuse 19 and power switch 20 as shown in FIG. 7. The suction unit 2, dust collector 3, blower 4, intake passage 16, and battery 10 are disposed on a nearly flat plane mutually within the cleaner main body 1.

In this construction, the dust sucked in from the suction unit 2 together with the suction air of the blower 4 is carried into the dust collector 3 through the intake passage 16, and is captured in the filter 11. At this time, since the dust collector 3 and the blower 4 are disposed nearly on a same level as the suction unit 2, dust moves only on the horizontal plane near the floor, and thus it is not lifted upwardly, and therefore a relatively large mass of dust can be captured by utilizing little energy, so that the battery 10 and blower 4 may be reduced in size and weight. Moreover, since all constituent parts are accommodated in the cleaner main body 1, and the handle unit 6 is designed to be independently rotatable with the cleaner main body 1, the weight of the cleaner main body 1 does not act on the handle 7 during use, so that the load experienced during a cleaning operation can be lessened.

Consequently, as shown in FIG. 1 to FIG. 3, the dust collector 3 and blower 4 provided in the main body unit 5 behind the suction unit 2 are disposed parallel to the longitudinal direction of the suction unit 2 along the axial line H—H and the width L of the main body unit 5 is smaller than the width W of the suction unit 2.

In this construction, since the axial line of the dust collector 3 and blower 4 of the main body unit 5 is disposed parallel to the longitudinal direction of the suction unit 2, the dimension in the longitudinal direction is small and compact. When storing the stand, projection from the wall is small, and thus neat storing is realized. Moreover, since the width L of the main body unit 5 is smaller than the width W of the suction unit 2, the side of the main body unit 5 does not hit against the furniture or the like ahead of the suction unit 2 when cleaning, and the overall width of the suction unit 2 is effectively utilized to capture dust, so that the cleaning efficiency of the vacuum cleaner may be enhanced.

Next, as shown in FIG. 3 and FIG. 5, a first running roller 21 is provided at the lower side of the main body unit 5, and the battery 10 is disposed between the first running roller 21 and the suction unit 2, and a lid 22 is detachably provided. In FIG. 5, moreover, the suction unit 2 and the main body unit 5 include inclined surfaces 23 nearly contacting each other.

In this construction, the weight of the battery 10 acts in the direction of pressing the suction unit 2 onto the floor in the center of the running roller 21, and the clearance between the suction unit 2 and the floor may be stably assured, and the dust collecting efficiency may be enhanced. Moreover, by its inclined surface 23, the suction unit 2 can be smoothly inserted beneath furniture during cleaning, and thus interference is decreased and the ease of handling the vacuum cleaner may be enhanced.

Figure 6:
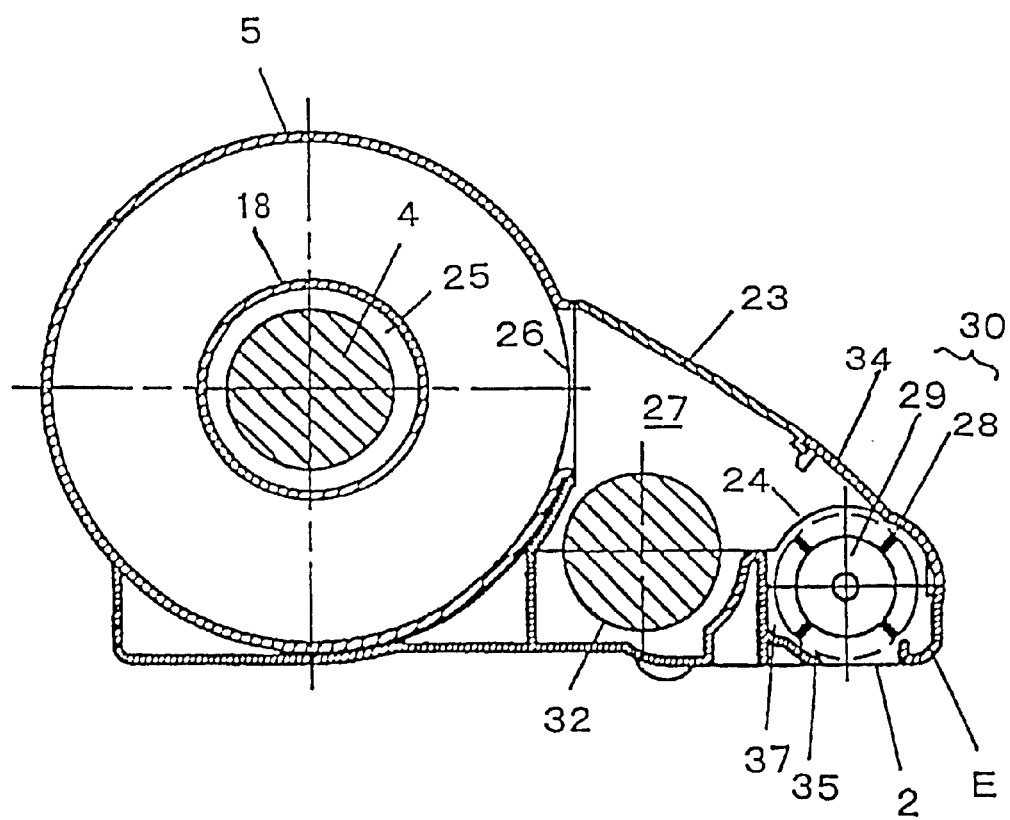
FIG. 6 is a sectional view along line IV—IV in FIG. 3.

Also as shown in FIG. 3 and FIG. 6, an exhaust unit 24 is provided at a side of the suction unit 2 that is opposite the side of the suction unit 2 at which the intake unit 15 is provided. An exhaust passage 27 is formed to communicate with an exhaust port 25 of the motor case 18 and the exhaust unit 24 through a discharge portion 26 of the main body unit 5. In the suction unit 2, a brush body 30, including a lip body 28 made of a bristle brush or a rubber blade on a shaft body 29, is rotatably provided through a bearing 31, and is designed to be rotated and driven by a belt body 33 via a motor 32. The brush body 30 is a dust scraper. The lip body 28 is made of bristles or rubber material that can be washed in water, and the shaft body 29 is similarly made of synthetic resin material that can be washed in water. By detaching an upper cover 34 from the cleaner main body 1, the brush body 30 can be detached together with the bearing 31. Part of the outer circumference of the motor 32 is formed oppositely to the exhaust passage 27. As shown in FIG. 7, the motor 32 is electrically connected in parallel to the battery 10.

In this construction, the exhaust from the blower 4 is released to the floor from the exhaust unit 24 by way of the exhaust port 25, discharge unit 26 and exhaust passage 27, lifts the dust on the floor upward, and forms a circulating stream flowing into the intake unit 15 from the exhaust unit 24 through the suction unit 2 to facilitate movement of the dust into the dust collector 3, so that the dust collecting efficiency may be enhanced. Moreover, by the synergistic action of scraping caused by rotation of the brush body 30 and the circulating stream, the dust efficiency is further enhanced as compared with the case of scraping by the rotation of the brush body 30 only, or of a circulating stream only without a brush body. Still more, since the brush body 30 is washable in water, it can always be kept clean, and the brush body 30 can be quickly and completely dried by the exhaust circulating stream, and thus a sanitary construction is realized. In addition, by blowing the exhaust to the motor 32, if the output of the motor 32 is increased, a temperature rise thereof caused by rotation of the brush body 30 can be suppressed, and durability of the vacuum cleaner may be improved.

As shown in FIG. 4, at the rear lower side of the suction unit 2, a scraper 35 projecting from the rear end to the front side of the outer circumference of the brush body 30 is provided almost along the entire width of the suction unit 2, and this scraper 35 has a planar portion, and is provided with a holder 37 for temporarily holding the dust. Also, as shown in FIG. 3 and FIG. 5, at the lower side of the main body unit 5, the first running roller 21 is provided, and a second running roller 36 is provided at opposite sides behind the suction unit 2.

In this construction, by installing the scraper 35, the dust scraped up by the rotation of the brush body 30 is captured by the holder 37, and the dust is easily transferred to the dust collector 3, and thus the dust collection efficiency is enhanced. By the second running roller 36, the front end of the suction unit 2 can be lifted from the floor, and the front lower end E of the suction unit 2 is cleared from the floor along the entire region of the suction unit, so that the dust from the entire region of the suction unit 2 can be easily sucked, and moreover, resistance of manipulation such as is caused by suction unit sticking on the carpet can be lessened, and thus the dust collection efficiency is high and the ease of handling the vacuum cleaner is improved.

A second aspect of the invention is described while referring to FIG. 8 through FIG. 12.

Figure 8:
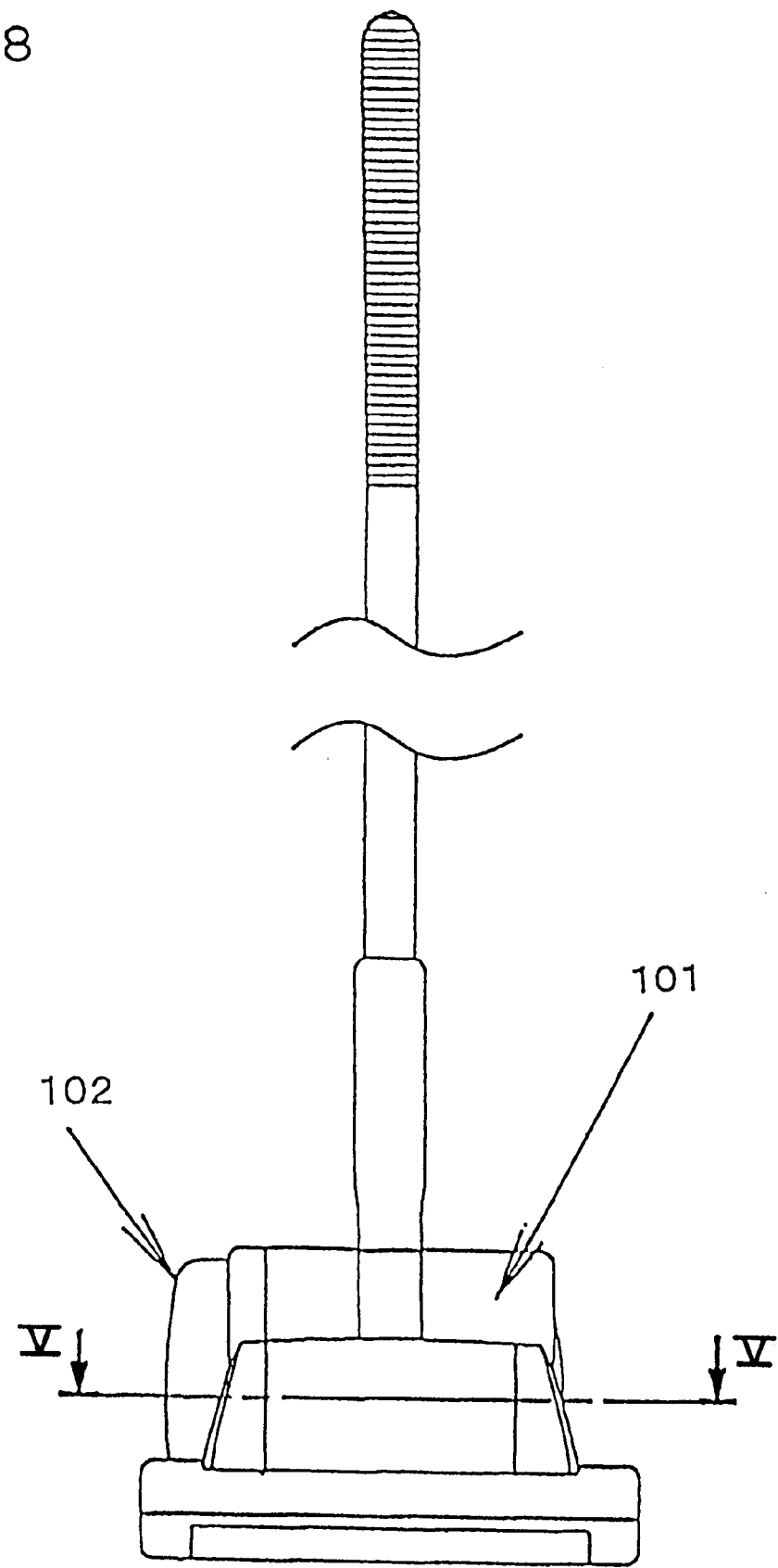
FIG. 8 is a front view of a vacuum cleaner according to a second aspect of the invention.
Figure 9:
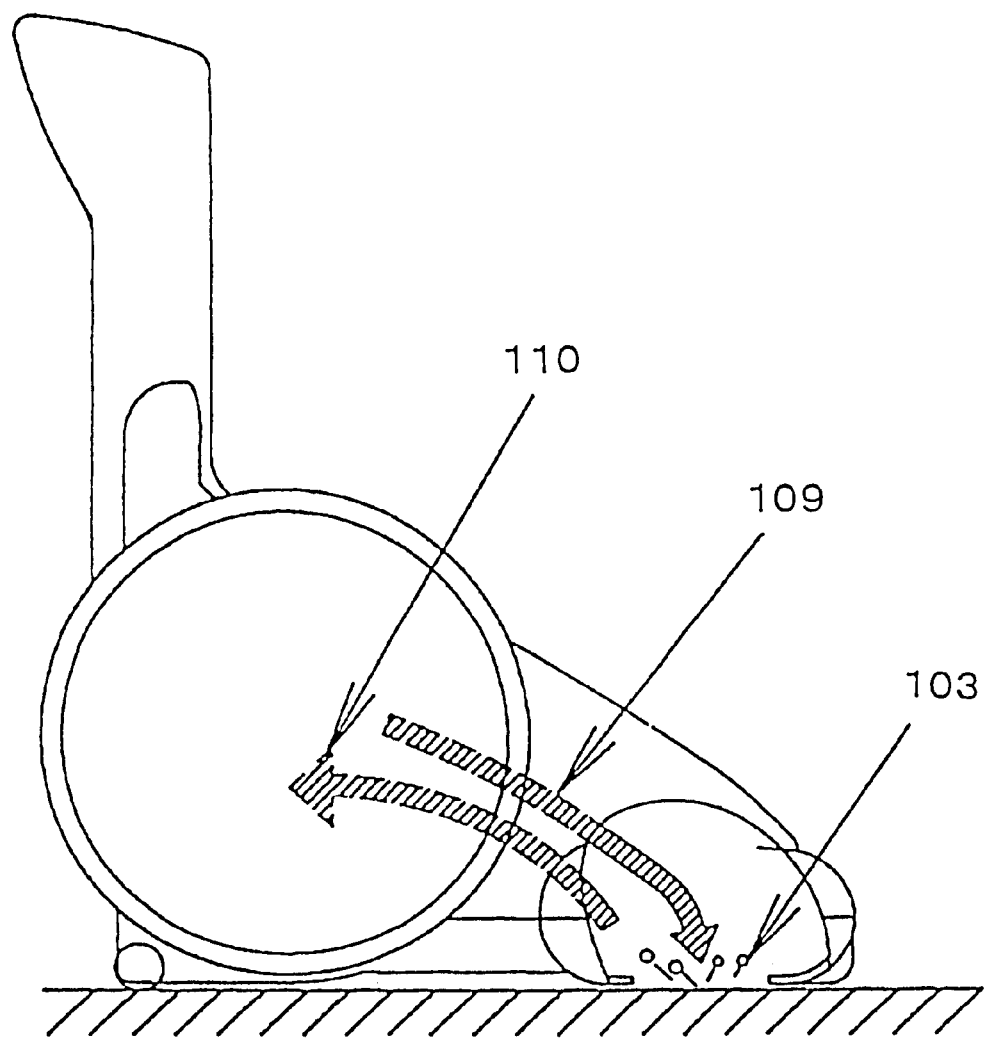
FIG. 9 is a diagram showing flow of exhaust, suction and dust of the vacuum cleaner in accordance with the second aspect.
Figure 10:
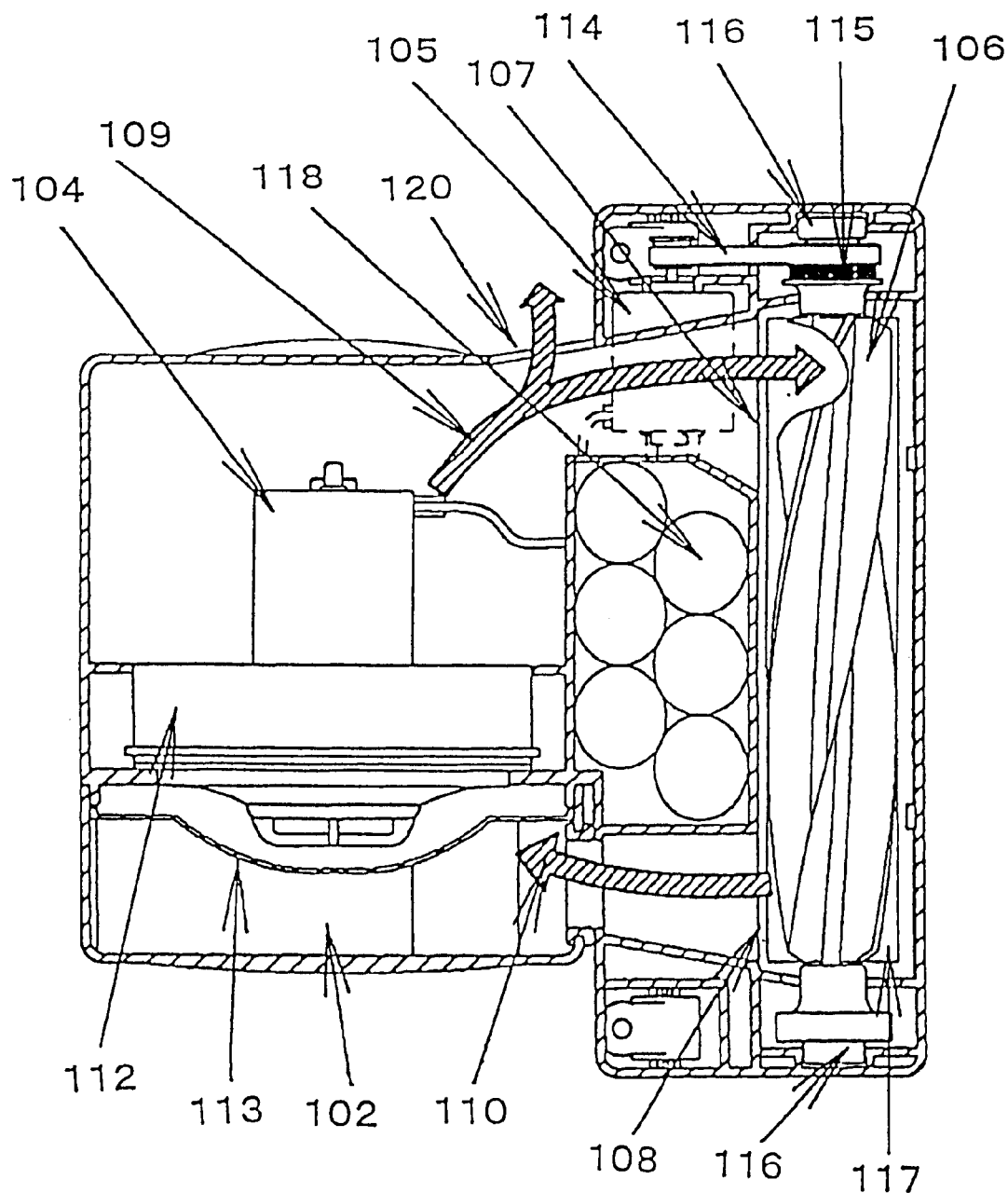
FIG. 10 is a sectional view along line V—V in FIG. 8.

As shown in FIG. 8 to FIG. 10, a cleaner main body 101 has a dust collection chamber 102 for accumulating dust inside, and this dust collection chamber 102 has a blower 104 comprising a dust filter 113 and a suction fan 112. A brush body 106 is for scraping up dust from the floor, and it is supported on a bearing 116, and is driven by a motor 105 through a belt 114 and a pulley 115. A battery 118 is for driving the blower 104 and motor 105.

An intake unit 108 communicating with a suction unit 117 and the dust collection chamber 102, and an exhaust unit 107 for releasing the exhaust from the blower 104 into the suction unit 117 are provided. A circulating air stream from the exhaust unit 107 to the intake unit 108 is formed, in which part of the exhaust 109 released from the blower 104 is circulated into the exhaust unit 107 of the suction unit 117, and part of the exhaust is released to parts other than the suction port 117, and the air flow rate of the intake 110 circulating from the exhaust unit 107 to the intake unit 108 is adjusted to be 50% to 95% of the total exhaust from the blower 104.

Figure 11:
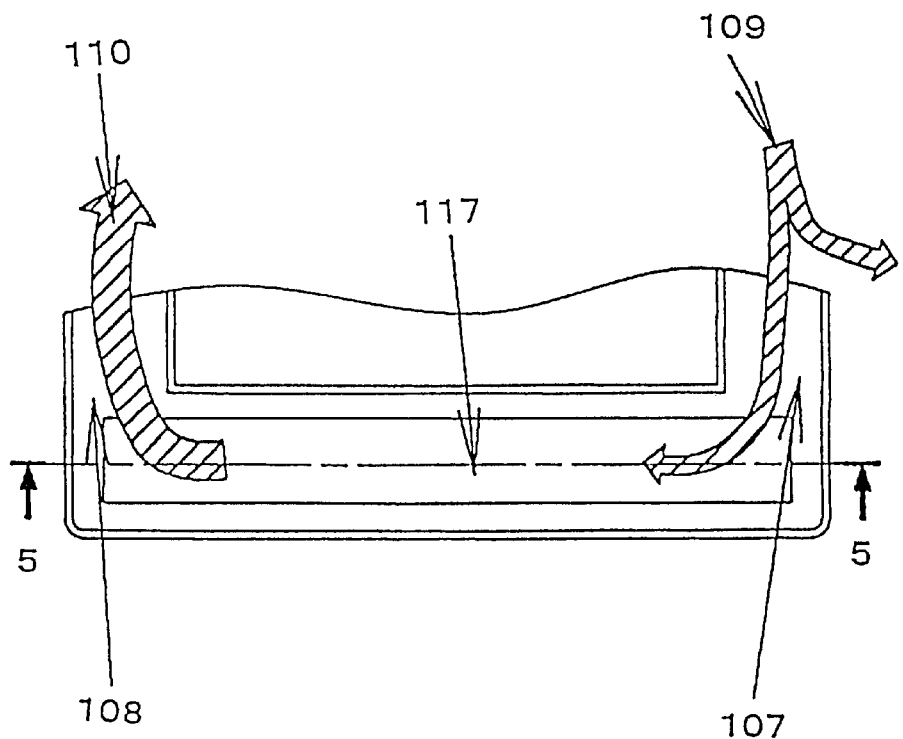
FIG. 11 is a diagram showing air flow around a suction unit of the vacuum cleaner in accordance with the second aspect.
Figure 12:
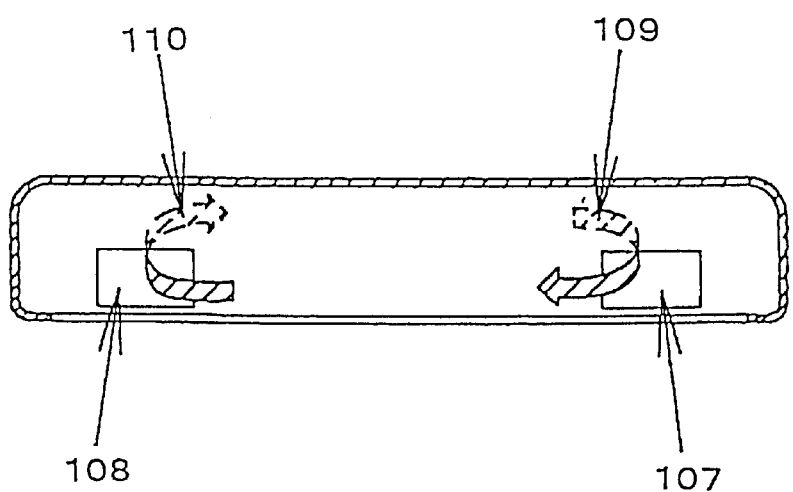
FIG. 12 is a sectional view along line VI—VI in FIG. 11.

In this construction, when the blower 104 is driven, the dust collection chamber 102 has a negative pressure therein. The exhaust 109 released from the blower 104 is partly blown from behind the blower 104 onto the floor from the exhaust unit 107 communicating with the suction unit 117 as shown in FIG. 11 and FIG. 12, and the rest of the exhaust is released to an exterior of the suction unit 17 through an exhaust port 120 communicating with the exterior the suction unit 117. As a result, dust 103 on the floor is blow by the suction unit 117 and is lifted from the floor. The suction unit 117 has a brush body 106 having both its ends rotatably held together with the cleaner main body 101 by virtue of bearing 116, and this brush body 106 is rotated by the power transmitted from the motor 105 through pulley 15 and belt 114. As the brush body 106 rotates, dust particles caught in the depth of piles of carpet or floor are scraped away. The dust 103 lifted from the floor by the brush body 106 and exhaust 109 is borne on the air stream circulating from the exhaust unit 107 to the intake unit 108, and is carried into the dust collection chamber 102 from the intake unit 108, and is accumulated in the dust collection chamber 102 through the dust filter 113. Therefore, if the suction power of the blower 104 is weak, by blowing the exhaust 109 onto the floor, the dust 103 is lifted from the floor, and the dust collection efficiency can be enhanced. It is also possible to prevent scatter of dust 103 into the suction unit 117 due to an excessive air flow rate or velocity of the exhaust 109 blown onto the floor. Moreover, since the heat generated from the blower 104 can be released along with the exhaust to the exterior of the suction unit 117, a temperature rise in the vacuum cleaner can be suppressed. Because some of the exhaust is released to the exterior of the suction unit 117, and all is not circulated into the intake unit 108, the temperature rise of the blower 104 can also be suppressed, and the durability of the vacuum cleaner may be enhanced. In addition, on the floor of a carpet with long piles, by scraping the floor with the brush body 106, the exhaust 109 reaches to the inner depth of piles, and thus the dust particles caught therein can be blown up.

Figure 13:
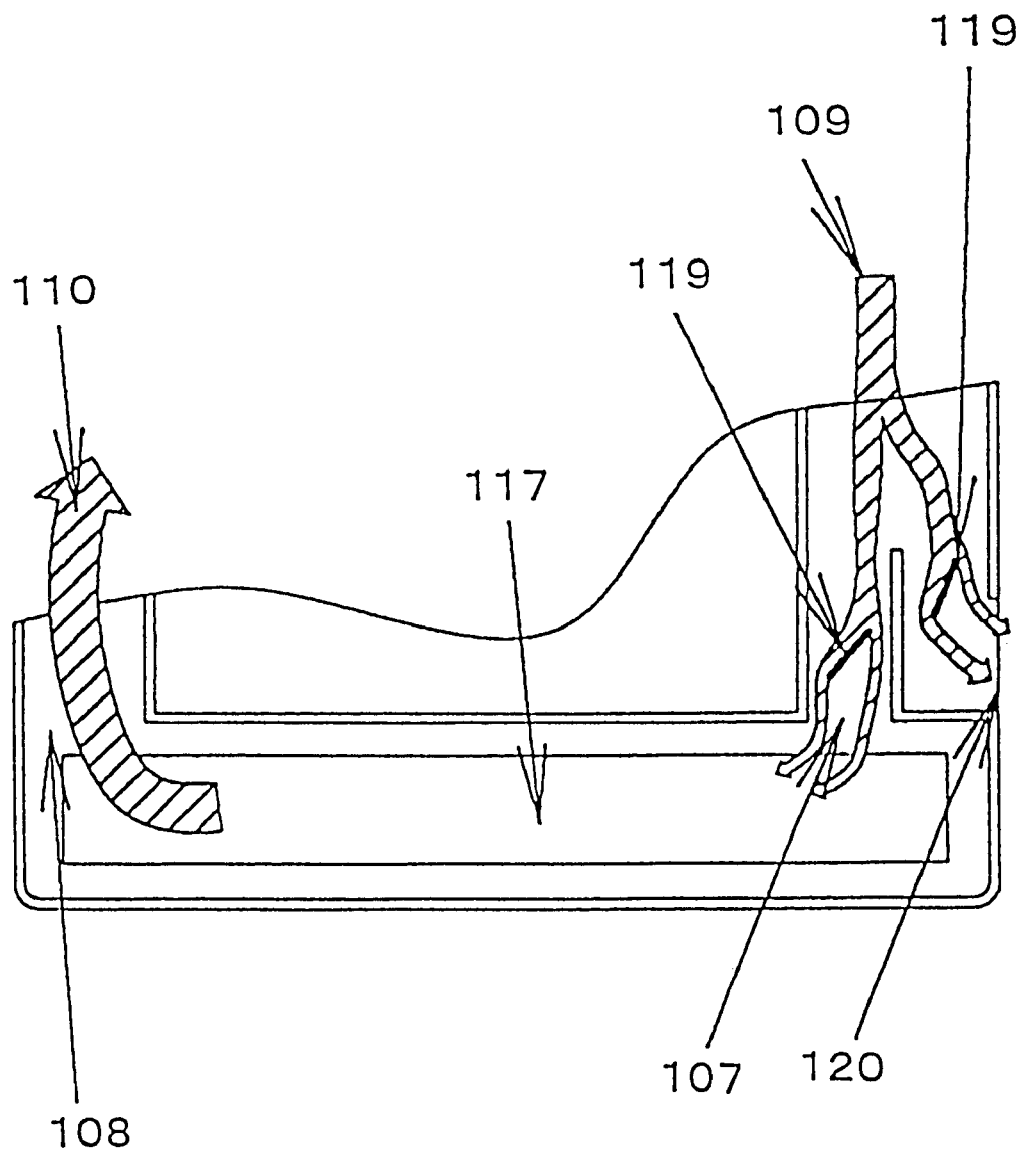
FIG. 13 is a diagram shown air flow around a suction unit of a vacuum cleaner according to a third aspect of the invention.
Figure 14:
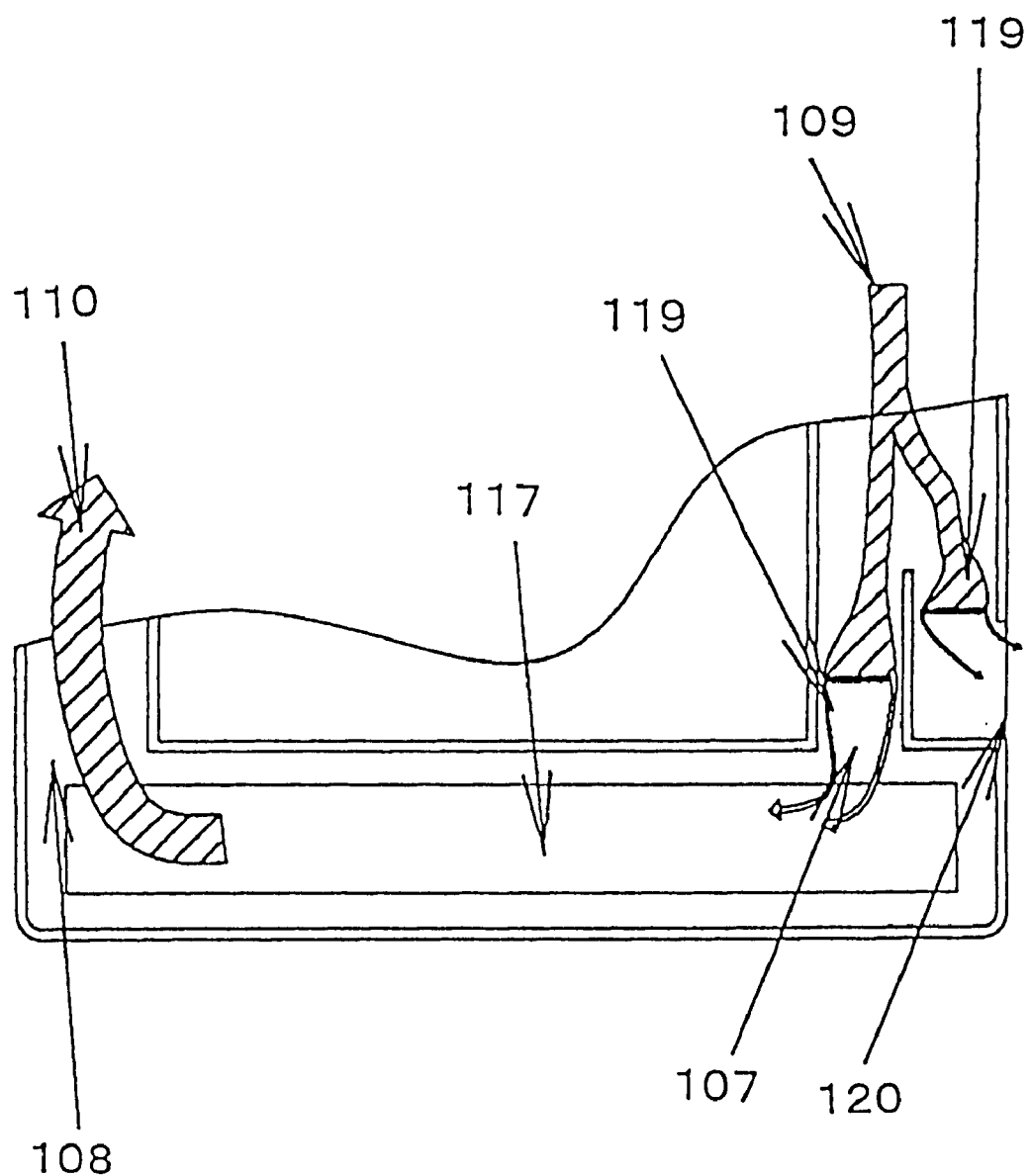
FIG. 14 is a diagram showing a throttled state of an air flow adjusting valve of the vacuum cleaner in accordance with the third aspect.

A third aspect of the invention is described while referring to FIG. 13 and FIG. 14.

As shown in the drawings, an air flow rate adjusting valve 119 adjusts the air flow rate circulating from the exhaust unit 107 into the suction unit 117, and/or the air flow rate released through the exhaust port 120. The construction is otherwise the same as that in accordance with the second aspect.

In this construction, the air flow rate adjusting valve 119 is rotatable, and it adjusts the flow rate of the exhaust 109 blown onto the floor from the exhaust unit 107, and/or the flow rate released through the exhaust port 120, depending on the type of floor or dust level in the dust chamber. Accordingly, while suppressing scatter of dust outside of the suction port 117 due to excessive air flow rate or velocity of the exhaust 109 blown onto the floor, the floor dust can be collected efficiently depending on the type of the floor and the dust level in the dust collection chamber.

Figure 15:
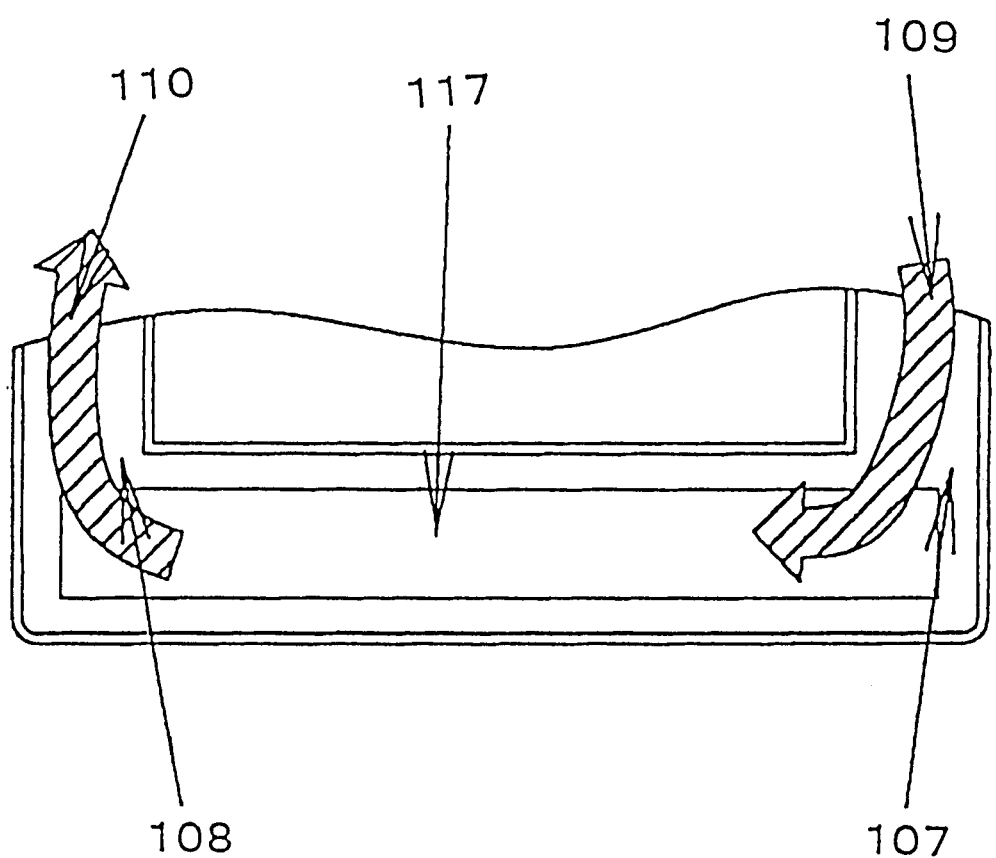
FIG. 15 is a diagram showing air flow around a suction unit of a vacuum cleaner according to a fourth aspect of the invention.

A fourth aspect of the invention is described while referring to FIG. 15.

As shown in FIG. 15, an intake unit 108 is provided at one end of the suction unit 117, and an exhaust unit 107 is provided at the opposite end, and the exhaust 109 released from the exhaust unit 107 passes almost parallel to the floor in the longitudinal direction of the suction unit 117, and a circulating air stream into the intake unit 108 is formed. The construction is otherwise the same as that in accordance with the second aspect.

In this construction, the air stream circulating from the exhaust unit 107 into the intake unit 108 is formed nearly parallel to the floor in the longitudinal direction of the suction unit 117, and therefore, the dust and air move nearly on a horizontal plane near the floor, whereby impedance by gravity is less. Moreover, by blowing the exhaust wind 109 onto the floor, dust is lifted from the floor, and thus the dust collection efficiency can be enhanced. Still more, the air stream circulating from the exhaust unit 107 to the intake unit 108 thoroughly passes the entire section of floor beneath the opening of the suction unit 117, and thus the exhaust 109 flows smoothly the long distance to the intake unit 108, so that the dust collection efficiency may be enhanced over a wide range of the floor. The exhaust 109 circulates into the intake unit 108, leak of exhaust to the exterior of the suction unit 117 is prevented, and the dust beneath the suction unit 117 does not scatter to the exterior of the suction unit 117, while the ease of handling the vacuum cleaner is also improved.

Figure 16:
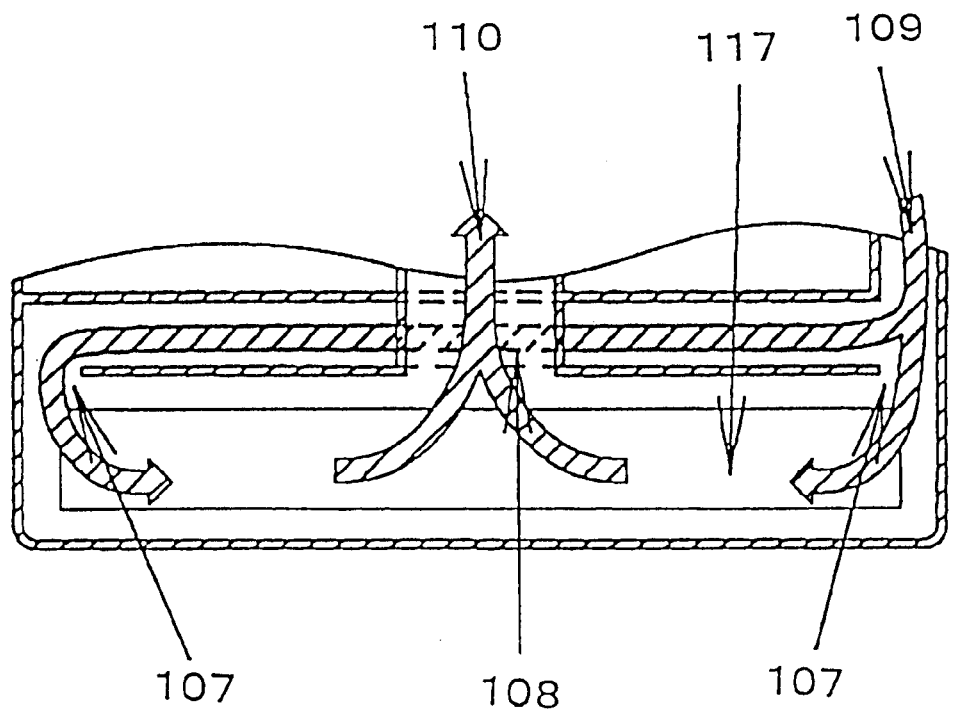
FIG. 16 is a diagram showing air flow around a suction unit according to another example of the vacuum cleaner in accordance with the fourth aspect.

Also as shown in FIG. 16, exhaust units 107 are provided at right and left ends of the suction unit 117, and an intake unit 108 is installed in, the middle of these exhaust units 107, in which the exhaust 109 blown onto the floor from the two exhaust units 107 circulates into the intake unit 108 provided between the exhaust units, and the distance between the exhaust units 107 and the intake unit 108 is shorter, whereby the moving distance of the dust is shortened so that the dust collection performance may be enhanced. It is also possible to suppress leak of exhaust 109 from the suction unit 117 to the exterior of the suction unit 117 such that the dust beneath the suction unit 117 does not scatter to the exterior of the suction unit 117, while the ease of handling is also improved.

Figure 17:
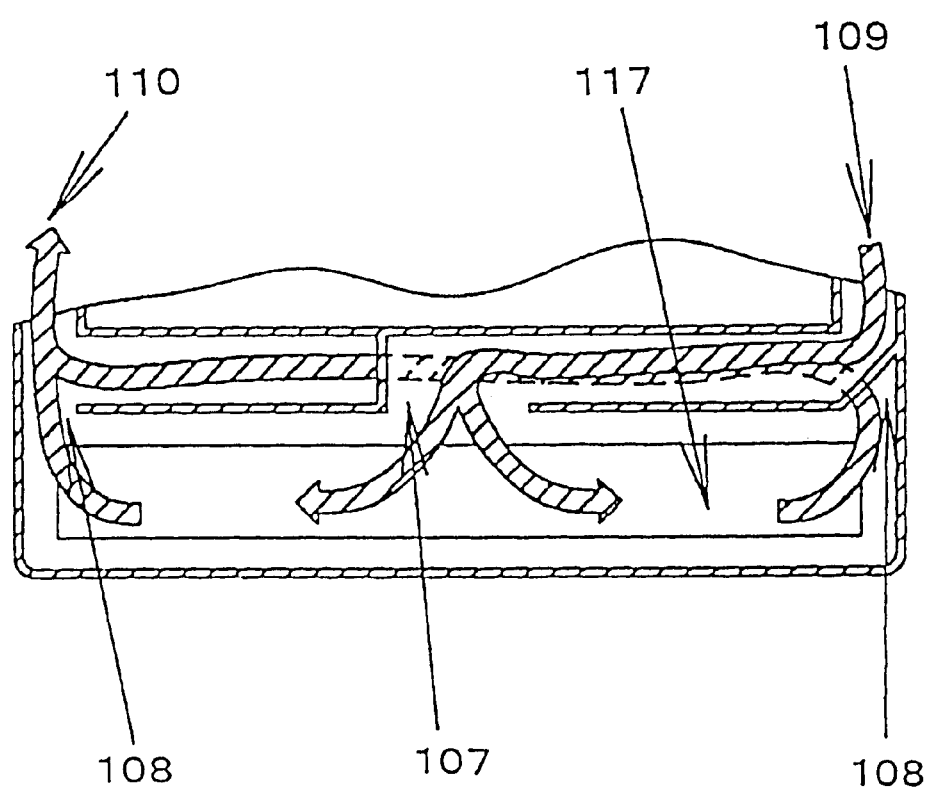
FIG. 17 is a diagram showing air flow around a suction unit in yet another example of the vacuum cleaner in accordance with the fourth aspect.

Moreover, as shown in FIG. 17, intake units 108 may be provided at right and left ends of the suction unit 117, and an exhaust unit 107 may be installed in the middle of the intake units 108, in which the exhaust 109 blown onto the floor from the middle exhaust unit 107 of the suction unit 117 is divided into two portions, each circulating into the intake units 108 at both ends of the suction unit 117. As a result, the dust collecting capacity near the central area of the suction unit 117 is enhanced, and the vacuum cleaner may be easily manipulated.

Figure 18:
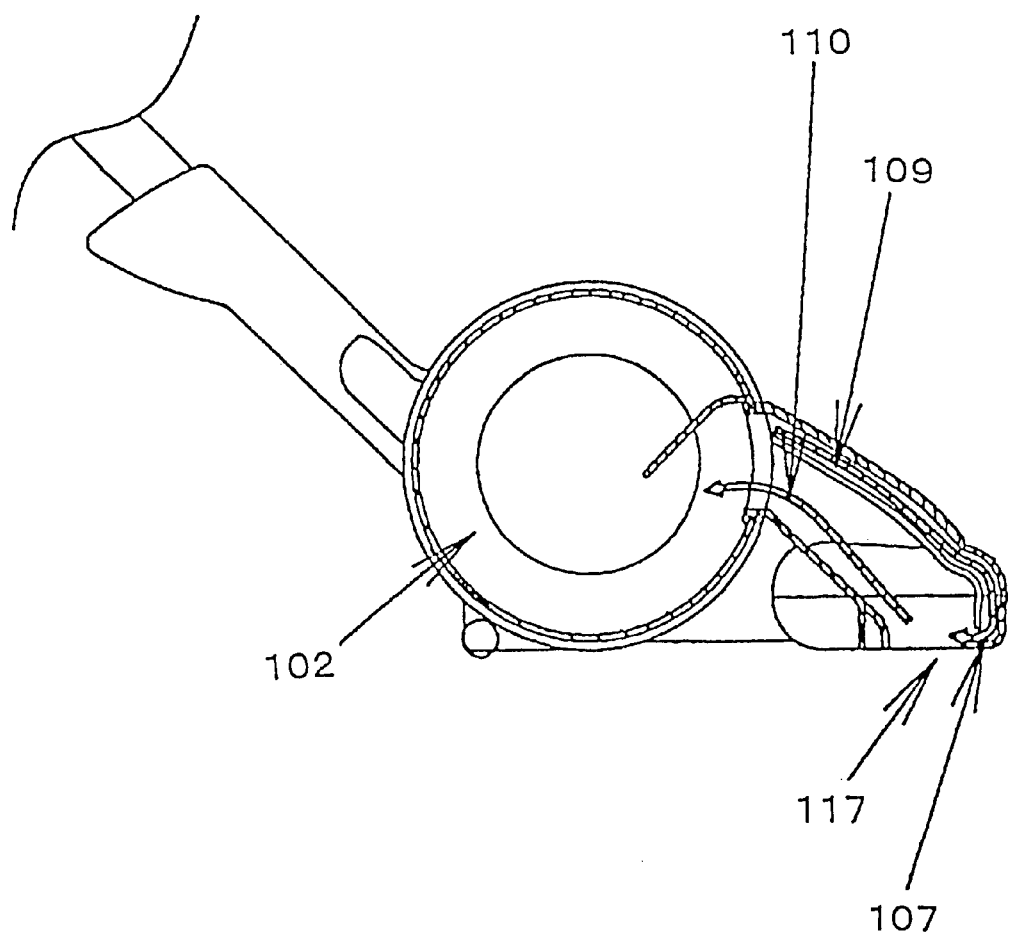
FIG. 18 is a side sectional view of a vacuum cleaner according to a fifth aspect of the invention.
Figure 19:
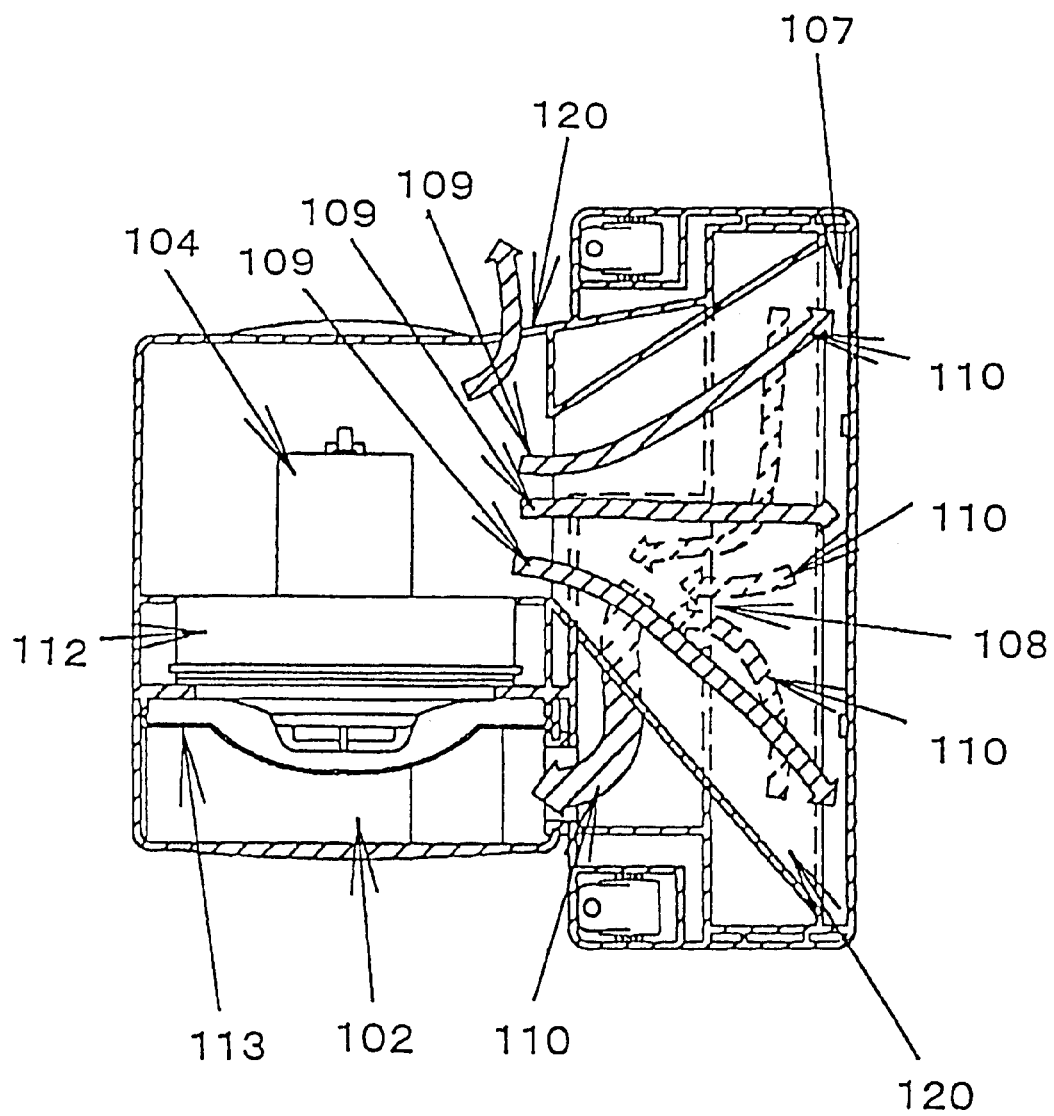
FIG. 19 is a sectional view in accordance with the vacuum cleaner of the fifth aspect.

A fifth aspect of the invention is described while referring to FIG. 18 and FIG. 19.

As shown in FIG. 18 and FIG. 19, an exhaust unit 107 is provided nearly over the entire width of the suction unit 117, ahead of the suction unit 117. An intake unit 108 is provided behind the suction unit 117, so that the exhaust 109 is diffused from the exhaust unit 107 in the width direction from ahead of the suction unit 117 and blown onto the floor. The construction is otherwise the same as that in accordance with the second aspect, and the same constituent members are identified with same reference numerals, and repeated description is omitted.

In this construction, by the exhaust 109, the dust particles on the floor over the entire width of the suction unit 117 are uniformly blown away and lifted from the floor. As a result, the dust blowing effect by the exhaust 109 takes place over a wide range, and thus the dust can be uniformly cleaned from a wide area of a floor.

Figure 20:
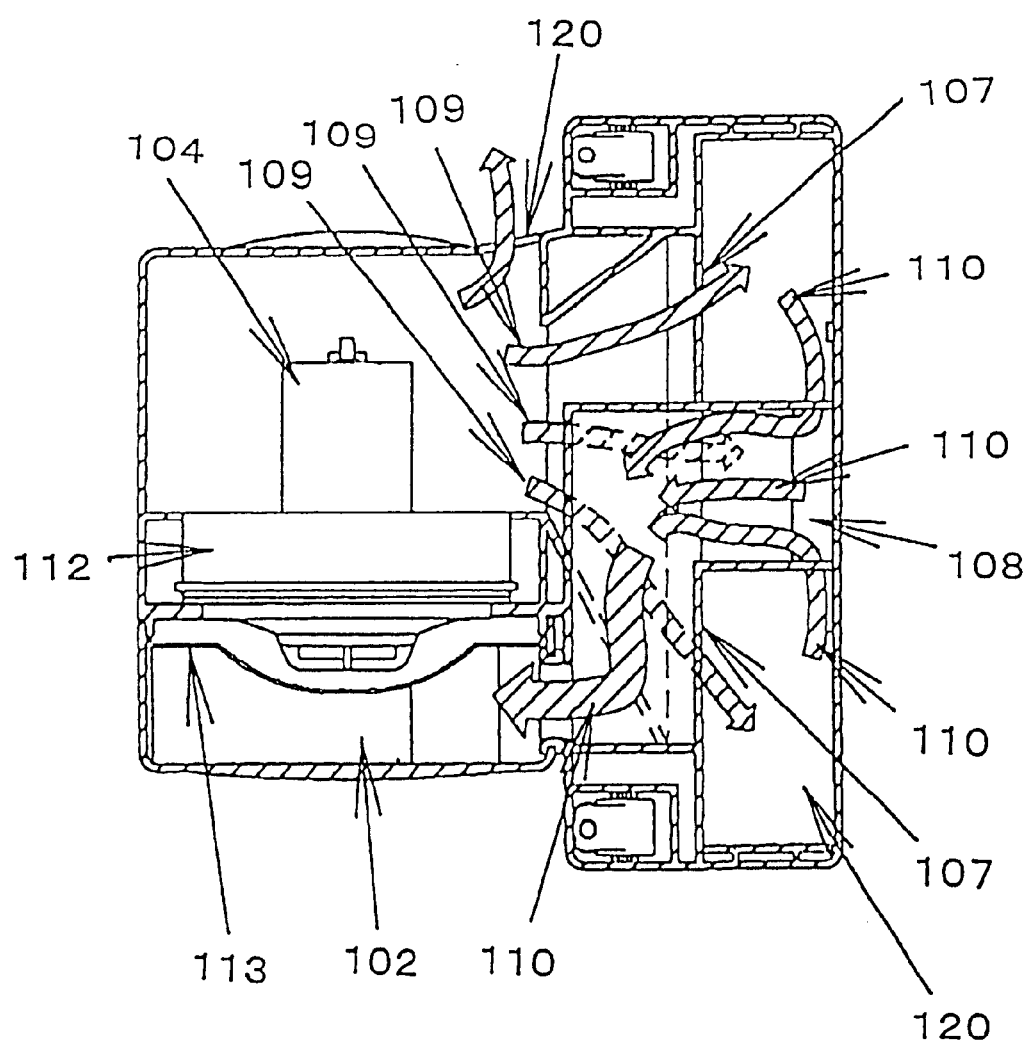
FIG. 20 is a sectional view of another example of the vacuum cleaner in accordance with the fifth aspect.

Or, as shown in FIG. 20, an exhaust unit 107 is provided nearly over the entire width of the suction unit 117, behind the suction unit 117, and an intake unit 108 is provided ahead of the suction unit 117, so that the exhaust 109 is diffused from the exhaust unit 107 in the width direction from behind the suction unit 117 and blown onto the floor. In this construction, too, by the exhaust 109, the dust particles on the floor over the entire width of the suction unit 117 are uniformly blown away and lifted from the floor.

Figure 21:
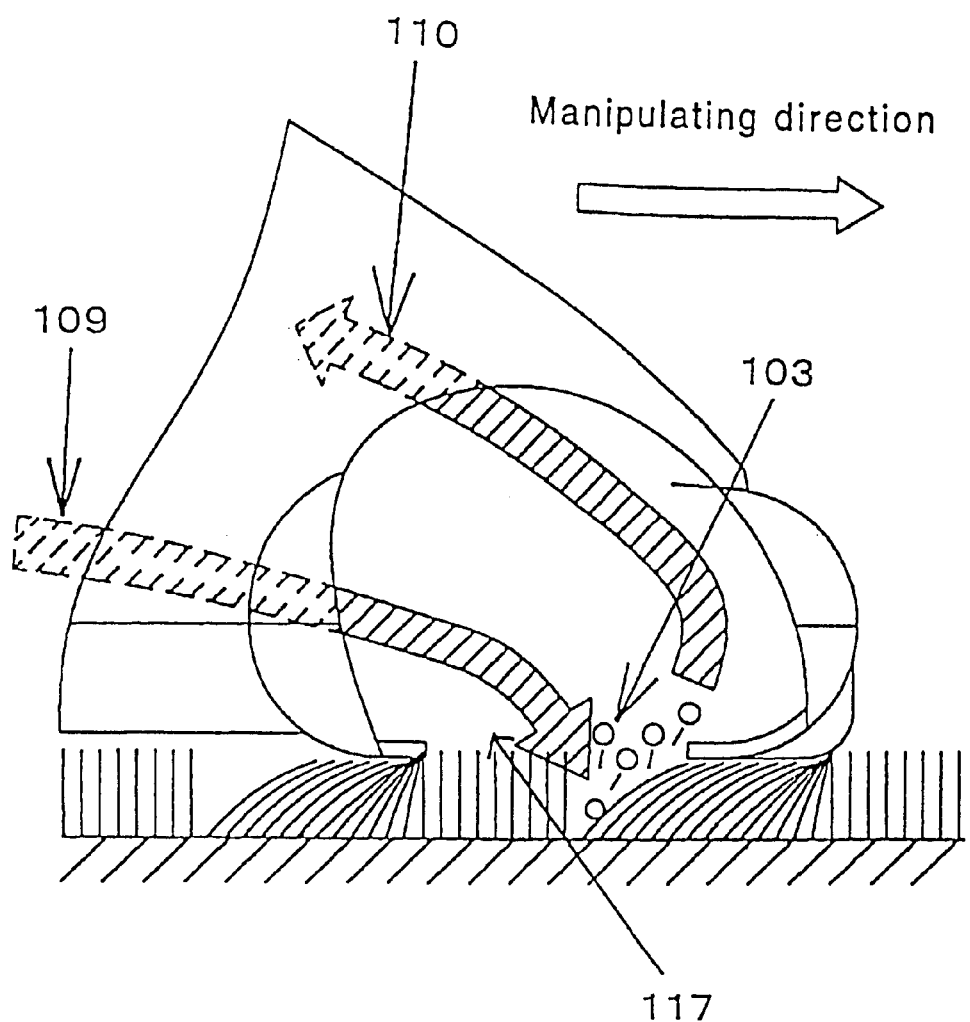
FIG. 21 is a relation diagram of a manipulating direction of a suction tool of the vacuum cleaner and carpet pile inclination.

At this time, as shown in FIG. 21, by manipulation of the vacuum cleaner, as the suction unit 117 advances, the deflecting direction of carpet piles and the blowing direction of the exhaust 109 are the same, and thus the exhaust 109 is blown into the deepest points of the carpet piles. As a result, the dust blowing effect by the exhaust 109 takes place over a wide range, and thus the dust can be uniformly cleaned from a wide area of a floor, while the dust collection capacity is enhanced at the same time.

A sixth aspect of the invention is described below while referring to FIG. 22.

Figure 22:
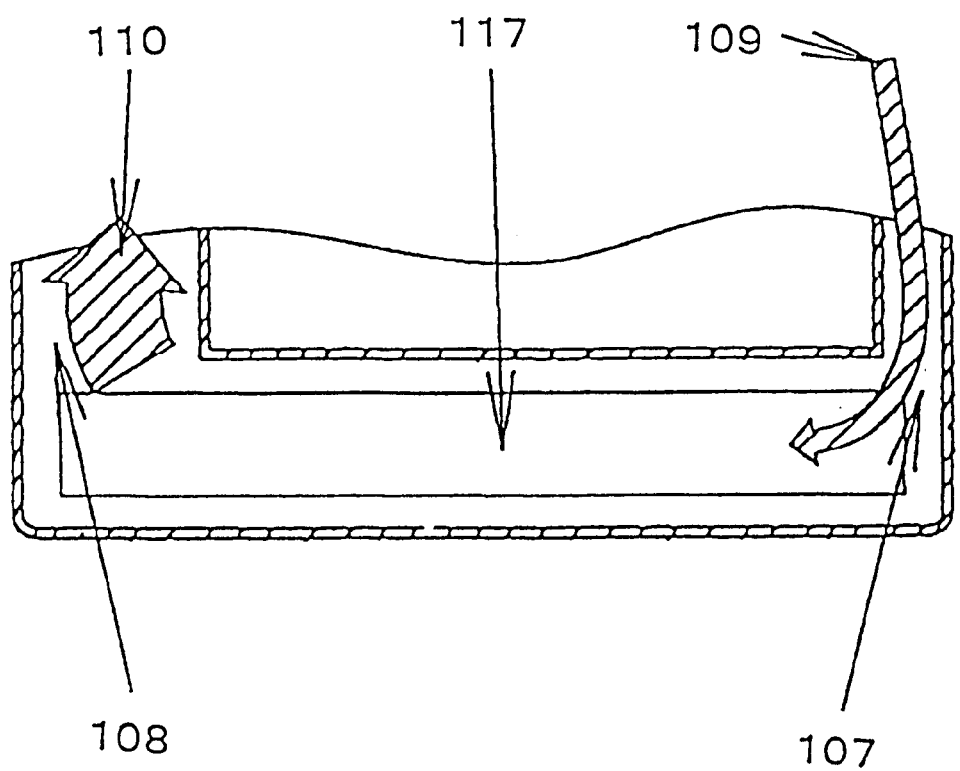
FIG. 22 is a diagram showing air flow around a suction unit of a vacuum cleaner according to a sixth aspect of the invention.

As shown in FIG. 22, the exhaust unit 107 has its opening area set narrower than the opening area of the intake unit 108, and thus the velocity of the exhaust 109 released from the exhaust unit 107 is greater than the velocity of the intake 110 sucked into the intake unit 108. The construction is otherwise the same as that of the second aspect.

In this construction, by narrowing the opening area of the exhaust unit 107, the velocity of the exhaust 109 is increased, and thus, the exhaust 109 can be blown onto the floor powerfully, whereby dust particles hidden in deepest parts of the floor in long piles of carpet can be lifted from the floor, so that the dust collection efficiency may be enhanced.

Figure 23:
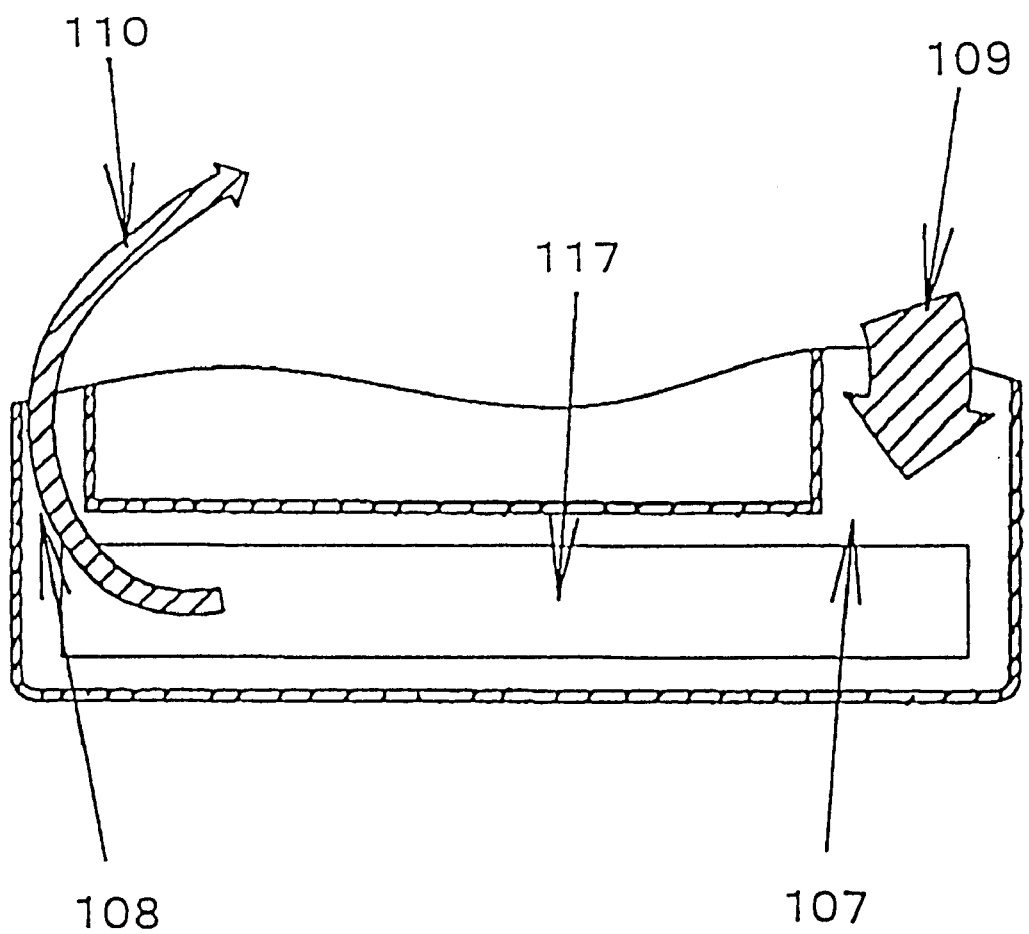
FIG. 23 is a diagram showing air flow around a suction unit according to another example of the vacuum cleaner in accordance with the sixth aspect.

Or, as shown in FIG. 23, by setting the opening area of the exhaust unit 107 wider than the opening area of the intake unit 1 released from the exhaust unit 107 is less than the velocity of the intake 110 sucked into the intake unit 108, and thus it is possible to prevent scatter of dust to the exterior of the suction unit 117 due to excessive velocity of the exhaust 109 blown onto the floor.

By having the velocity of the exhaust 109 released from the exhaust unit 107 be nearly the same as the velocity of the intake wind 110 sucked into the intake unit 1 is blown to the floor to lift the dust from the floor, and the dust collection efficiency is enhanced, while the velocity of the air stream formed from the exhaust unit 107 to the intake unit 108 is stabilized, so that the dust lifted from the floor can be smoothly collected by the intake unit 108.

Figure 24:
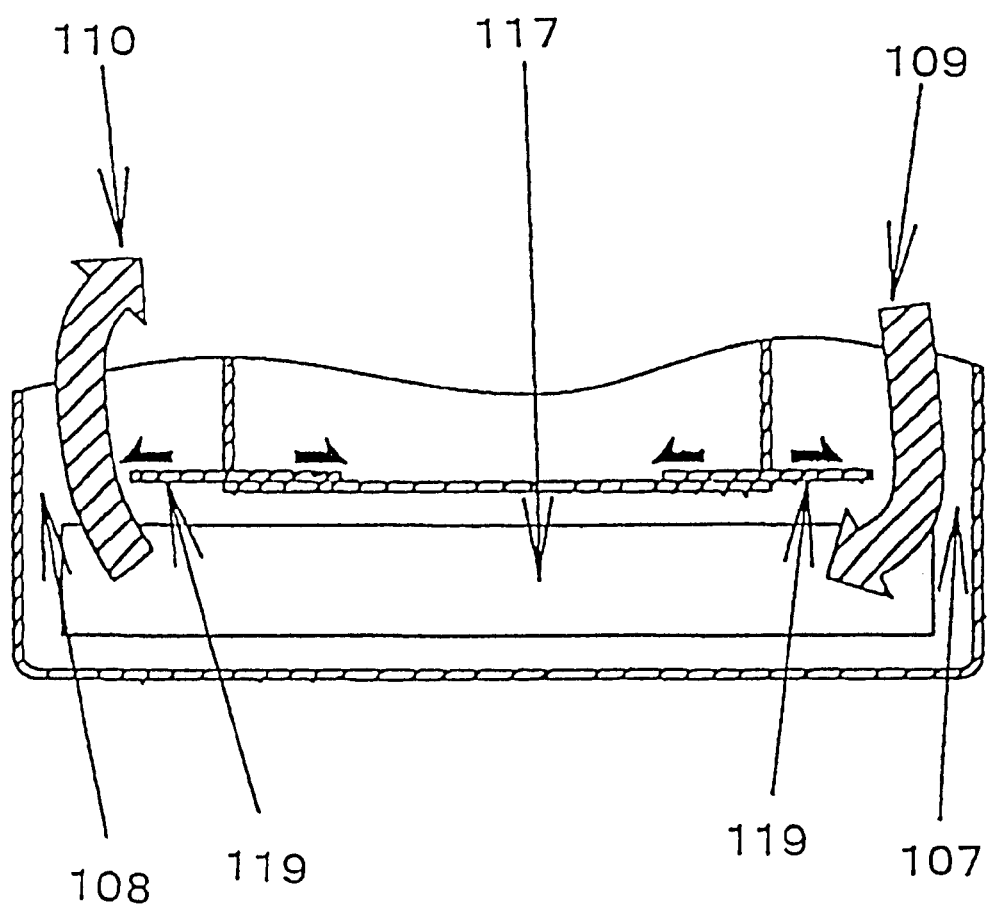
FIG. 24 is a diagram showing air flow around a suction unit according to yet another example of the vacuum cleaner in accordance with the sixth aspect.

Further, as shown in FIG. 24, air flow rate adjusting valves 119 are provided near the exhaust unit 107 and intake unit 108. These valves are slidable in the lateral direction, and thus the opening area of the exhaust unit 107 and intake unit 108 is freely adjusted. By adjusting the velocity of the exhaust 109 released from the exhaust unit 107, and/or the velocity of the intake 110 sucked into the intake unit 108 for example, on a carpet floor, the air flow rate adjusting valve 119 at the exhaust unit 107 side is throttled and the air flow rate adjusting valve 119 at the intake unit 108 side is opened to increase the velocity of the exhaust 109, and thus dust caught in long piles is lifted and the dust collection performance is enhanced. On a wooden floor, to the contrary, by opening the air flow rate adjusting valve 119 at the exhaust unit 107 side and throttling the air flow rate adjusting valve 119 at the intake unit 108 side, scattering of the dust on the floor to surrounding areas of the floor is suppressed.

Figure 25:
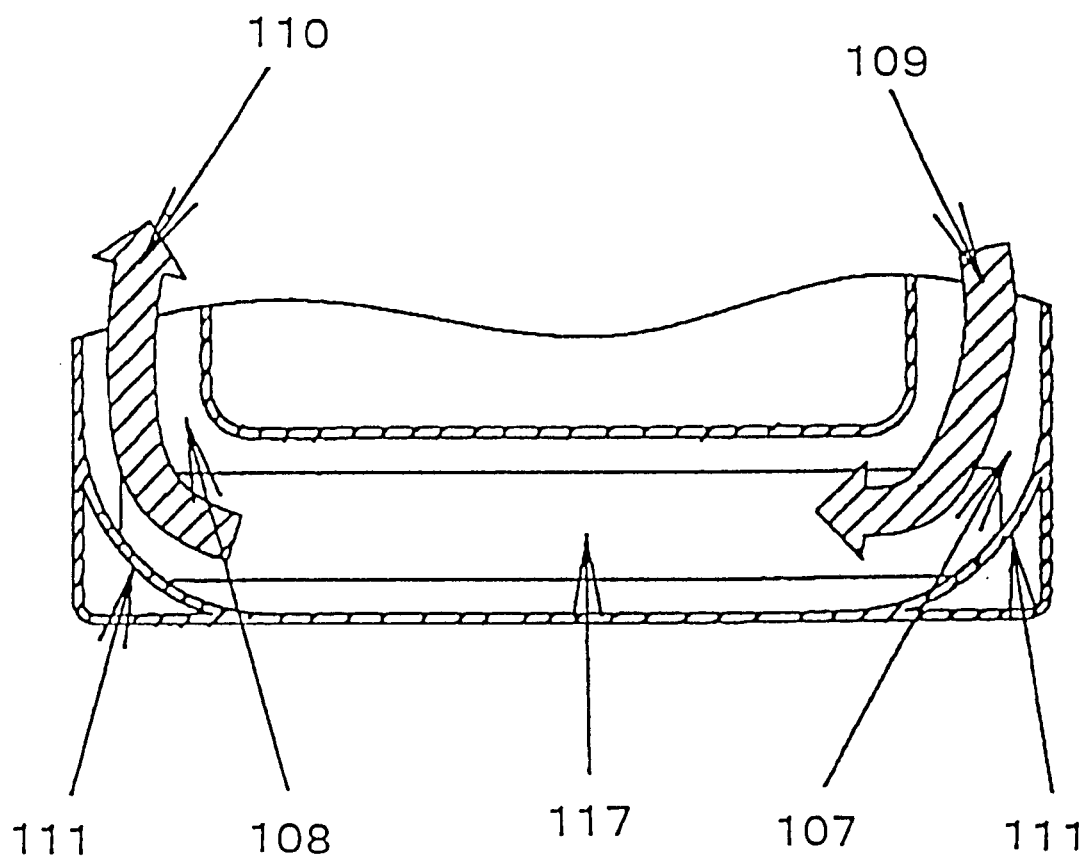
FIG. 25 is a diagram showing air flow around a suction unit according to still another example of the vacuum cleaner in accordance with the sixth aspect.

Moreover, as shown in FIG. 25, by installing guide walls 111 for smoothly guiding the exhaust 109 and the intake 110 near the exhaust unit 107 and intake unit 1 is guided in the direction toward the intake unit 108 by the guide wall 111 provided near the exhaust unit 107, and the intake 110 is guided in the direction toward the intake unit 108 by the guide wall 111 provided near the intake unit 108, and therefore the exhaust 109 smoothly flows into the intake unit 108, whereby the air stream in the suction unit 117 is stabilized and the dust lifted from the floor by the exhaust 109 can be smoothly collected by the intake unit 108.

A seventh aspect of the invention is described below while referring to FIG. 26.

Figure 26:
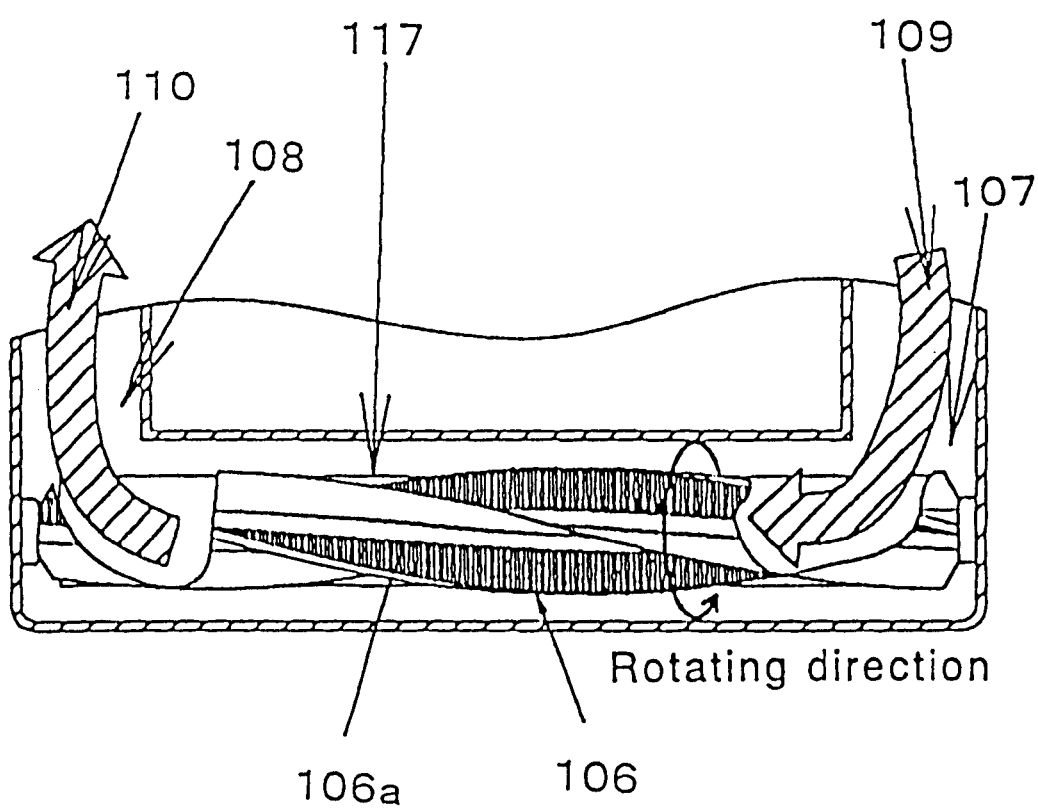
FIG. 26 is a diagram showing air flow around a suction unit of a vacuum cleaner according to a seventh aspect of the invention.

As shown in FIG. 26, a brush body 106 is rotatably or oscillatably provided, and a dust scraper 106a in a band form is spirally wound around this brush body 106. The air stream along the twist of the dust scraper 106a generated by rotation of the brush body 106, and the air stream flowing from the exhaust unit 107 to the intake unit 108 are matched in direction. The construction is otherwise the same as that of the second aspect.

In this construction, the floor dust lifted by the exhaust 109 from the exhaust unit 107 advances into the intake unit 108 along the running direction of the air stream conforming to the twist of the dust scraper 106a generated by rotation of the brush body 106, and thus as the dust collides against the dust scraper 106a flow of dust is not blocked but is carried into the intake unit 108. As a result, the air stream and dust flow in the suction unit 117 are smooth, and the dust collection performance is enhanced.

An eighth aspect of the invention is described below while referring to FIG. 27 to FIG. 31.

As shown in FIG. 27 to FIG. 31, in a nearly cylindrical cleaner main body 215 a dust collection chamber 216, a dust filter 217, and a blower 218 are disposed in parallel in the longitudinal direction from one end of the main body.

Ahead of the cleaner main body 215, there is an intake port 219 for sucking dust, and dust that is sucked from the intake port 219 is captured inside the dust collection chamber 216. The exhaust discharged from the inside of the dust collection chamber 216 is discharged to the exterior of the dust collection chamber, or is discharged into the intake port 219 from behind the blower 218. A motor 220 rotates, via a belt 222, a brush body 221 provided near the intake port 219.

At one end of the cleaner main body 215, a dust collection chamber cover 223 is provided, and an upper housing 224 comprising the housing of the cleaner main body 215 is provided at the other end.

On an outer circumference 225 of the nearly cylindrical cleaner main body 215, there is a nearly cylindrical handle arm body 227 that rotates on the outer circumference 225 of the cleaner main body 215, with a center of rotation 226 being nearly in the center of the cleaner main body 215. The handle arm body 227 rotates the intake port 219 of the cleaner main body 215 so that the intake port 219 may always remain almost parallel with the floor. The outside diameter of the handle arm body 227 is nearly the same as the diameter of the outer circumference 225 of the cleaner main body 215, and a bar protrusion 228 projects from the outer circumference of the handle arm body 227. Plural extension tubes 229 made of pipes and the like are inserted into the end of the protrusion 228, and a gripping handle 230 which is held when manipulating the cleaner main body 215 is formed at the leading end of the extension tubes 229.

In this construction, the nearly cylindrical handle arm body 227 is similar in shape to the outer circumference 225 of the nearly cylindrical cleaner main body 215, and therefore, by eliminating unevenness in design, size can be reduced. Moreover, since the outside diameter of the rotating handle arm body 227 is nearly same as the diameter of the outer circumference 225 of the cleaner main body 215, if a large impact is applied to the handle arm body 227, the handle arm body is not broken, and thus strength may be enhanced.

In performing a cleaning operation, when moving the cleaner main body 215 back and forth by holding the gripping handle 230 of the handle arm body 227, the reciprocal moving distance is longer, and thus the number of times of performing a reciprocating motion is decreased, whereby the ease of handling is improved.

Figure 29:
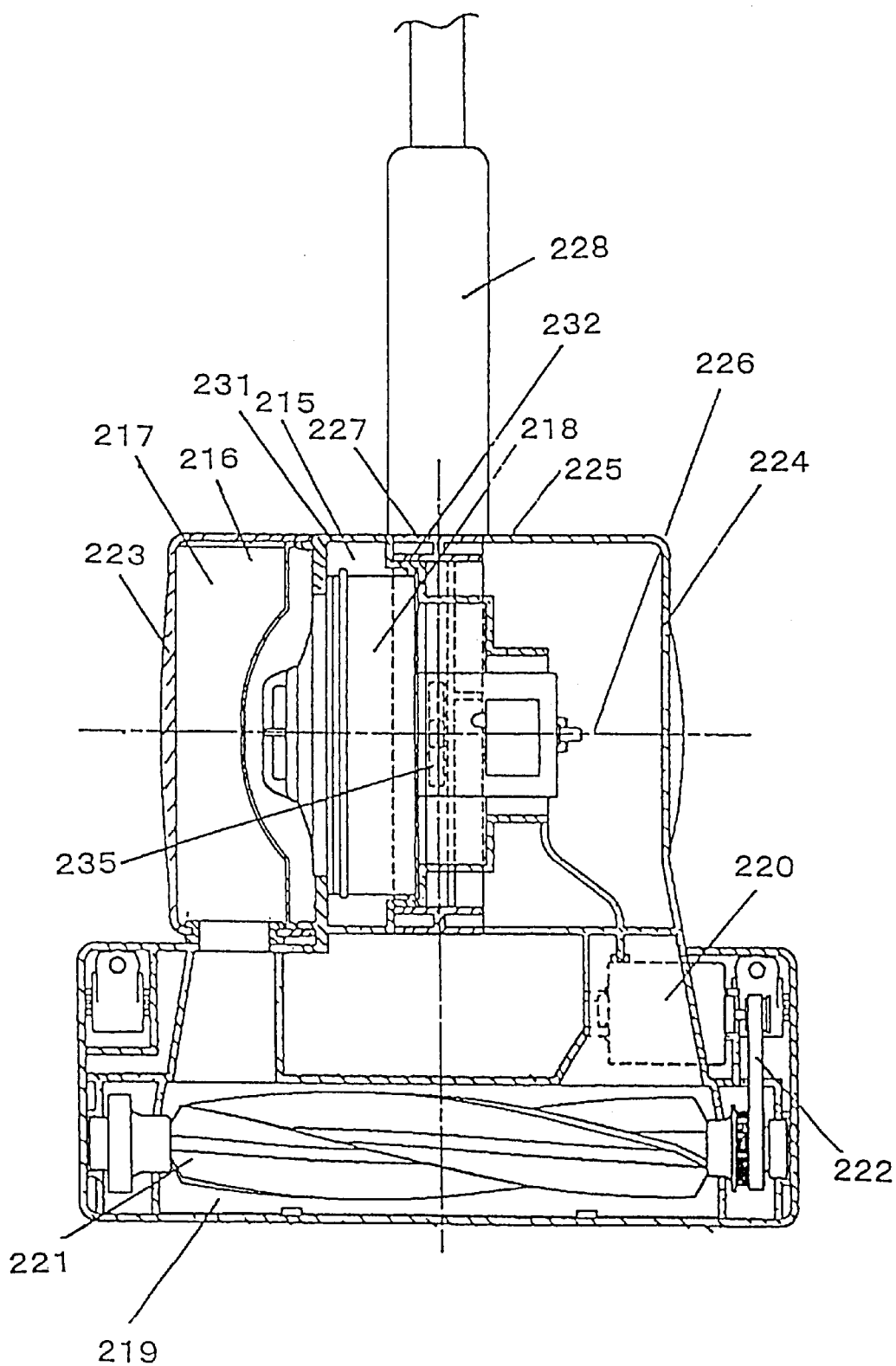
FIG. 29 is a sectional view along line VII—VII in FIG. 28.

Moreover, as shown in FIG. 29, by positioning the handle arm body 227 nearly in the center in the longitudinal direction of the cleaner main body 215, the blower 218 is disposed inside of the handle arm body 227. With this construction, when carrying the cleaner main body 215 by holding the bar protrusions 228 projecting from the handle arm body 227, since the handle arm body 227 is positioned nearly in the center of the cleaner main body 215, the weight balance of the cleaner main body 215 is improved, and thus it is easy to carry.

Further, dead space is not required for arranging the dust collection chamber 216 and blower 218 in the cleaner main body 215, and thus the entire cleaner main body 215 may be reduced in size and weight.

Figure 30:
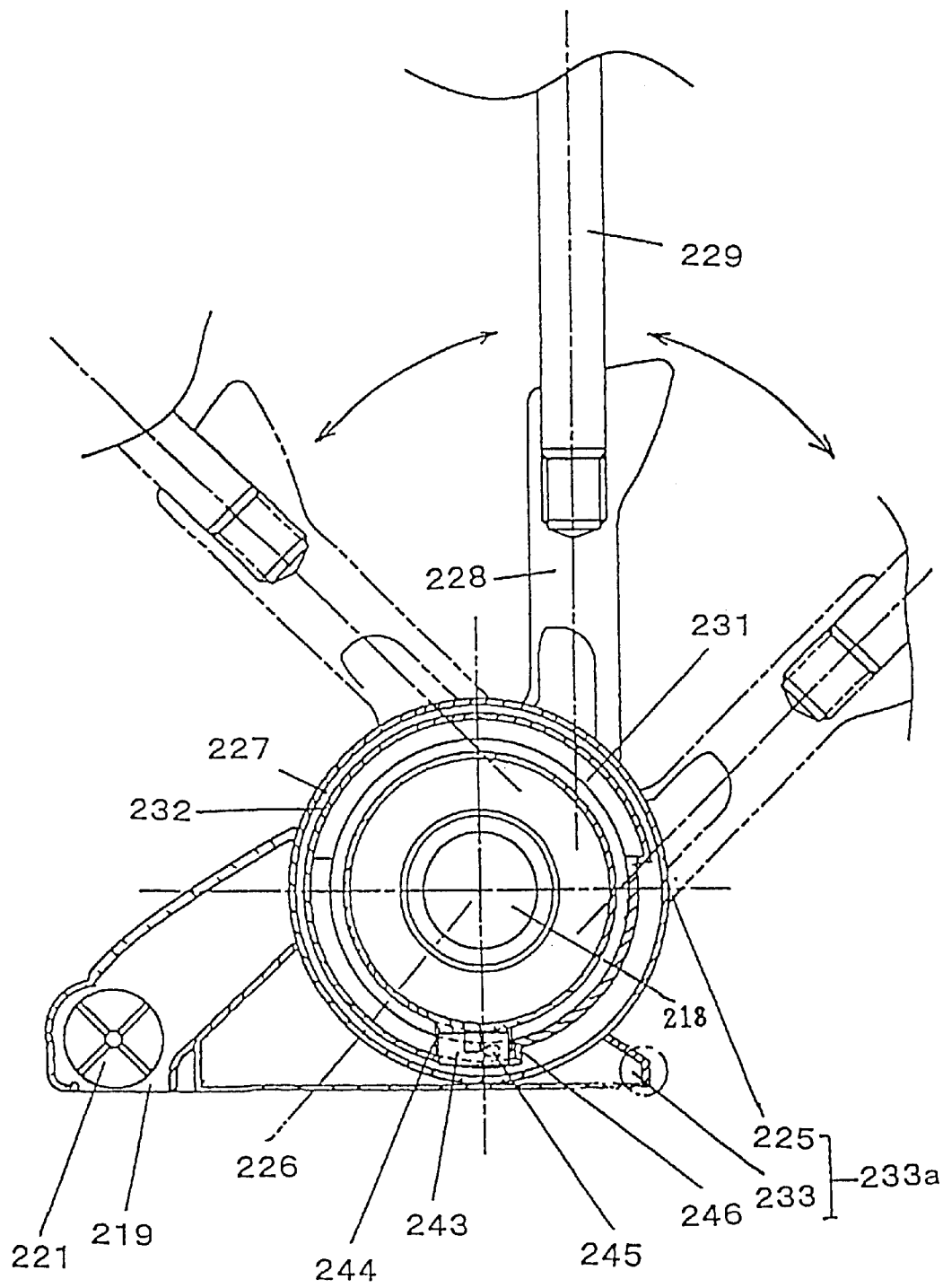
FIG. 30 is a sectional view along line VIII—VIII in FIG. 28.

Besides, as shown in FIG. 29 and FIG. 30, the outer circumference of a cover 231 for covering the outer circumference of the blower 218 is used as a support shaft 232, and the handle arm body 227 slides on the support shaft 232. A part of the cover 231 forms the housing of the cleaner main body 215, and it is fixed by the dust chamber cover 223 and upper housing 224 disposed at both ends of the cover 231, respectively. With this construction, the rotation mechanism of the handle arm body 227 is realized by two parts, that is, the handle arm body 227 and the cover 231, and thus the rotation mechanism can be formed easily without using complicated parts.

Figure 27:
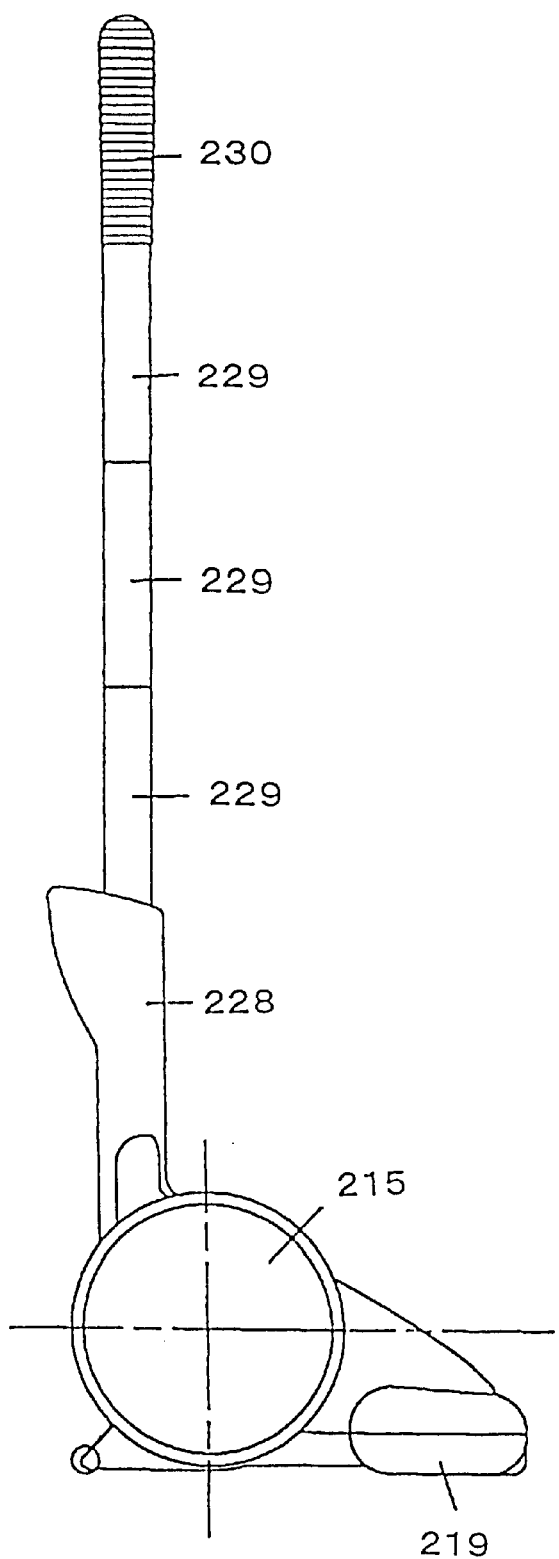
FIG. 27 is a side view of a vacuum cleaner according to an eighth aspect of the invention.
Figure 28:
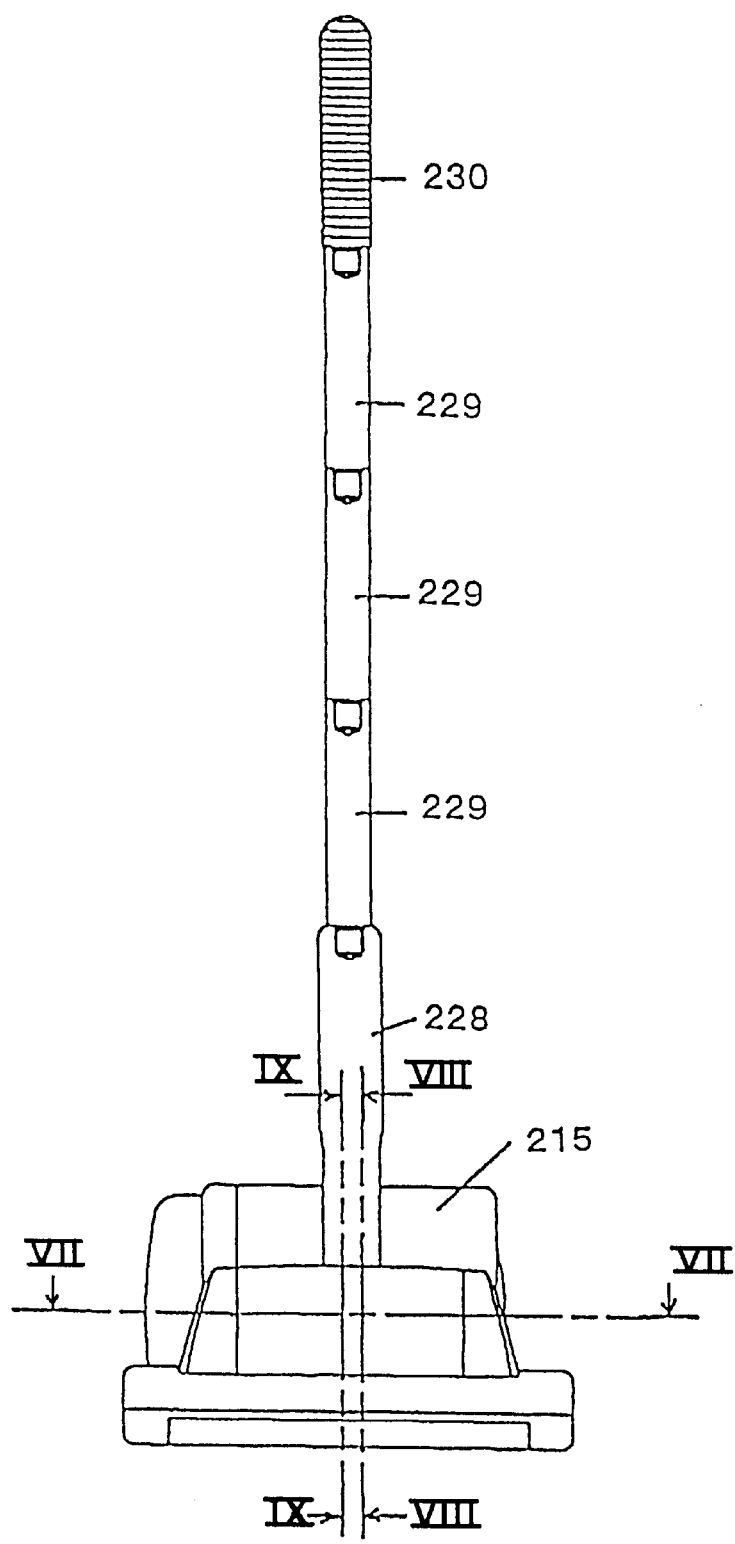
FIG. 28 is a front view of a vacuum cleaner in accordance with the eighth aspect.
Figure 31:
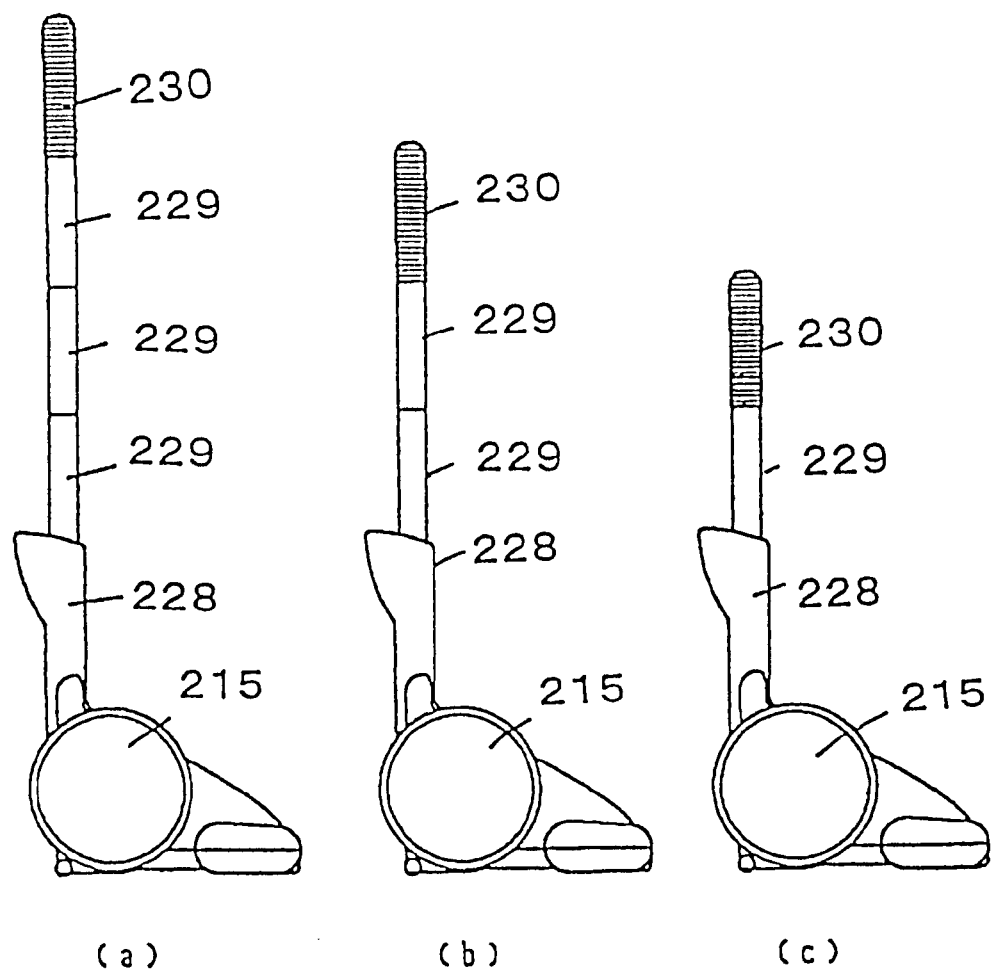
FIG. 31(a) is a side view showing a state of connecting two extension tubes to the vacuum cleaner in accordance with the eighth aspect.
FIG. 31(b) is a side view showing a state of connecting one extension tube to the vacuum cleaner in accordance with the eighth aspect.
FIG. 31(c) is a side view showing a state of connecting only a handle to the vacuum cleaner in accordance with the eighth aspect.

As shown in FIG. 27 and FIG. 28, male threads or female threads are formed at the leading ends of the bar protrusion 228 projecting from the handle arm body 227, plural extension tubes 229 made of pipes and the like, and griping handle 230, whereby these elements are designed to be detachable. With this construction, as shown in FIG. 31, depending on the convenient height of use for the user, the number of extension tubes 229 may be varied, and the holding height of the gripping handle 230 can be adjusted, whereby the ease of handling is enhanced. Still more, by detaching the extension tubes 229 and gripping handle 230, it is possible to store these elements in a small space.

Figure 32:
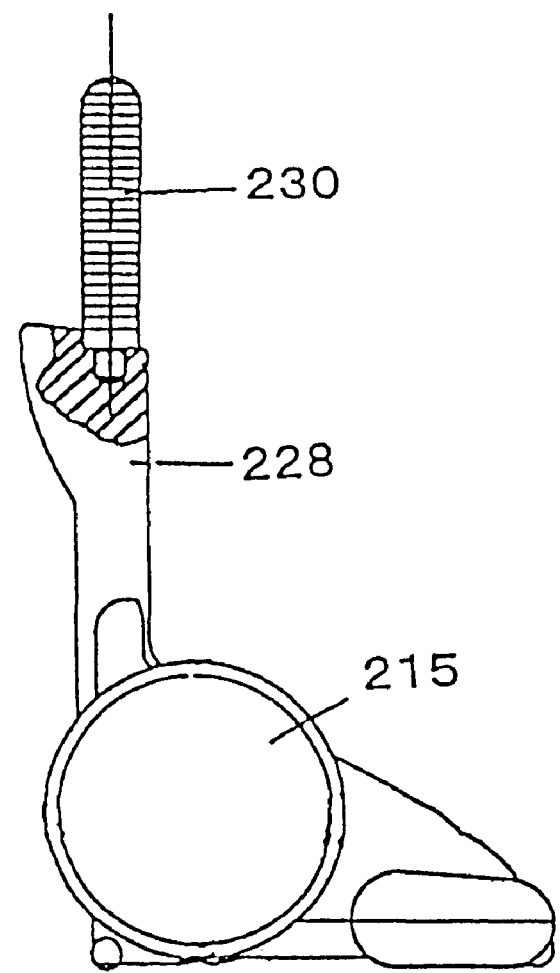
FIG. 32 is a partially cut-away side view according to another example of the vacuum cleaner in accordance with the eighth aspect.

Also as shown in FIG. 32, by detachably providing the bar protrusion 228 and the gripping handle 230 by using threads or the like, the gripping handle 230 can be connected to the protrusion 228, whereby the vacuum cleaner can be used as a handy cleaner, and the gripping handle 230 can be manipulated naturally because of its gripping property.

Figure 33:
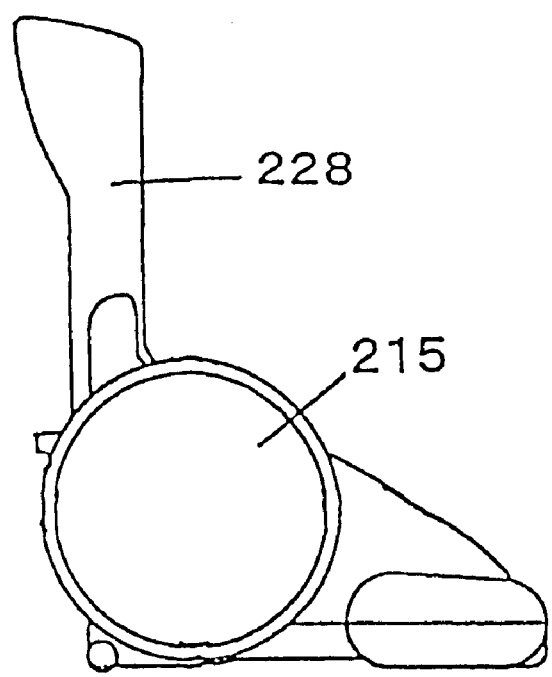
FIG. 33 is a side view according to yet another example of the vacuum cleaner in accordance with the eighth aspect.

Alternatively, as shown in FIG. 33, by using the bar protrusion 228 as a second handle, the vacuum cleaner can be securely used as a handy cleaner, as well as a sweeper type cleaner, whereby sweeping applications are extended and ease of handling is improved.

A ninth aspect of the invention is described below while referring to FIG. 34 and FIG. 35.

Figure 34:
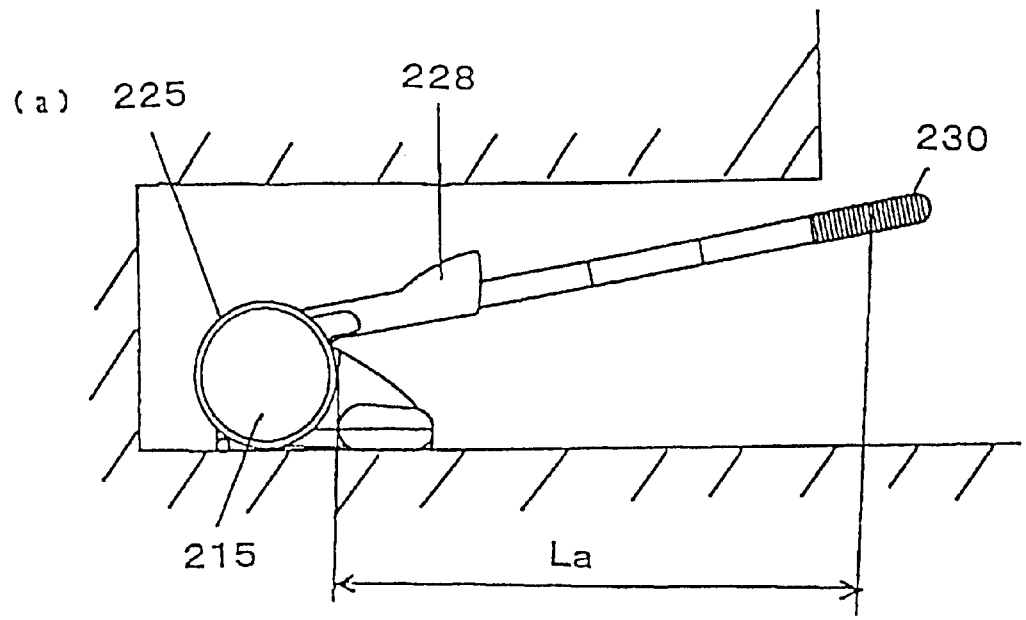
FIG. 34(a) is a diagram showing a state of use of a vacuum cleaner according to a ninth aspect of the invention.
FIG. 34(b) is a diagram showing another state of use of the vacuum cleaner in accordance with the ninth aspect.
Figure 34:
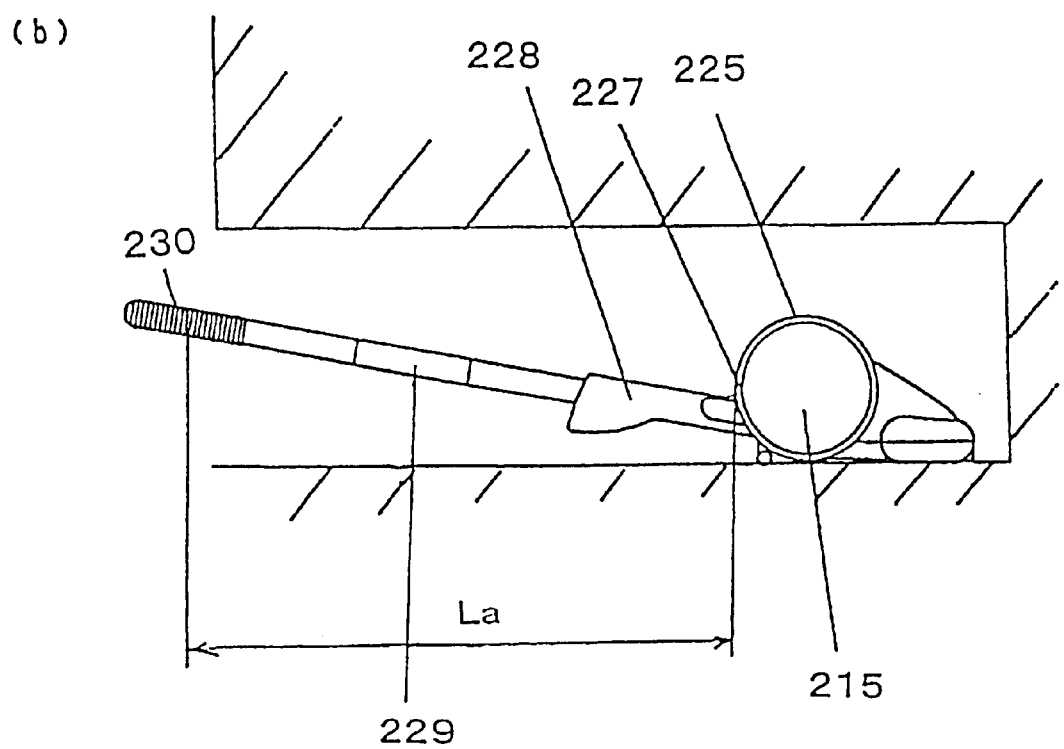

As shown in FIG. 34, a nearly cylindrical handle arm body 227 is designed to rotate in the same trajectory as the outer circumference 225 of the nearly cylindrical cleaner main body 215. The handle arm body 227 rotates largely in the longitudinal direction of the cleaner main body 215, and this rotation of the handle arm body 227 is possible until the bar protrusion 228 hits against an obstacle. The handle arm body 227 is designed to rotate about 90° to the floor in the longitudinal direction of the cleaner main body 215. The construction is otherwise the same as that in the eighth aspect.

In this construction, as shown in FIG. 34, when cleaning, for 5 example, beneath a narrow table, the length La of the extension tubes 229 may be effectively utilized, and it is possible to clean to the innermost portion of the table. It is also possible to clean from the front side or rear side of the cleaner main body 215 depending on the convenience of the user.

Figure 35:
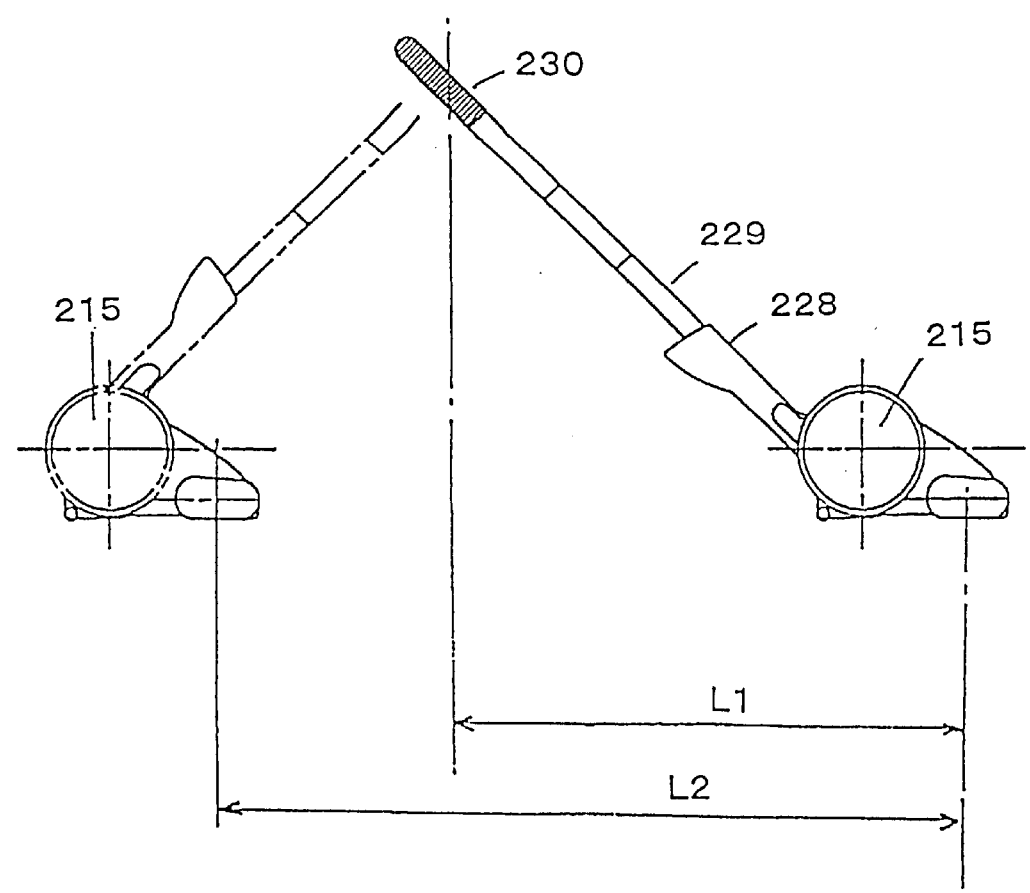
FIG. 35 is a state diagram of ordinary use of the vacuum cleaner in accordance with the ninth aspect.

As shown in FIG. 35, in the conventional cleaner main body, the rotating direction was mainly backward rotation, and the moving distance of the cleaner main body was the sum of the length of the hand of the user and the moving distance L1 of the cleaner main body. However, since the cleaner main body 215 can be rotated largely also in the forward direction, the cleaner main body 215 can be moved up to distance L2, and the floor area cleaned by one reciprocal stroke of the cleaner main body 215 is wider, and therefore, the number of times of moving the cleaner main body 215 back and forth is decreased, so that the cleaning time is shortened.

Figure 36:
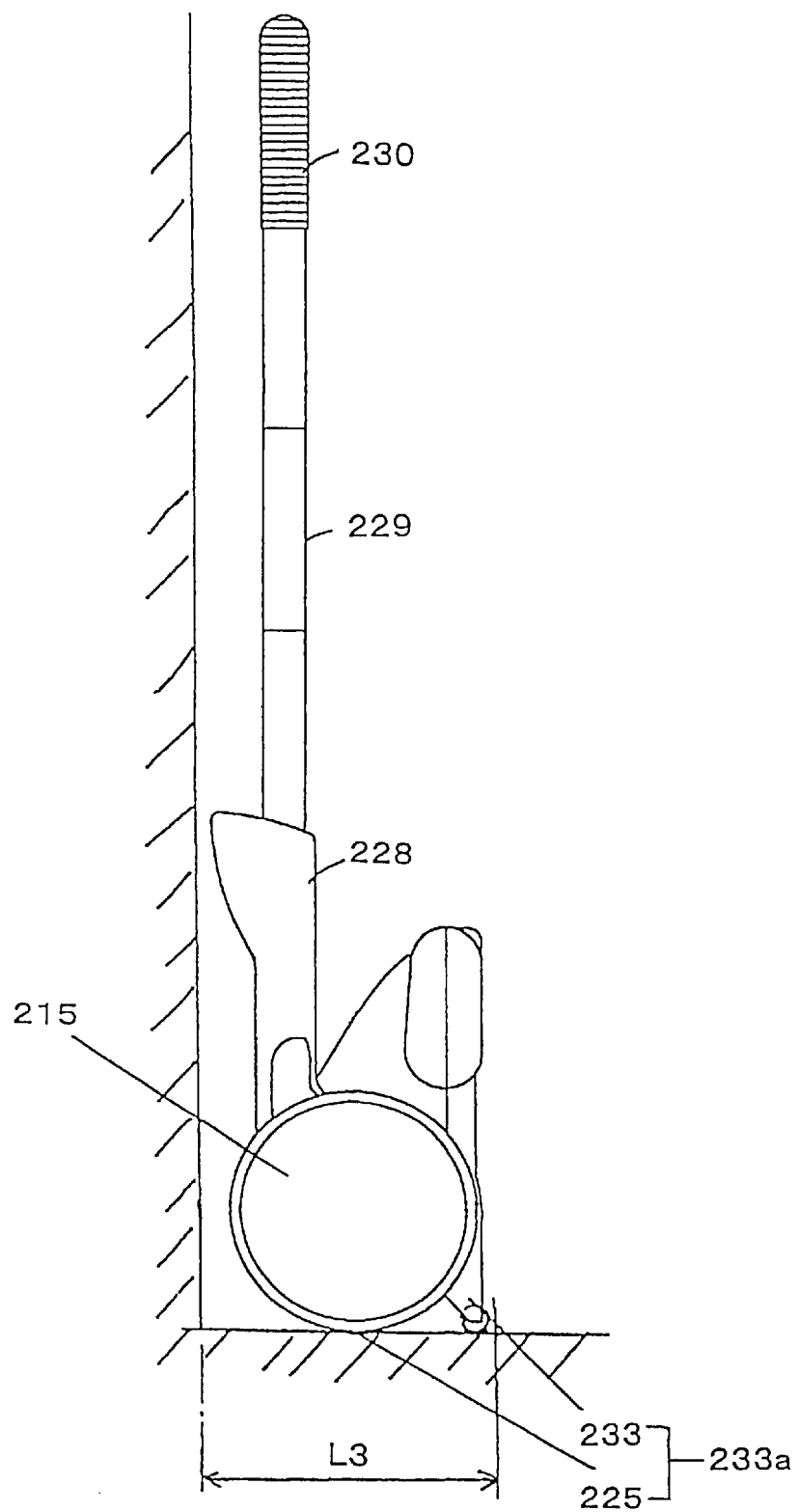
FIG. 36 is a stored state diagram of the vacuum cleaner in accordance with the ninth aspect.

Or, as shown in FIG. 36, a bump 233 is formed at a lower rear position of the cleaner main body 215, and when the cleaner main body 215 is tilted in a vertical direction relative to the floor, the bump 233 and the outer circumference 225 of the cleaner main body 215 contact the floor, whereby the bump and the cleaner main body function as heel rest 233a. Thus, the cleaner main body 215 may be tilted in the vertical direction to be set in a standing state. When storing the cleaner main body 215 in a narrow place, the cleaner main body 215 can be tilted in the vertical direction relative to the floor, and by turning the handle arm body 227 in the forward direction of the cleaner main body 215, the depth dimension L3 of the storing space can be shortened, so that storing convenience is enhanced.

A tenth aspect of the invention is described below while referring to FIG. 37 to FIG. 40.

Figure 37:
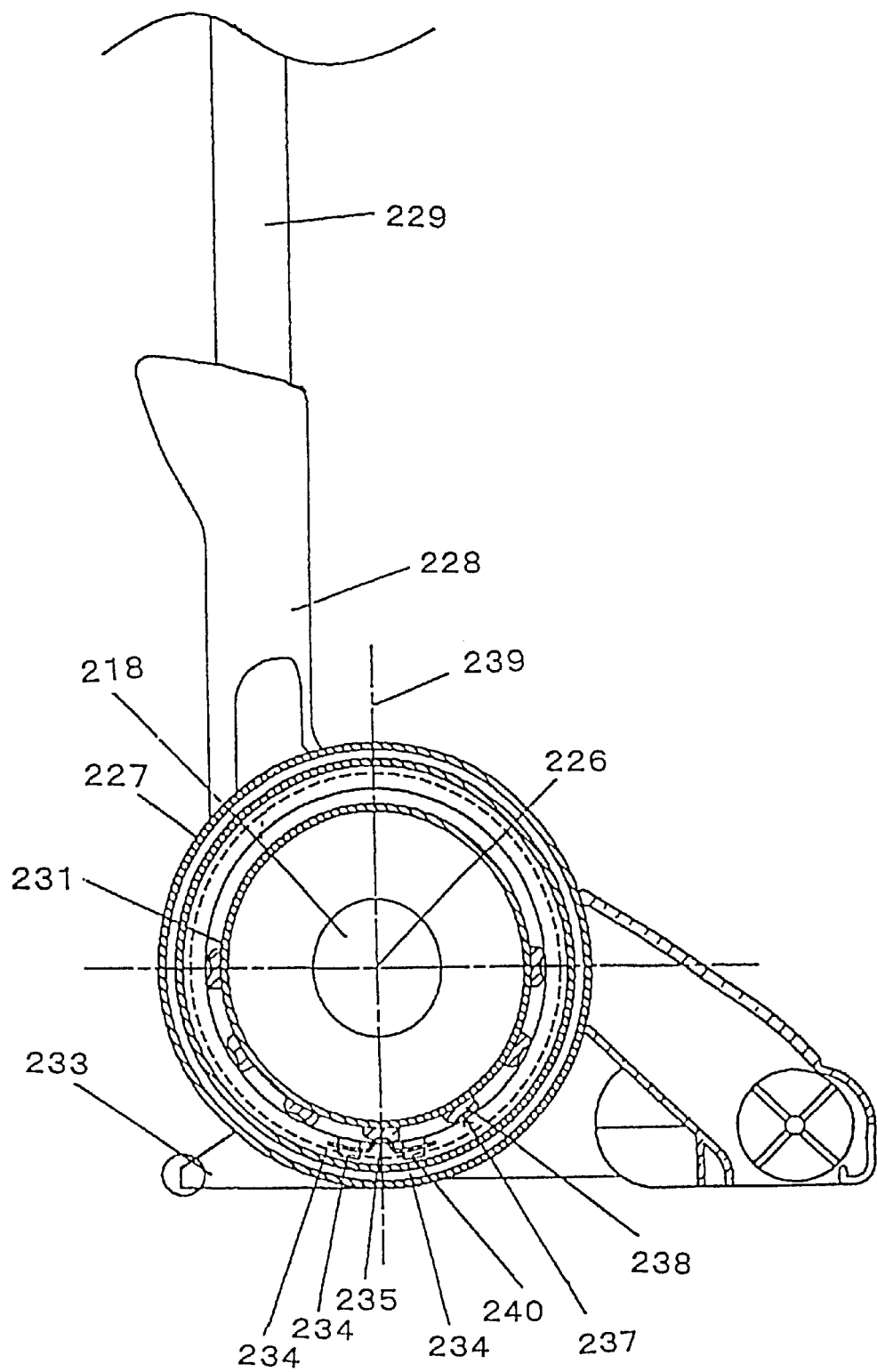
FIG. 37 is a partial sectional view of a vacuum cleaner according to a tenth aspect of the invention (sectional view along line IX—IX in FIG. 28)
Figure 38:
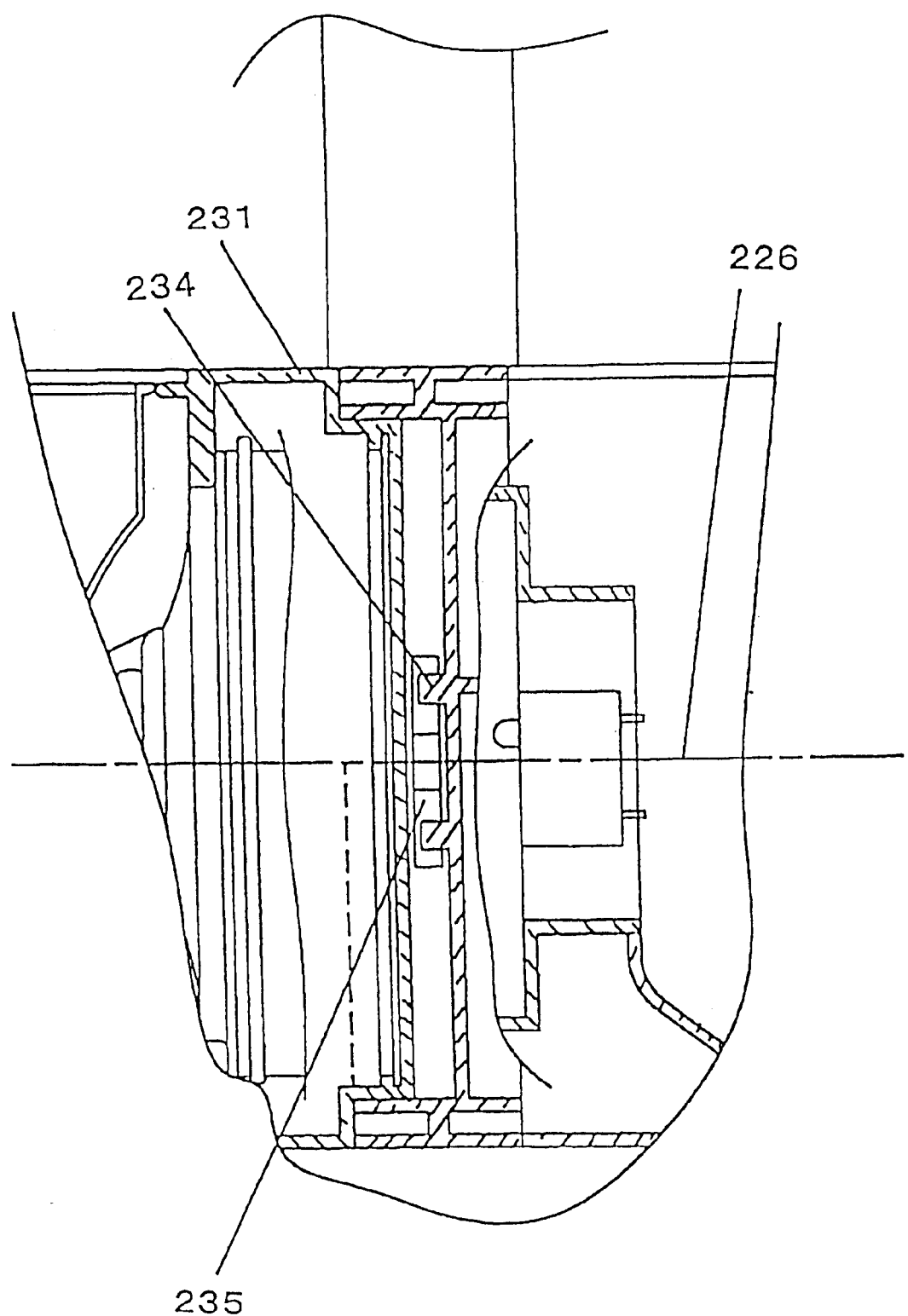
FIG. 38 is an essential sectional view of the vacuum cleaner in accordance with the tenth aspect.
Figure 39:
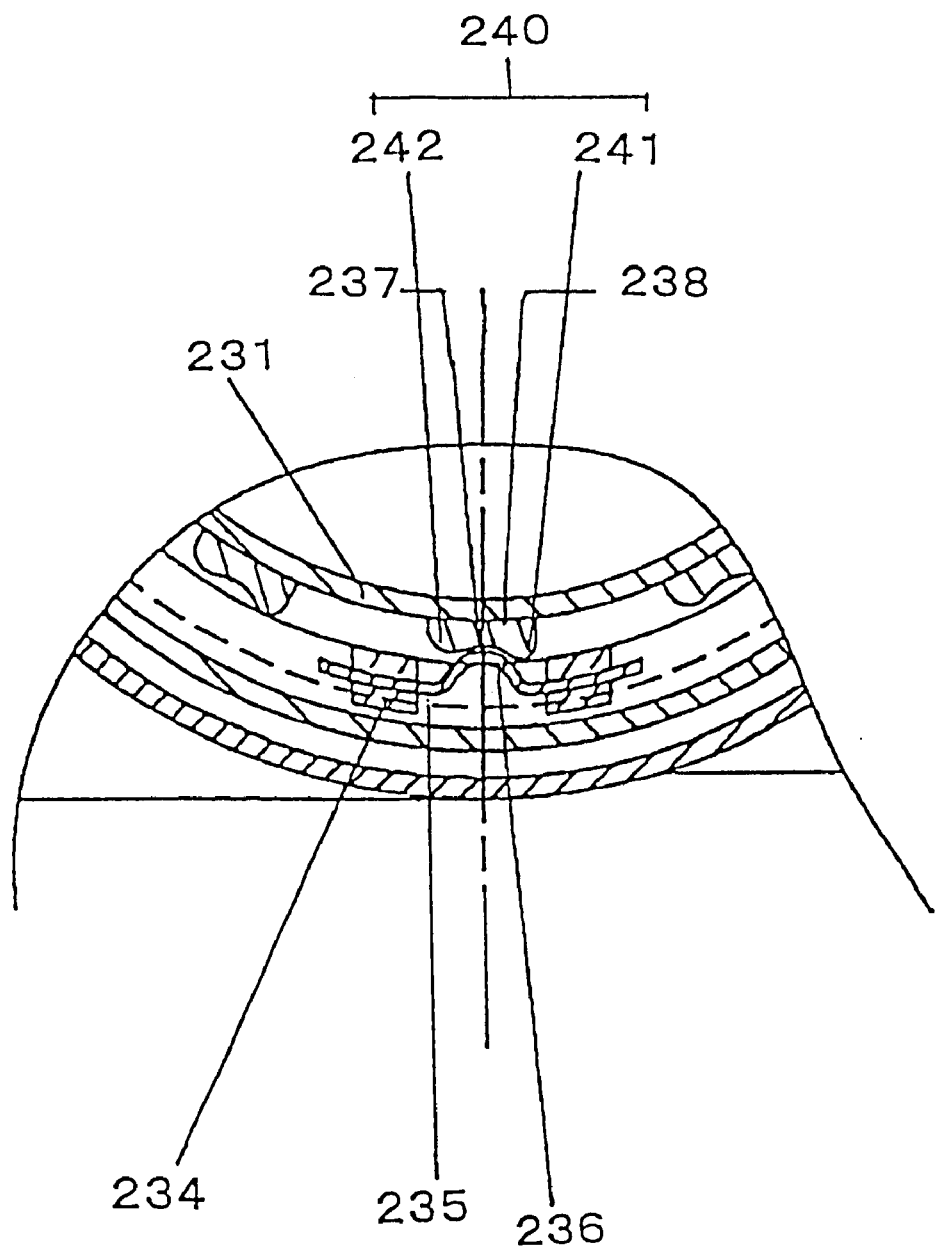
FIG. 39 is a partially magnified sectional view of the vacuum cleaner in accordance with the tenth aspect.
Figure 40:
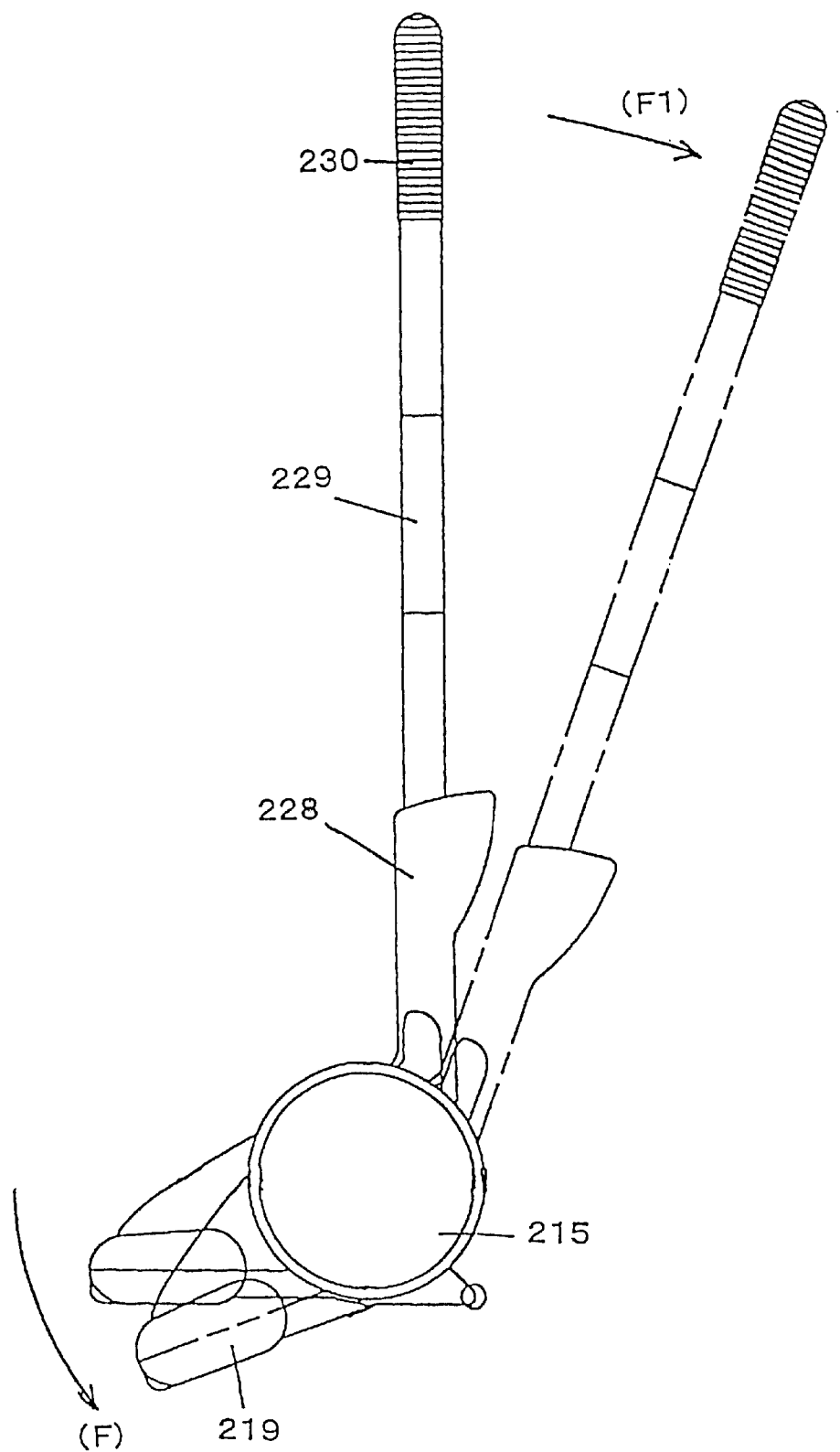
FIG. 40 is a side view showing the operating state of the vacuum cleaner in accordance with the tenth aspect.

As shown in FIG. 37 and FIG. 38, a plate spring 235 having a rib 234 is provided inside of a handle arm body 227, and this spring 235, nearly at its center, projects in a nearly arc form 236 toward the center of rotation 226 as shown in FIG. 39.

Corresponding to the nearly arc form 236 of the spring 235, a plurality of bosses 238 forming recesses 237 in the cover 231 are disposed. The spring 235 is engaged with a recess 237 and is fixed thereat, depending on the rotating position of the handle arm body 227.

The spring force resulting from fitting the nearly arc form 236 of the spring 235 into the recess 237 is set in the relation of $(F) \leq (F1)$ when the cleaner main body 215 is lifted in the air by holding the bar protrusion 228, where (F) is the force for naturally rotating the intake port 219 by the weight of the parts composing the intake port 219, and (F1) is the force of rotating the handle arm body 227 about the cleaner main body 215 by holding the handle 230. The spring force resulting from fitting the nearly arc form 236 of the spring 235 into each recess 237 is set slightly larger than (F). The construction is otherwise the same as that of the eighth aspect.

In this construction, when the cleaner main body 215 is lifted in the air by holding the handle 230, the spring 235 is thrust into any one of the plurality of recesses 237, and rotation of the handle arm body 227 is thus suppressed. Therefore when carrying the cleaner main body 215 by holding the handle 230, the handle arm body 227 is not easily rotated, and the fixed state of the cleaner main body 215 is maintained, so that it is easy to carry.

When it is desired to set the vacuum cleaner in the cleaning state, by rotating the handle arm body 227 behind the cleaner main body 215, the intake port 219 is smoothly changed to the cleaning state without following rotation of the handle arm body 227.

As shown in FIG. 37 and FIG. 39, while the bar protrusion 228 projecting from the handle arm body 227 is at a nearly vertical position relative to the floor, the nearly arc form 236 of the spring 235 is positioned on a nearly central line 239 of the cleaner main body 215, and one of the plurality of recesses 237 provided in the cover 231 receives the nearly arc form 236. Projection allowances 240 are formed at both ends of the boss 238 forming the recess 237. Supposing the forward side of the projection allowances 240 of the cleaner main body 215 to be first projection allowances 241 and the rear side of the projection allowances of the cleaner main body 215 to be second projection allowances 242, the forward side first projection allowance 241 projects slightly further to the outer side as compared with the rear side second projection allowance 242.

Figure 41:
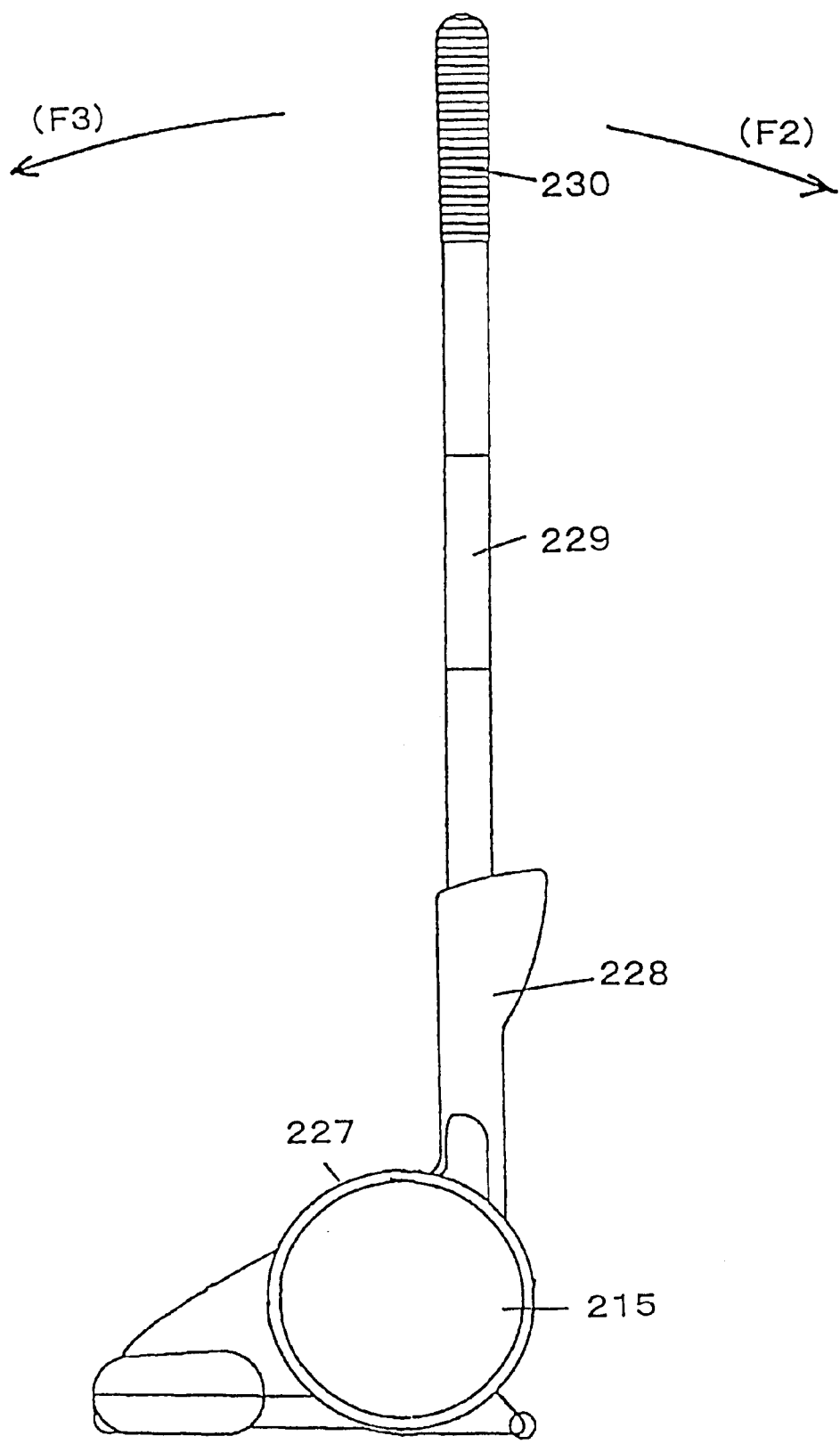
FIG. 41 is a side view showing the operating state of the vacuum cleaner in accordance with the tenth aspect.

With this construction, when the handle arm body 227 is rotated, the nearly arc form 236 of the spring 235 cooperating with the handle arm body 227 rides over the projection allowance 240. Herein, since the forward side first projection allowance 241 is projecting slightly further to the outer side as compared with the rear side second projection allowance 242, the force of the nearly arc form 236 of the spring 235 riding over the projection allowance 240 is a larger force, and therefore, as shown in FIG. 41, the force (F2) for rotating the handle arm body 227 backward of the cleaner main body 215 by the handle 230 is less than the forward rotating force (F3).

Therefore, in the usual stowing or storing time of the cleaner main body 215 with the extension tubes 229 and gripping handle 230 in a vertical state relative to the floor, the stability in the standing state is improved, so that the extension tubes 229 and gripping handle 230 may not be easily tilted or collapsed.

The operation of rotating the handle arm body 227 by holding the gripping handle 230 is often the action of rotating the cleaner main body 215 backward during actual cleaning, and if the rotating force of the handle arm body 227 changes at a position when the handle arm body 227 is in a vertical state relative to the floor, the gripping handle 230 is hardly manipulated in the vertical state relative to the floor in actual operation, so that there is no problem in operation.

An eleventh aspect of the invention is described below while referring to FIG. 42.

Figure 42:
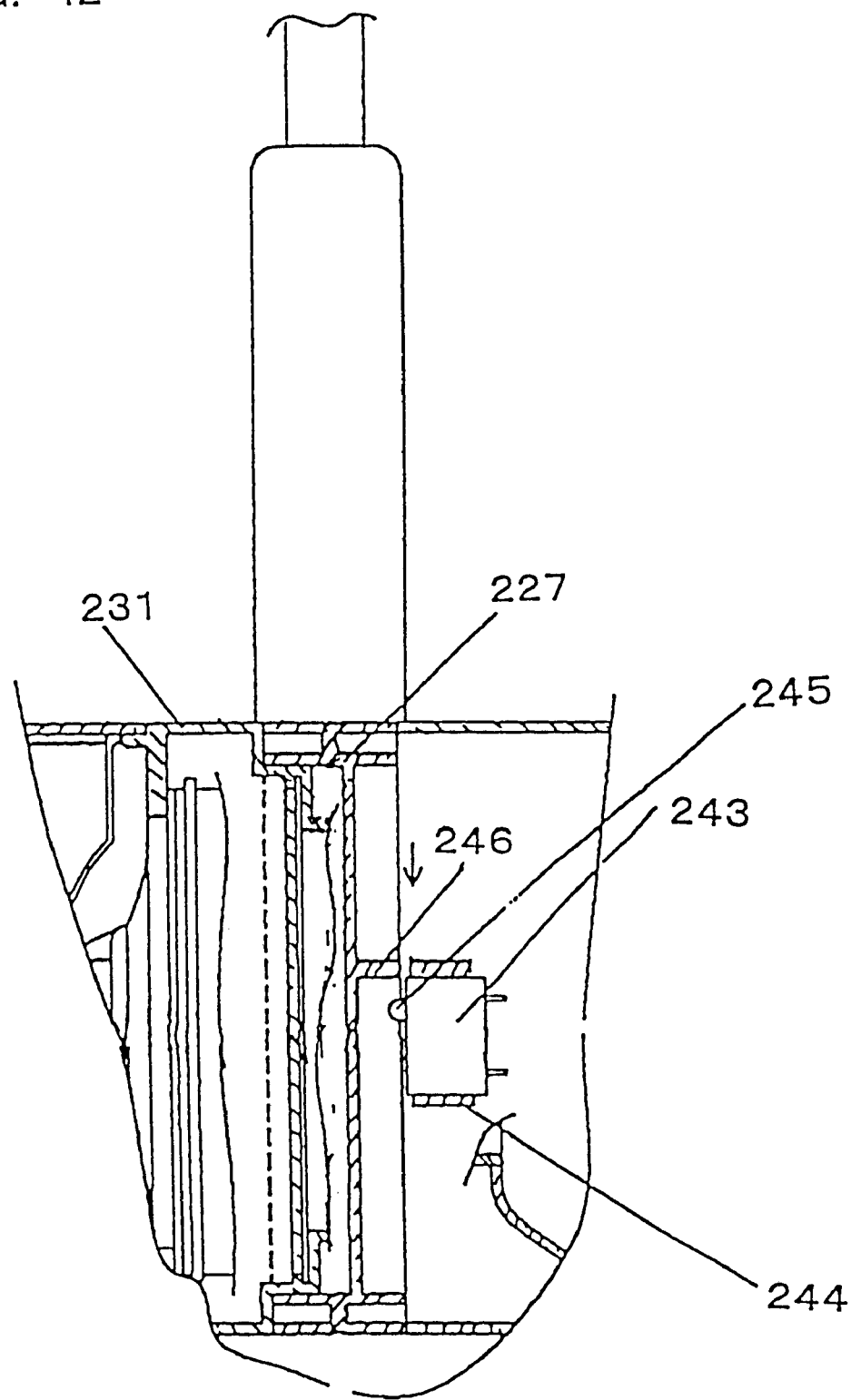
FIG. 42 is an essential side view of a vacuum cleaner according to an eleventh aspect of the invention.
Figure 43:
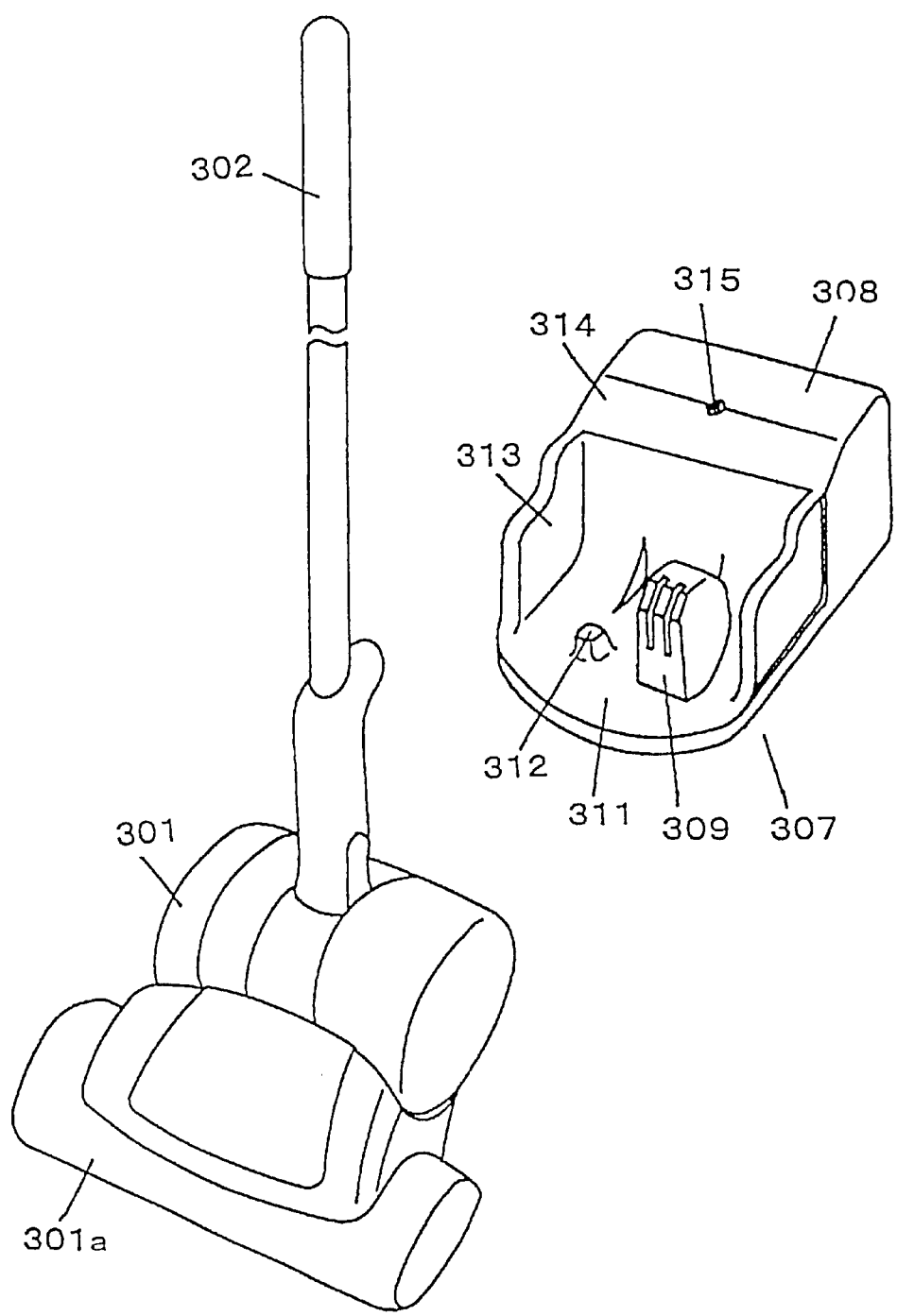
FIG. 43 is a perspective view of a state of dismounting a cleaner main body from a charger of a vacuum cleaner according to a twelfth aspect of the invention.
Figure 44:
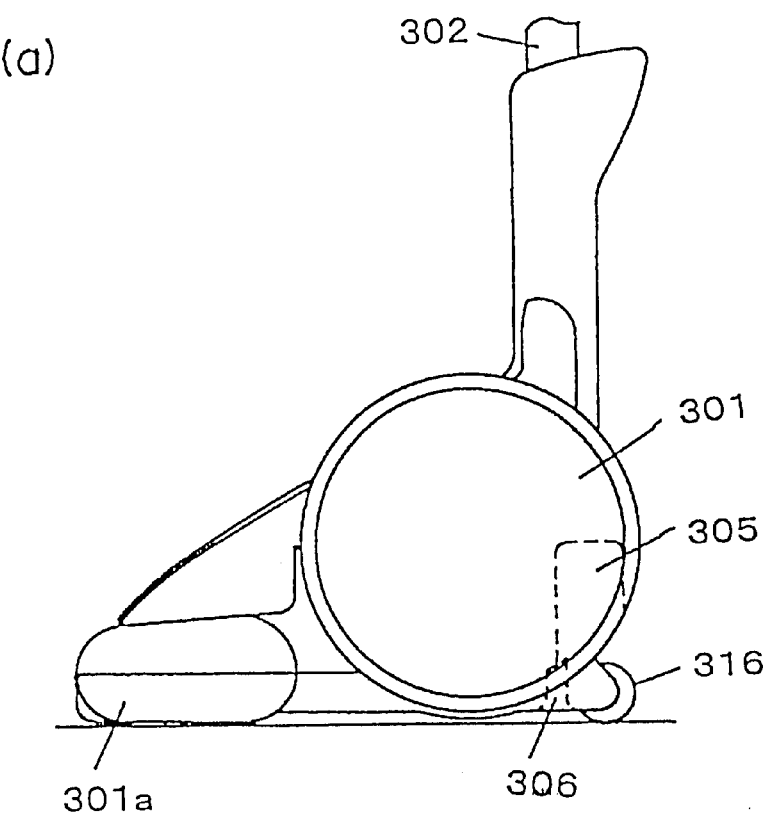
FIG. 44(a) is a side view of the cleaner main body of the vacuum cleaner in accordance with the twelfth aspect.
FIG. 44(b) is a top view of the cleaner main body of the vacuum cleaner in accordance with the twelfth aspect.
Figure 44:
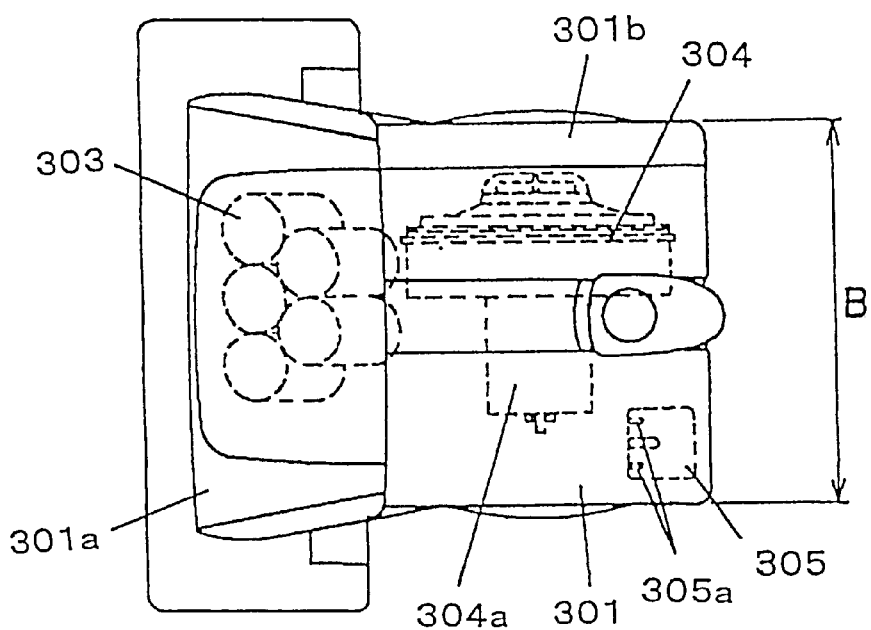
Figure 45:
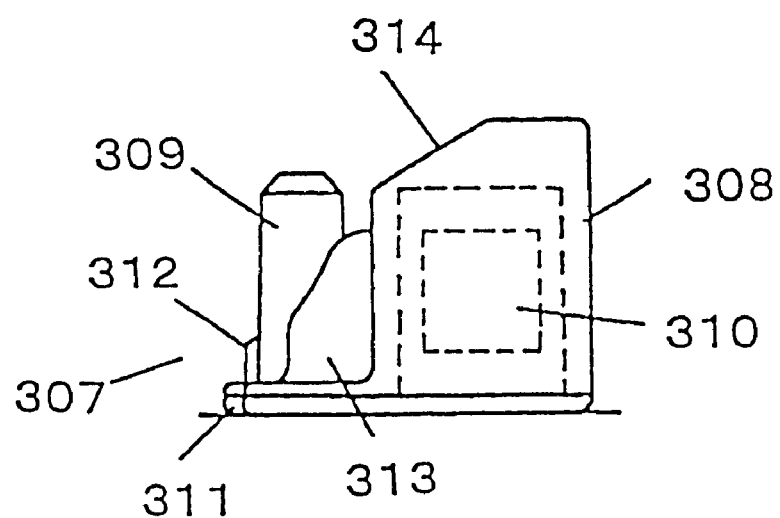
FIG. 45(a) is a side view of a charger of the vacuum cleaner in accordance with the twelfth aspect.
FIG. 45(b) is a top view of the charger of the vacuum cleaner in accordance with the twelfth aspect.
Figure 45:
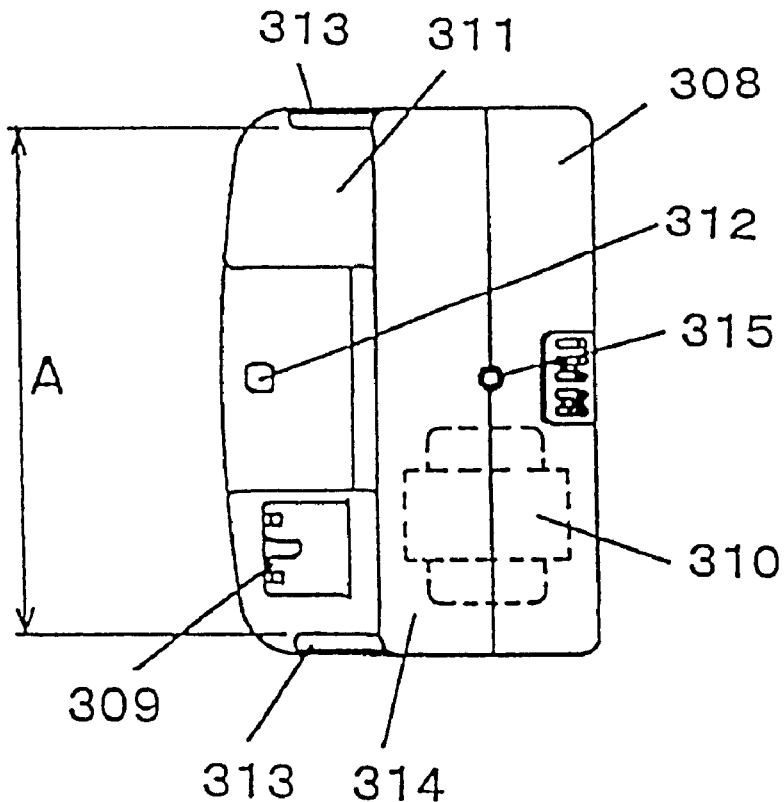
Figure 46:
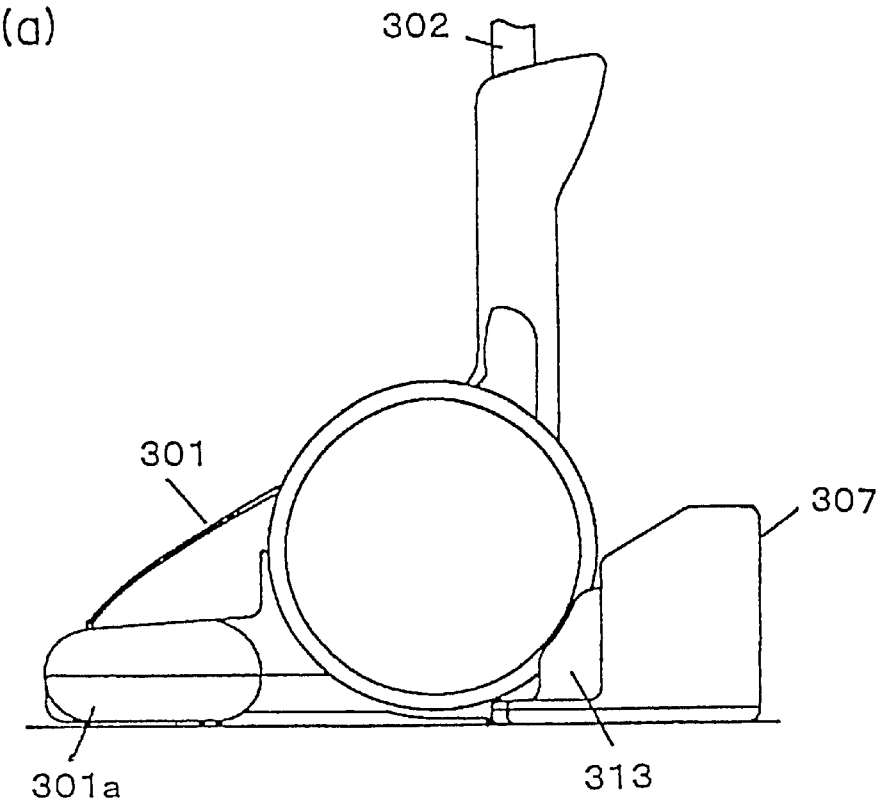
FIG. 46(a) is a side view showing the coupled state of the cleaner main body and the charger of the vacuum cleaner in accordance with the twelfth aspect.
FIG. 46(b) is a top view showing the coupled state of the cleaner main body and the charger of the vacuum cleaner in accordance with the twelfth aspect.
Figure 46:
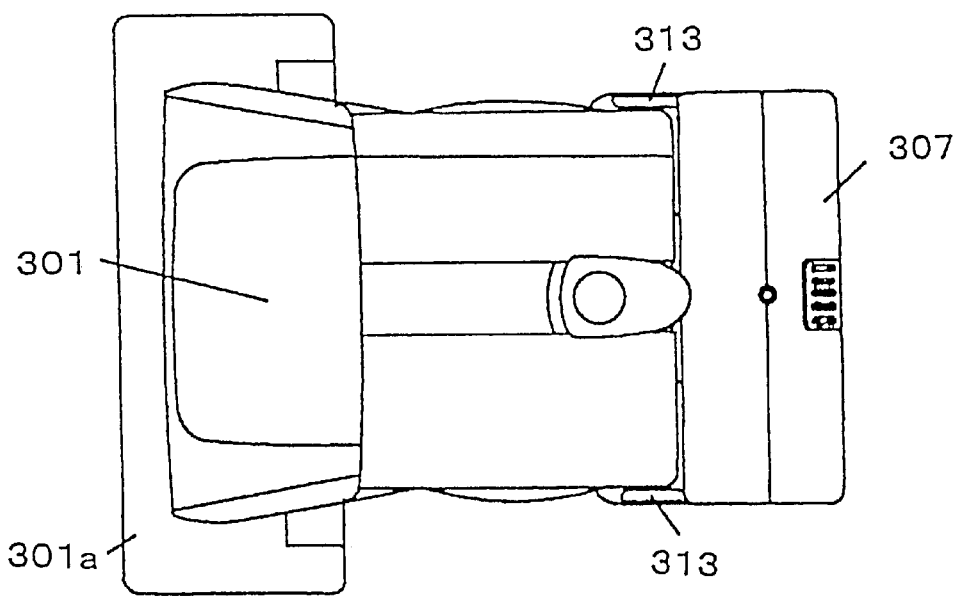
Figure 47:
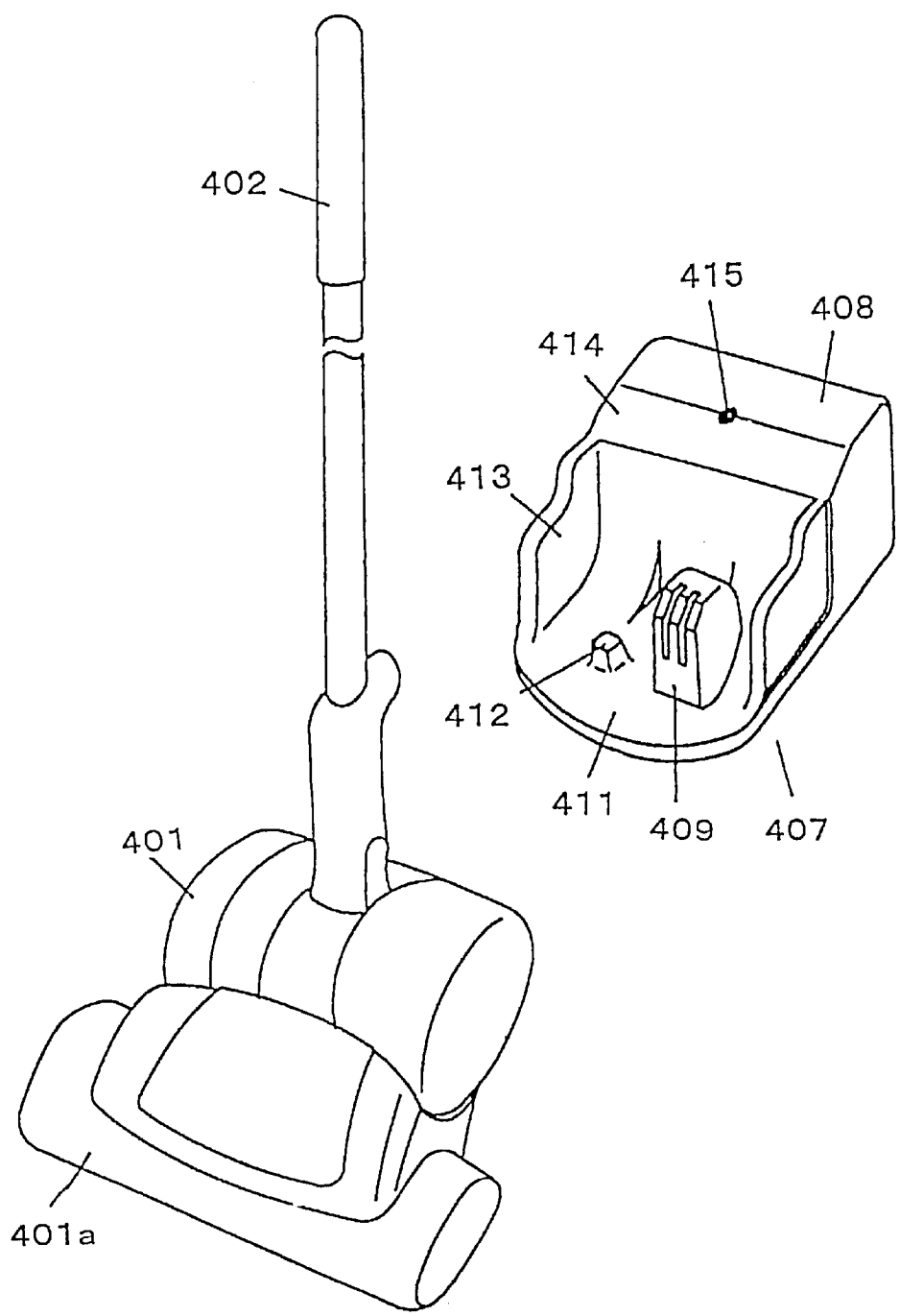
FIG. 47 is a perspective view of a state of dismounting a cleaner main body from a charger of a vacuum cleaner according to a thirteenth aspect of the invention.
Figure 48:
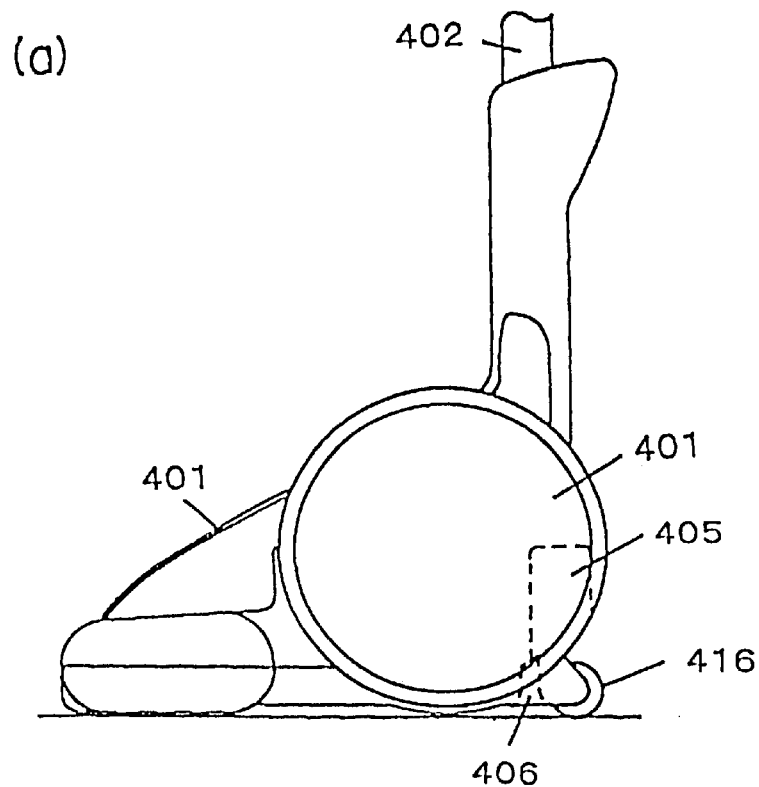
FIG. 48(a) is a side view of the cleaner main body of the vacuum cleaner in accordance with the thirteenth aspect.
FIG. 48(b) is a top view of the cleaner main body of the vacuum cleaner in accordance with the thirteenth aspect.
Figure 48:
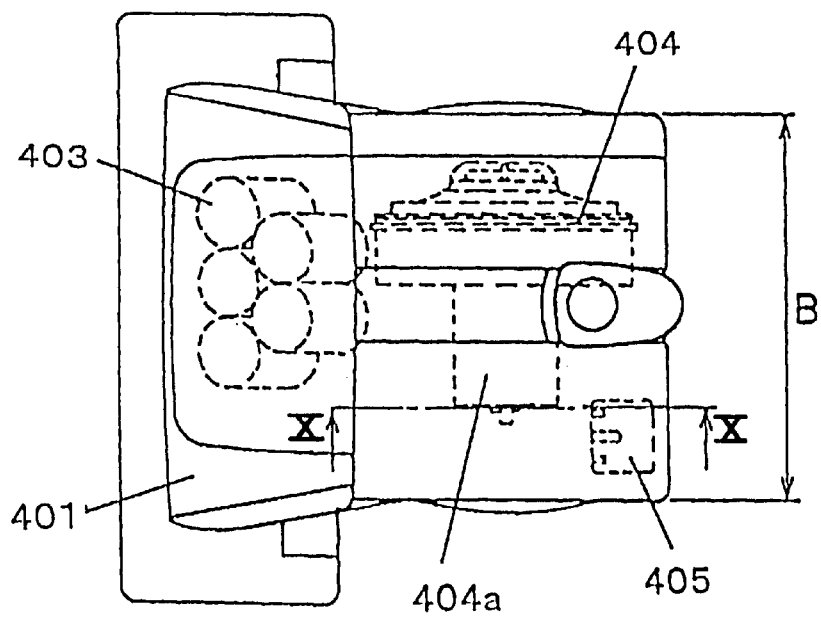
Figure 49:
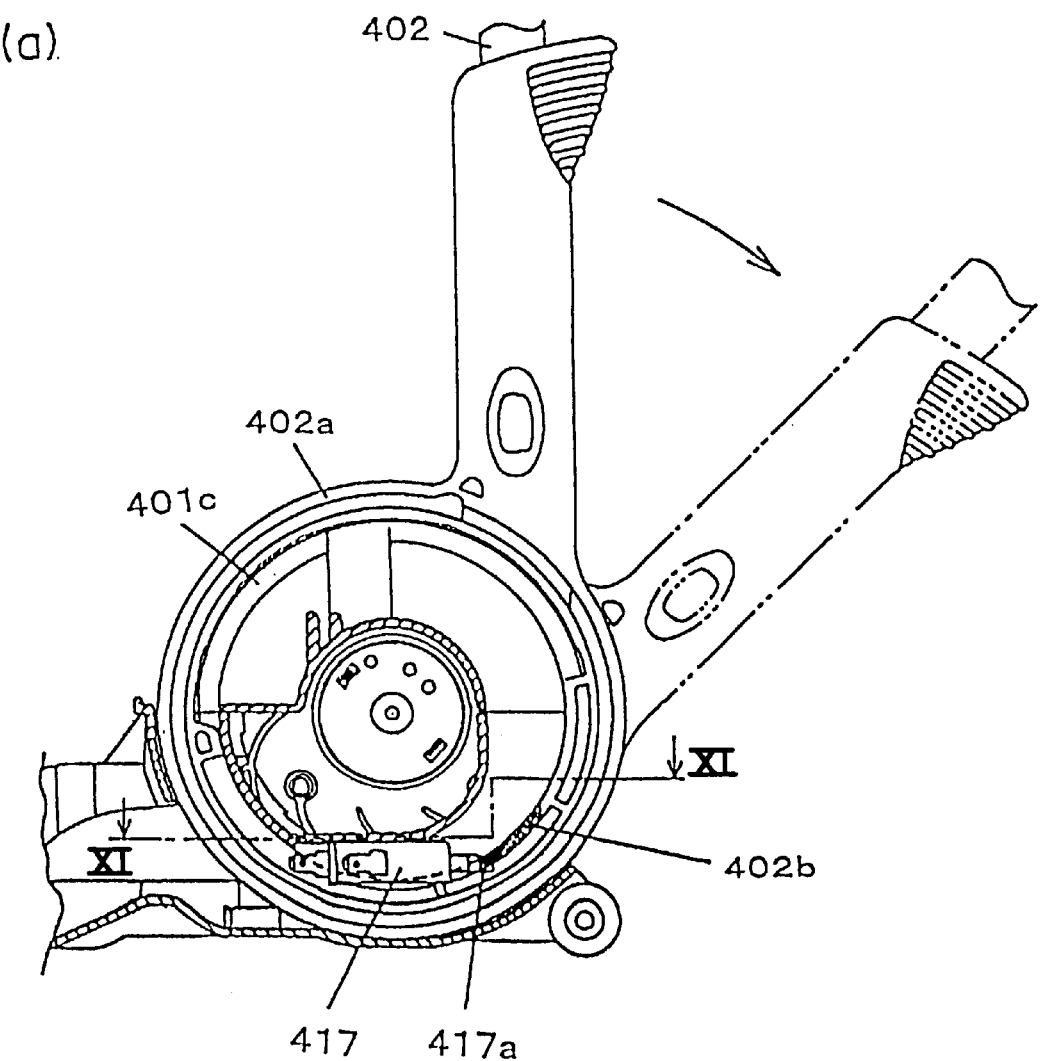
FIG. 49(a) is a sectional view along line X—X in FIG. 48(b) showing the switch mounting area of the vacuum cleaner in accordance with the thirteenth aspect.
FIG. 49(b) is a sectional view along line XI—XI in FIG. 49(a)
Figure 49:
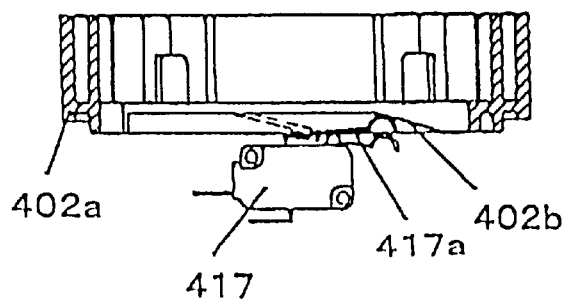
Figure 50:
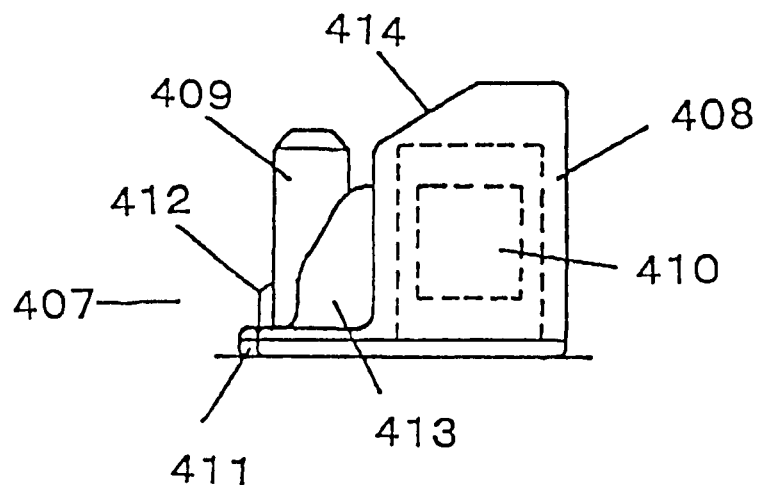
FIG. 50(a) is a side view of a charger of the vacuum cleaner in accordance with the thirteenth aspect.
FIG. 50(b) is a top view of the charger of the vacuum cleaner in accordance with the thirteenth aspect.
Figure 50:
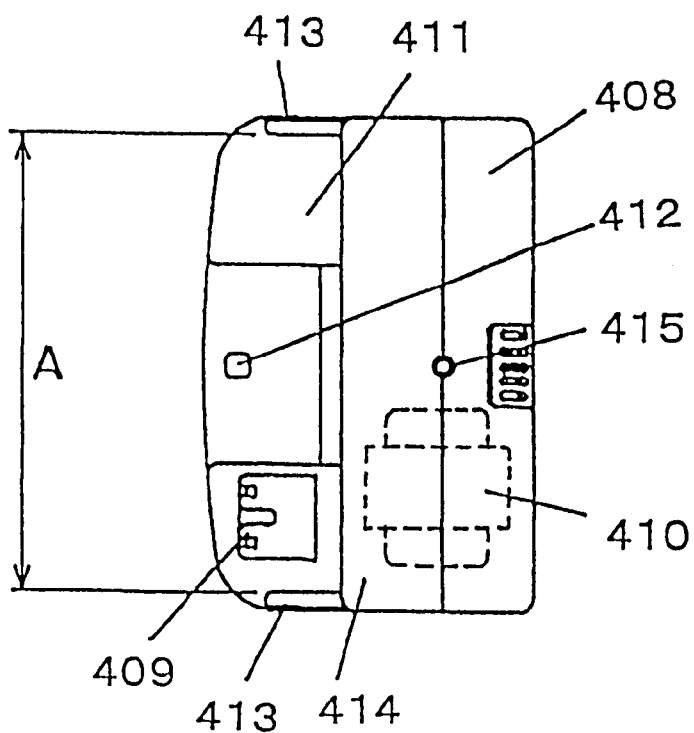
Figure 51:
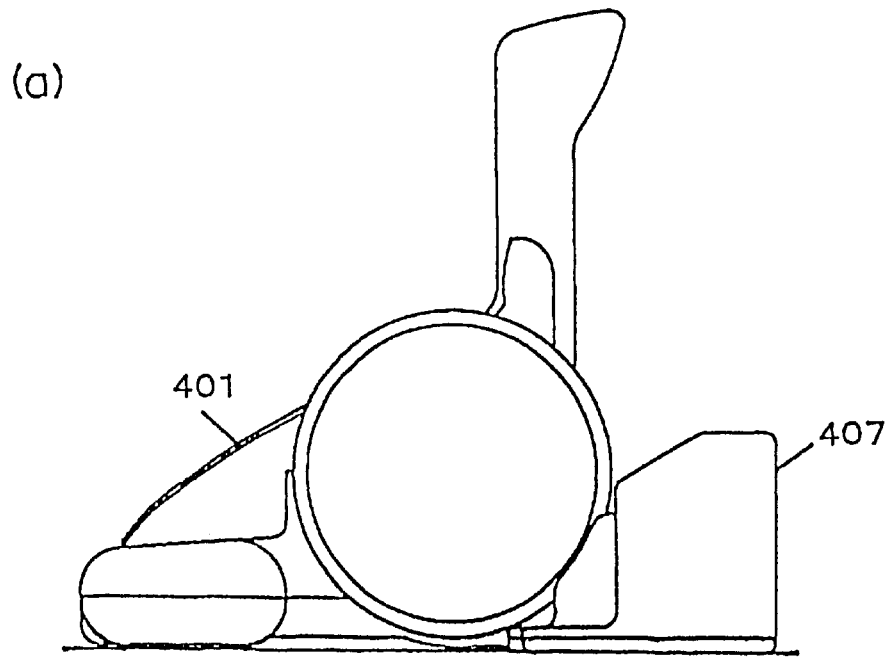
FIG. 51(a) is a side view showing the coupled state of the cleaner main body and the charger of the vacuum cleaner in accordance with the thirteenth aspect.
FIG. 51(b) is a top view showing the coupled state of the cleaner main body and the charger of the vacuum cleaner in accordance with the thirteenth aspect.
Figure 51:
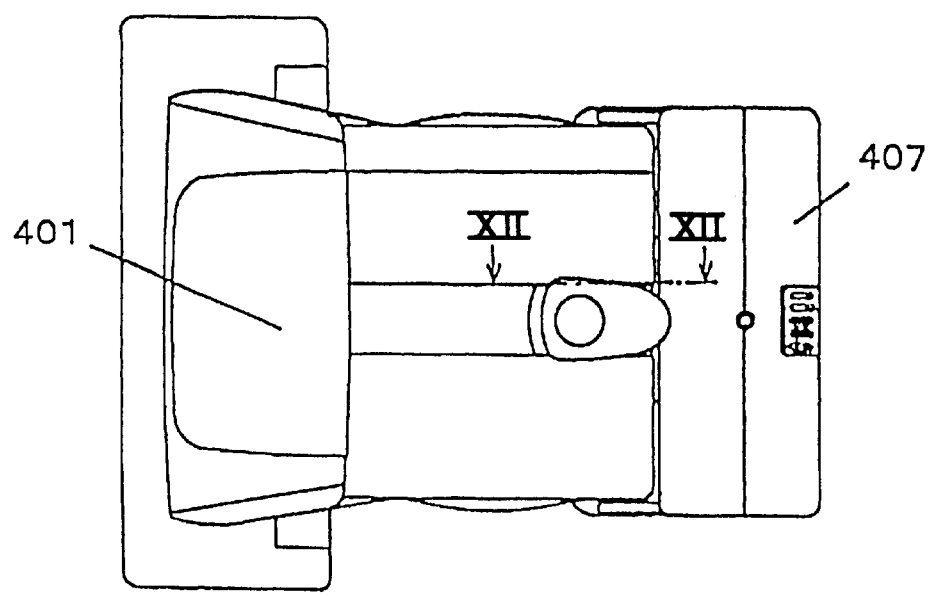
Figure 52:
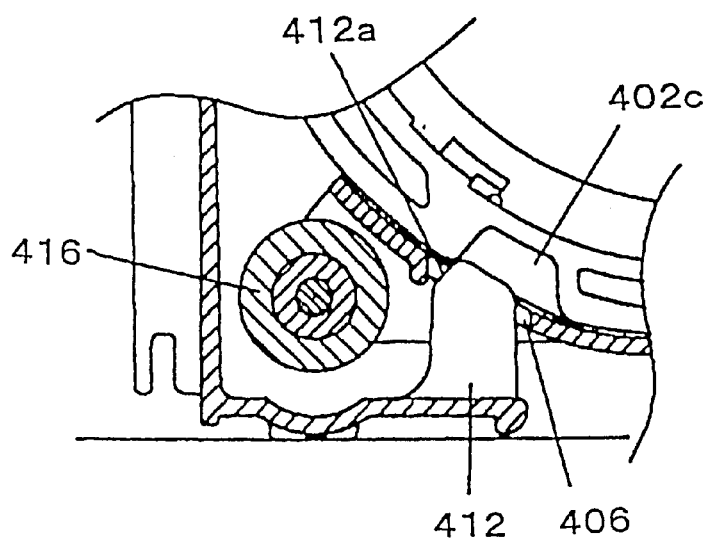
FIG. 52(a) is a sectional view along line XII—XII in FIG. 51(b) showing partially the state immediately before coupling of cleaner main body and charger of the vacuum cleaner in accordance with the thirteenth aspect.
FIG. 52(b) is a partial sectional view showing the coupled state of the cleaner main body and the charger of the vacuum cleaner in accordance with the thirteenth aspect.
Figure 52:
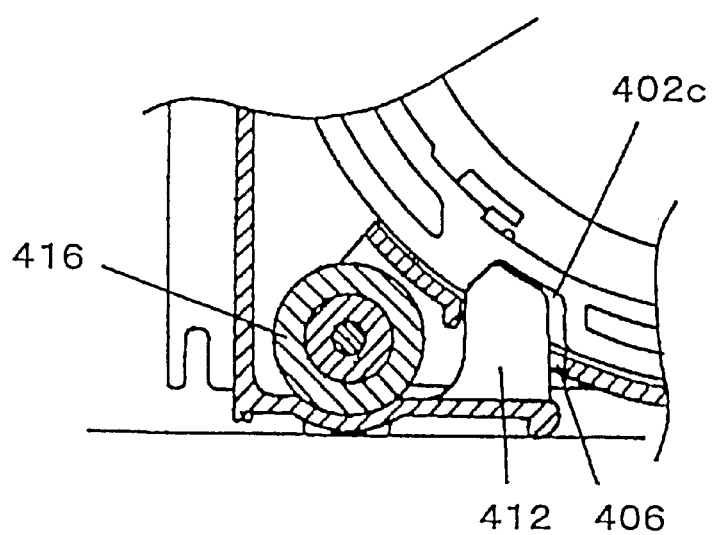
Figure 53:
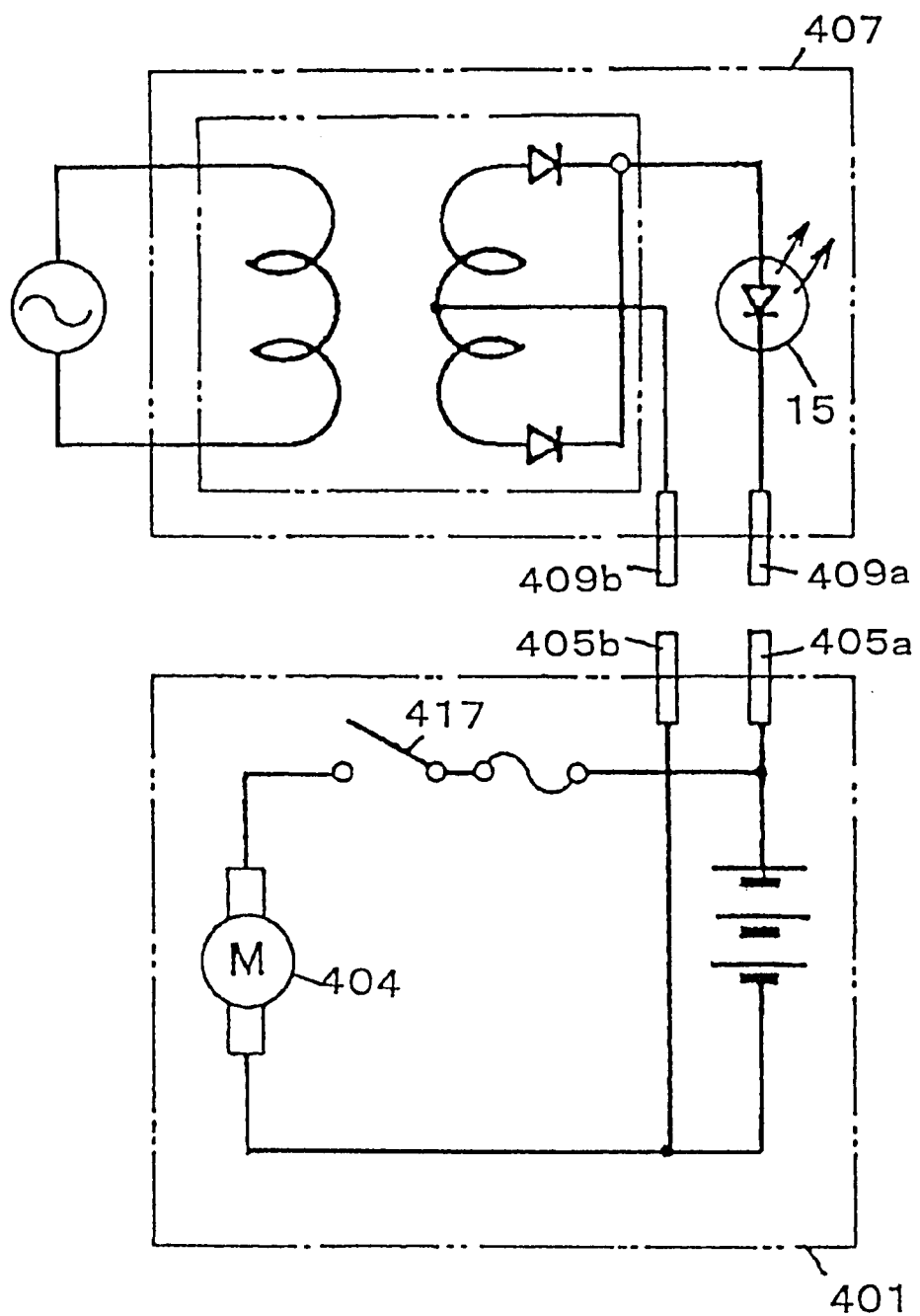
FIG. 53 is a circuit diagram of the vacuum cleaner in accordance with the thirteenth aspect.
Figure 54:
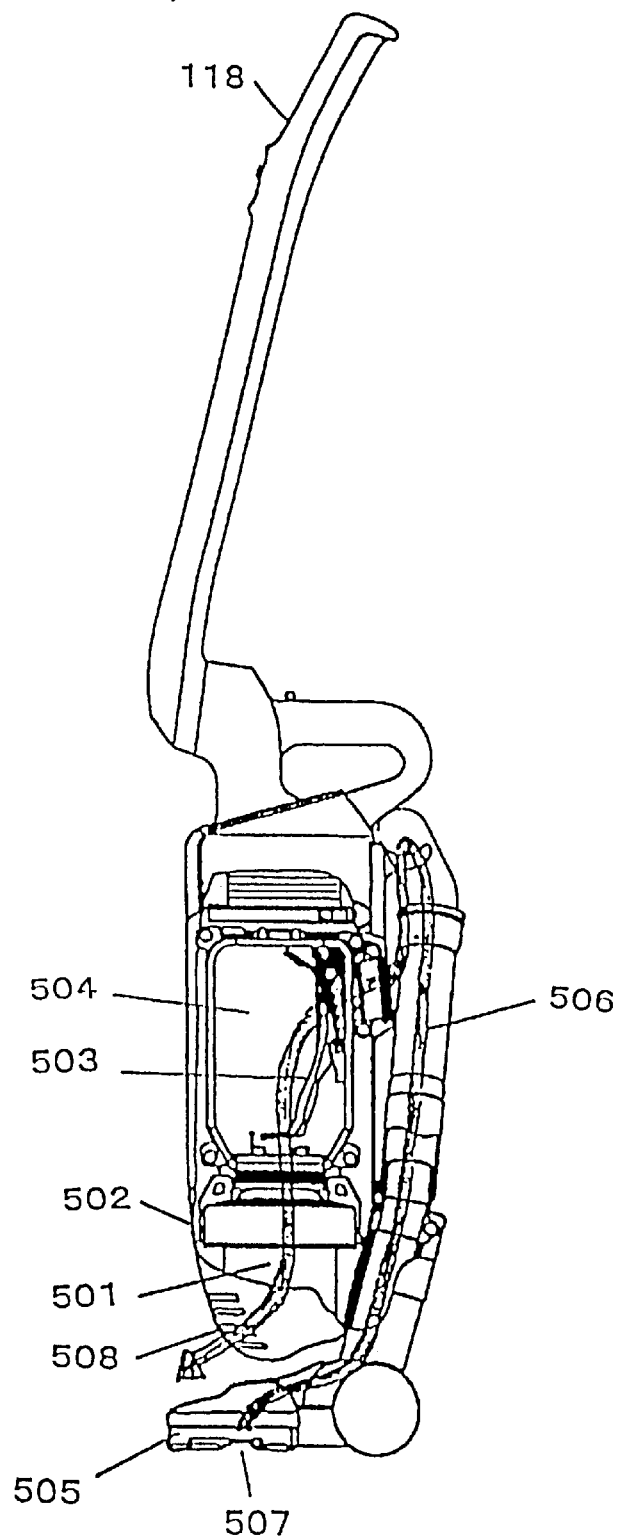
FIG. 54 is a partially cut-away side view of a conventional vacuum cleaner.
Figure 55:
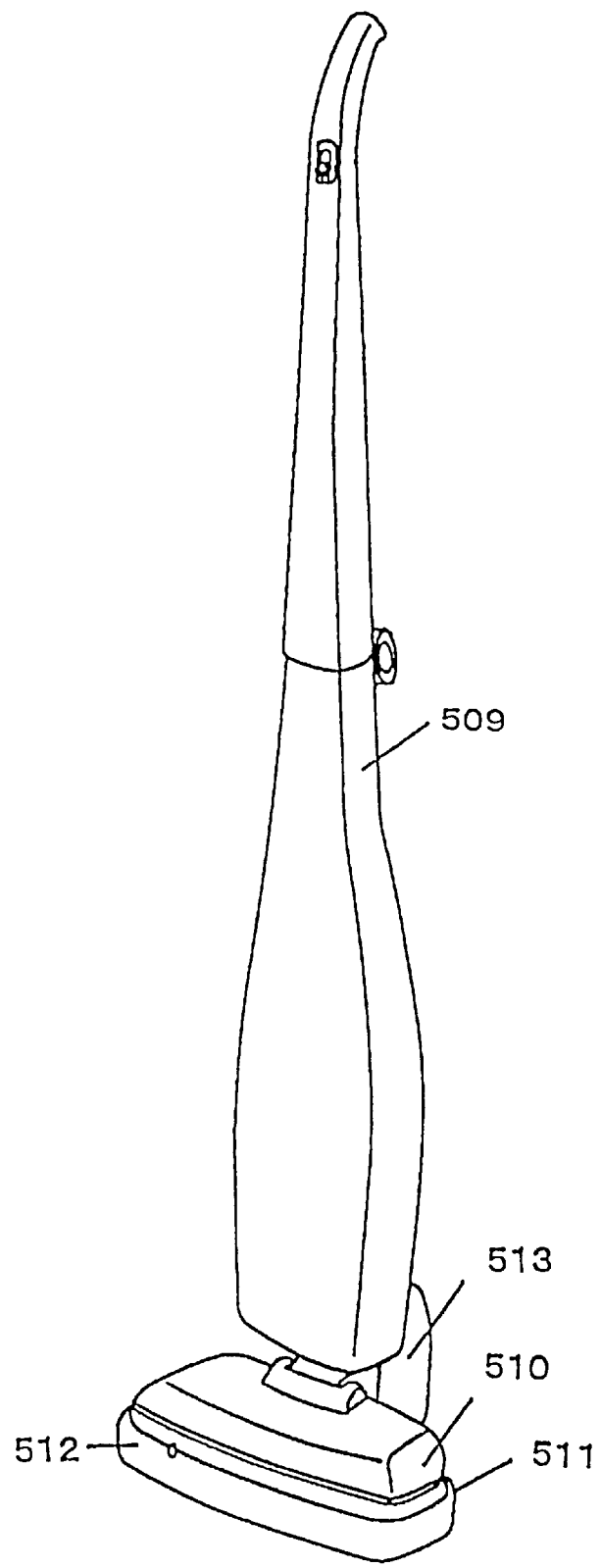
FIG. 55 is a perspective view of another example of the conventional vacuum cleaner.
Figure 56:
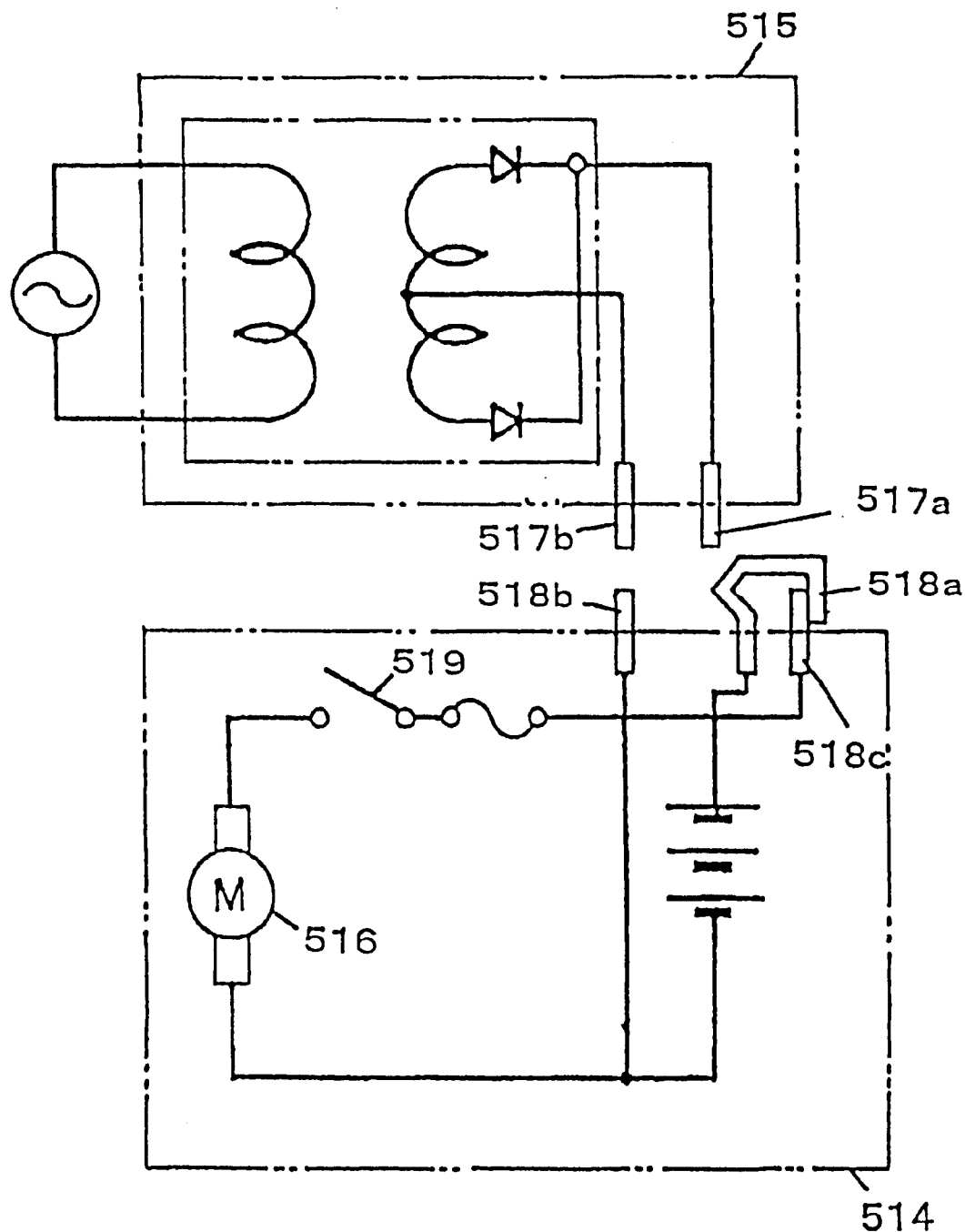
FIG. 56 is a circuit diagram of yet another example of the conventional vacuum cleaner.

As shown in FIG. 42, a limit switch 243 is designed to turn on or off the current feeding circuit to the blower 218, and the limit switch 213 is fixed to the cover 231 by a convex rib 244. Inside of the handle arm body 227, moreover, there is a contact rib 246 for pressing a contact point 245 of the limit switch 243 when rotating the handle arm body 227. The construction is otherwise the same as that in the eighth aspect.

In this construction, by rotating the handle arm body 227, the contact rib 246 engages the contact point 245 of the limit switch 243, and therefore, by rotating the handle arm body 227 the vacuum cleaner is readily put in a cleaning state without manipulating a start or stop switch, so that ease of handling may be enhanced.

A twelfth aspect of the invention is described below while referring to FIG. 43 to FIG. 46.

As shown in the drawings, a cleaner main body 301 has a manipulation handle 302 that is tiltably provided in an upper part of the cleaner main body 301. A secondary battery 303 and a blower 304 driven by it are provided. The blower 304 is disposed within the cleaner main body 301, and a dust collector 301b is formed at the suction side of this blower 304. Ahead of the cleaner main body 301, there is a suction unit 301a for sucking dust, and this suction unit 301a and the dust collector 301b are connected through a communicating passage. The secondary battery 303 is provided in the upper part of the suction unit 301a.

At a lower side of the cleaner main body 301, moreover, a terminal connector 305 for charging and a hole 306 are provided. The terminal connector 305 is disposed in a space at the outer circumference of a motor 304a provided at a rear part of the blower 304 aside from a central part of the cleaner main body 301. The terminal connector 305 has a recess for getting into the space at the outer circumferential side of the blower 304 and motor 304a from the lower side, and a terminal 305a is provided at an inner wall of this recess. At the rear end of the cleaner main body 301, a rear roller 316 for running projects from the lower side and rear side of the cleaner main body 301.

A charger 307 is composed of a box portion 308 and a charging terminal 309. The charging terminal 309 is provided at the front part of the box portion 308, and is inserted into the recess of the terminal connector 305 of the cleaner main body 301. A charging power transformer 310 is accommodated near the terminal 309 in the box portion 308.

At the front lower end of the box portion 308, a forward extending plate portion (corresponding to a mounting portion) 311 is formed, and a bump 312 to be inserted into the hole 306 in the cleaner main body 301 is provided on this plate portion 311. The terminal 309 of the charger 307 is inserted into the terminal connector 305 of the cleaner main body 301, and with the terminals being connected to each other, the bump 312 of the plate portion 311 is fitted into the hole 306 of the cleaner main body 301. By the connection of the terminal connector 305 and the terminal 309, and fitting of the hole 306 and bump 312, the cleaner main body 301 is defined at the determined position of the charger 307.

From both sides of the box portion 308, a guide 313 is extended forward, and this guide 313 is, when mounting the cleaner main body 301 on the charger 307, designed to guide so that the terminal connector 305 may correspond to the terminal 309, and the hole 306 may correspond to the bump 312, and the relation of the interval A of the guide 313 and the width B of the portion of the cleaner main body 301 being put on the charger 307 is $A \geq B$. Preferably, A is set slightly larger than B.

A slope 314 is formed in the front upper portion of the box portion 308, and the rear roller 316 of the cleaner main body 301 rolls on this slope 314. A pilot lamp 315 for power feed display is provided on the top of the box portion 308.

This aspect of the invention comprises the cleaner main body 301 incorporating the blower 304 thereinside and having the terminal connector 305 for charging, with the charger 307 provided separately from the cleaner main body 301. The charger 307 is composed of the box portion 308 accommodating the power transformer 310, and the charging terminal 309 projecting ahead of the box portion 308, and therefore, the size of the charger 307 itself may be compact. In particular, since the charger 307 has the rear side of the cleaner main body 301 mounted on the plate portion 311, and the suction unit 301a positioned ahead of the cleaner main body 301 is positioned ahead of the plate portion 311, the size of the charger 307 is notably smaller as compared with the conventional charger incorporating the suction unit.

The charging terminal 309 projects from the side wall of the box portion 308 of the charger 307, and the charging terminal 309 is inserted into the terminal connector 305 provided at a position other than the suction unit 301a of the cleaner main body 301. Therefore, the overall size when the cleaner main body 301 is set on the charger 307 is reduced, so that space is saved when charging or storing the vacuum cleaner.

If a rotary brush is provided in the suction unit 301a, the dust being deposited on the rotary brush may fall on the floor when setting the cleaner main body 301 on the charger 307, but as mentioned above, since dust does not fall on the charger 307, by detaching the cleaner main body 301 from the charger 307 the dropped dust can be sucked up easily.

Further, the cleaner main body 301 may be fixed more securely on the charger 307 by placing the plate portion mounting part of the cleaner main body 301 near the bottom of the front side of the box portion 308 of the charger 307, and by placing at least the engaging bump 312 and the hole 306 at the lower side of the plate portion 311 and the corresponding cleaner main body 301.

A pair of guides 313 are provided near both ends at the front side of the box portion 308 of the charger 307, and the rear portion of the cleaner main body 301 is defined in position between these guides. Therefore, setting of the cleaner main body 301 on the charger 307 is done more easily and securely. In particular, when setting the cleaner main body 301 on the charger 307 by holding the grip at the upper side of the handle unit 302, the setting can be done smoothly and securely by the action of the guides 313, and the overall strength of the charger 307 may be enhanced.

Still more, by forming the slope 314 in the front upper part of the box portion 308 of the charger 307, the rear roller 316 rolls on the slope 314, and the cleaner main body 301 can be set more smoothly on the charger 307. In this embodiment, the surface of the charger 307 confronting the cleaner main body 301 is a slope composed of a flat plane, but similar effects are obtained by using a cylindrical surface with a large radius (whether concave or convex), or other similar shapes as a guiding shape. The same effects are also obtained by forming a slope or a cylindrical surface on the side of the cleaner main body 301 confronting the charger 307, and the effects are further enhanced by forming the slope or cylindrical surface on both sides.

Moreover, since the terminal connector 305 for charging is provided on the outer circumference of the motor 304a of the blower 304, that is, the terminal connector 305 is provided so as not to project from the cleaner main body 301, the size of the cleaner main body 301 may be made compact, and the overall size of the vacuum cleaner in the charging state, including the charger 307, may be reduced. Also, the electrical parts are formed close to each other, and the internal wiring may be concentrated and rationalized.

In the charger 307 having the charging terminal 309 at a position remote from the center line in the width direction of the box portion 308 of the charger 307, by disposing the power transformer 310 near the charging terminal 309, when dismounting the cleaner main body 301 from the charger 307, the external force acting on the charger 307 and the gravity acting on the charger 307 act at close points, so that the cleaner main body 301 can be smoothly dismounted from the charger 307.

Besides, when setting the cleaner main body 301 on the charger 307, by placing the pilot lamp 315 on the box portion 308 confronting the handle unit 302, the pilot lamp is easy to see when setting the cleaner main body 301 on the charger 307, and thus the process of setting the cleaner main body 301 on the charger 307 is easy.

At the rear end of the cleaner main body 301, since the rear roller 316 is formed so that the lower surface and rear surface may project from the cleaner main body 301, when setting the cleaner main body 301 on the charger 307, if the rear portion of the cleaner main body 301 interferes with the slope 314 of the charger 307 or the front part of the box portion 308, the rear roller 316 abuts against the slope 314 or box portion 308, and resistance is small. Also, detaching or attaching the cleaner main body 301 from or to the charger 307 may be easy, and by using a soft material for the roller, damage can be prevented when detaching or attaching the cleaner main body 301 from or to the charger 307.

A thirteenth aspect of the invention is described below while referring to FIG. 47 to FIG. 53.

As shown in the drawings, a cleaner main body 401 rotatably holds a handle unit 402 for manipulation, with the handle unit 402 having a length of about 1 m. Inside of the cleaner main body 401, a secondary battery 403 and a blower 404 driven by this secondary battery 403 are incorporated. At the rear lower side of the cleaner main body 401, a terminal connector 405 for charging and a hole 406 are provided. The cleaner main body 401 incorporates a switch 417, and a ring 402a coupled to the handle unit 402 rotates backward about a cylindrical shaft 401c of the cleaner main body 401. A cam 402b provided in part of the ring 402a pushes a lever 417a of the switch 417, so that the switch 417 is turned on. That is, from the boundary of the slope of the cam 402b, the ON state and OFF state are changed over. The tilting angle of the handle unit 402 causing a changing over from the OFF state to the ON state is about 10 degrees, with the OFF state being achieved when the handle unit 402 is upright. In actual use, since the tilting angle is at least about 30 degrees when the handle length is 1 m, the switch 417 is not cut off during use.

The charger 407 is composed of a box portion 408, and charging terminals 409 provided at a front portion of the charger. Near the terminals 409 and in the box portion 408, a power transformer 410 for charging is stored. A pilot lamp 415 for power feed display is provided on an upper surface of the charger 407.

A plate portion 411 is formed at the front lower end of the box portion 408, and a bump (engaged portion or mating portion) 412 is provided on the plate portion 411. This bump 412 is provided at a position to be inserted into the hole 406 in a connected state of the terminal connector 405 of the cleaner main body 401 and the terminal 409 of the charger 407. The terminal connector 405 has a positive electrode connection terminal 405a and a negative electrode connection terminal 405b, and the terminal 409 has a positive electrode charging terminal 409a and a negative electrode charging terminal 409b, so that a simple construction of mutual connection of positive and negative terminals is realized.

Further, when the handle unit 402 is present at the cut-off position of the switch 417, since a recess (engaging portion) 402c is provided on the outer circumference of the ring 402a at the same position as the hole 406, by setting the cleaner main body 401 on the charger 407, the bump 412 is fitted into the recess 402c after penetrating through the hole 406. A slope 412a is provided at the leading end of the bump 412. The pilot lamp 415 using a light emitting diode is provided on the top of the charger 407.

With this construction, while the handle unit 402 is located at the cut-off position of the switch 417, when the cleaner main body 401 is set on the charger 407, the bump 412 penetrates through the hole 406 and is fitted into the recess 402c, and therefore, the handle unit 402 is not rotated in the set state, so that the switch 417 will not be turned on. To the contrary, in the turned-on state of the switch 417, the handle 402 is rotated, and the recess 402c is moved to a position different from the hole 406, so that the cleaner main body 401 cannot be set on the charger 407 in the specified position. Therefore, in the turned-on state of the switch 417, the positive electrode connection terminal 405a and positive electrode charging terminal 409a, and the negative electrode connection terminal 405b and negative electrode charging terminal 409b do not contact each other, and they contact only in the cut-off state of the switch 417, and the circuit is connected between the charger 407 and the cleaner main body 401.

The recess 402c and hole 406 are provided in the bottom of the cleaner main body 401, and the confronting bump 412 projects upward from the charger 407, and once properly positioned, they are coupled automatically by the weight of the cleaner main body 401.

Moreover, since the hole 406 is provided in the non-movable part of the cleaner main body 401, the cleaner main body 401 can be positioned securely on the charger 407. The slope 412a is provided on the outer periphery of the leading end of the bump 412, such that if the bottom hole 406 of the cleaner main body 401 and the recess 402c are slightly deviated, the recess 402c is moved to the proper position as the slope 412a guides the inlet of the recess 402c. The pilot lamp 415 provided on the upper side of the charger 407 lights up only when the cleaner main body 401 is set on the charger 407 in a specified state with the terminal connector 405 and terminal 409 being in mutual contact.

Thus, the recess (engaging portion) 402c is provided for setting the cleaner main body 401 on the charger 407 by engagement with the bump (engaged portion) 412 provided in the charger 407. The recess 402c moves in response to the manipulation of the handle unit 402 so that the recess 402c cannot be engaged with the bump 412 in the ON state of the switch 417. The cleaner main body 401 and the charger 407 are connected only when the switch 417 is cut off mechanically, and the circuit configuration is simple such that the product defective rate occurring due to wiring is lowered, whereby secure charging is realized in spite of low cost, and ease of handling is enhanced.

Moreover, since the handle unit 402 is used as a manipulation unit for the switch 417, the cleaner main body 401 and the charger 407 can be connected only when the switch 417 is securely cut off, without using any additional part, so that the ease of handling is enhanced at low cost.

Since the recess (engaging portion) 402c is opposite from the bottom of the cleaner main body 401, coupling action of the cleaner main body 401 and charger 407 results from the weight of the cleaner main body 401, and once coupled, the cleaner main body 401 is not detached from the charger 407 unless the cleaner main body 401 is lifted by force or a very large impact is applied thereto, so that secure charging is realized.

The bump (engaged portion) 412 provided in the charger 407 is engaged with the recess 402c through the hole 406 provided in the bottom of the cleaner main body 401, and positioning of the cleaner main body 401 on the charger 407 is free from effects of looseness in rotation of the handle 402 or the like, whereby not only is deviation of positioning hardly caused, but also the contact between the terminal connector 405 and terminal 409 is more secure because the bump 412 is securely guided to the specified position, so that a more reliable charging is realized.

Since the slope 412a is provided at the leading end of the bump 412 provided in the charger 407, if the bottom hole 406 of the cleaner main body 401 and the recess 402c are slightly deviated, the recess 402c is moved to the proper position while guiding the inlet of the recess 402c, and the cleaner main body 401 is securely mounted on the charger 407, so that a secure charging is effected.

The pilot lamp 415, lighting up only when the cleaner main body 401 and the charger 407 are electrically connected, is provided either inside the charger 407 or inside the cleaner main body 401, and it decreases charging errors due to imperfect setting of the cleaner main body 401 on the charger 407.

In this construction, the pilot lamp 415 is used as a notice device, but the notice device is not limited to visual implementation, and an auditory device such as an electronic alarm, or any other device, may be used.

What is claimed is:

1. A vacuum cleaner comprising:
   a suction unit;
   a blower for sucking dust from said suction unit;
   a dust scraper disposed in said suction unit;
   an electric motor for driving said dust scraper about an axis of the dust scraper; and
   an exhaust passage for conveying exhaust of said blower to said electric motor to cool said electric motor.

2. The vacuum cleaner according to claim 1, wherein said suction unit includes an intake unit in fluid communication with said blower and an exhaust unit in fluid communication with said blower.

3. The vacuum cleaner according to claim 2, wherein said intake unit and said exhaust unit are constructed and arranged such that an air stream exiting from said exhaust unit and entering into said intake unit flows substantially parallel to the surface on which the vacuum cleaner is operating and along the axis of said dust scraper.

4. The vacuum cleaner according to claim 2, wherein said dust scraper is designed to be one of rotatably driven and oscillatably driven by said electric motor.

5. The vacuum cleaner according to claim 1, wherein said dust scraper is designed to be one of rotatably driven and oscillatably driven by said electric motor.

6. The vacuum cleaner according to claim 1, wherein said suction unit includes an intake unit in fluid communication with said blower and an exhaust unit in fluid communication with said blower.

7. The vacuum cleaner according to claim 6, wherein said intake unit and said exhaust unit are constructed and arranged such that an air stream exiting from said exhaust unit and entering into said intake unit flows substantially parallel to the surface on which the vacuum cleaner is operating and along the axis of said dust scraper.

8. The vacuum cleaner according to claim 6, wherein said intake unit is provided at one end of said suction unit and said exhaust unit is provided at an opposite end of said suction unit such that upon operation of said blower an air stream flowing from said exhaust unit to said intake unit is generated.

9. The vacuum cleaner according to claim 6, wherein said dust scraper is designed to be one of rotatably driven and oscillatably driven by said motor.

10. A vacuum cleaner comprising:
    a suction unit;
    a blower for sucking dust from said suction unit;
    a dust scraper disposed in said suction unit;
    a motor for driving said dust scraper about an axis of the dust scraper; and
    an exhaust passage for conveying exhaust of said blower to said motor to cool said motor,
    wherein said suction unit includes an intake unit in fluid communication with said blower and an exhaust unit in fluid communication with said blower, and
    wherein said intake unit is provided at one end of said suction unit and said exhaust unit is provided at an opposite end of said suction unit such that upon operation of said blower an air stream flowing from said exhaust unit to said intake unit is generated.

11. A vacuum cleaner comprising:
    a main body to house a battery;
    an intake port at a front side of said main body;

at least one of a dust collection chamber and a blower positioned behind said intake port; and a handle to be interconnected with said main body such that said handle is capable of one of rotating and sliding along an outer periphery of said main body, wherein when said handle is interconnected with said main body said handle is capable of one of rotating and sliding along an outer circumference of said main body.

12. The vacuum cleaner according to claim 11, wherein when said handle is interconnected with said main body such that said handle is capable of rotating along an outer circumference of said main body, said handle is rotatable nearly about a center of said main body.

13. The vacuum cleaner according to claim 12, wherein when said handle is interconnected with said main body said handle is positioned nearly at a longitudinal center of said main body, and said blower is positioned nearly at an inner side of said handle.

14. The vacuum cleaner according to claim 12, wherein when said handle is interconnected with said main body such that said handle is capable of rotating along an outer circumference of said main body, said handle is rotatable along an outer circumference of a cover for covering an outer circumference of said blower.

15. The vacuum cleaner according to claim 11, wherein when said handle is interconnected with said main body said handle is positioned nearly at a longitudinal center of said main body, and said blower is positioned nearly at an inner side of said handle.

* * * * *